(12) United States Patent
Okamoto et al.

(10) Patent No.: US 12,514,604 B2
(45) Date of Patent: Jan. 6, 2026

(54) ENDOSCOPIC TREATMENT APPARATUS AND METHOD OF MANUFACTURING ENDOSCOPIC TREATMENT TOOL

(71) Applicant: OLYMPUS MEDICAL SYSTEMS CORP., Tokyo (JP)

(72) Inventors: Haruki Okamoto, Hirosaki (JP); Takaaki Hanai, Sagamihara (JP); Risa Watanabe, Hirosaki (JP); Yusuke Nomura, Yokohama (JP); Ryu Yorita, Hirosaki (JP); Kenji Karasawa, Kamiina-gun (JP)

(73) Assignee: Olympus Medical Systems Corp., Tokyo (JP)

( * ) Notice: Subject to any disclaimer, the term of this patent is extended or adjusted under 35 U.S.C. 154(b) by 669 days.

(21) Appl. No.: 17/839,790

(22) Filed: Jun. 14, 2022

(65) Prior Publication Data
US 2022/0395287 A1      Dec. 15, 2022

Related U.S. Application Data

(60) Provisional application No. 63/210,727, filed on Jun. 15, 2021.

(51) Int. Cl.
*A61B 17/29*      (2006.01)
*A61B 17/00*      (2006.01)

(52) U.S. Cl.
CPC .... *A61B 17/29* (2013.01); *A61B 2017/00526* (2013.01)

(58) Field of Classification Search
CPC ............... A61B 17/2816; A61B 17/29; A61B 2017/00526; A61B 2017/00858; A61B 2017/2902; A61B 2017/2905; A61B 2017/2926; A61B 2017/2932; A61B 2017/2939; A61B 2017/294; A61B 2017/320044; A61B 2017/320064; A61B 10/04; A61B 10/06; B23P 13/00
USPC ........................................................ 606/205
See application file for complete search history.

(56) References Cited

U.S. PATENT DOCUMENTS

| | | | | |
|---|---|---|---|---|
| 5,419,220 A | * | 5/1995 | Cox | B23P 15/00 76/119 |
| 5,707,392 A | * | 1/1998 | Kortenbach | B25B 7/02 600/564 |
| 6,309,404 B1 | * | 10/2001 | Krzyzanowski | A61B 10/06 606/208 |
| 2004/0260337 A1 | | 12/2004 | Freed | |
| 2005/0054946 A1 | * | 3/2005 | Krzyzanowski | A61B 10/06 600/564 |
| 2013/0253530 A1 | * | 9/2013 | Rothberg | A61B 10/06 606/114 |

* cited by examiner

*Primary Examiner* — Kankindi Rwego
(74) *Attorney, Agent, or Firm* — Morgan, Lewis & Bockius LLP

(57) ABSTRACT

An endoscope treatment instrument having a sheath, a rotation axis extending in a width direction orthogonal to a longitudinal direction of the sheath, a plate formed with a first opening through which the rotation axis passes and a second opening having a width different from the width of the first opening, a forceps piece rotatably supported about the first opening and the rotation axis passing through the second opening, and a wire connected to a proximal end portion of the plate.

19 Claims, 39 Drawing Sheets

FIG. 27
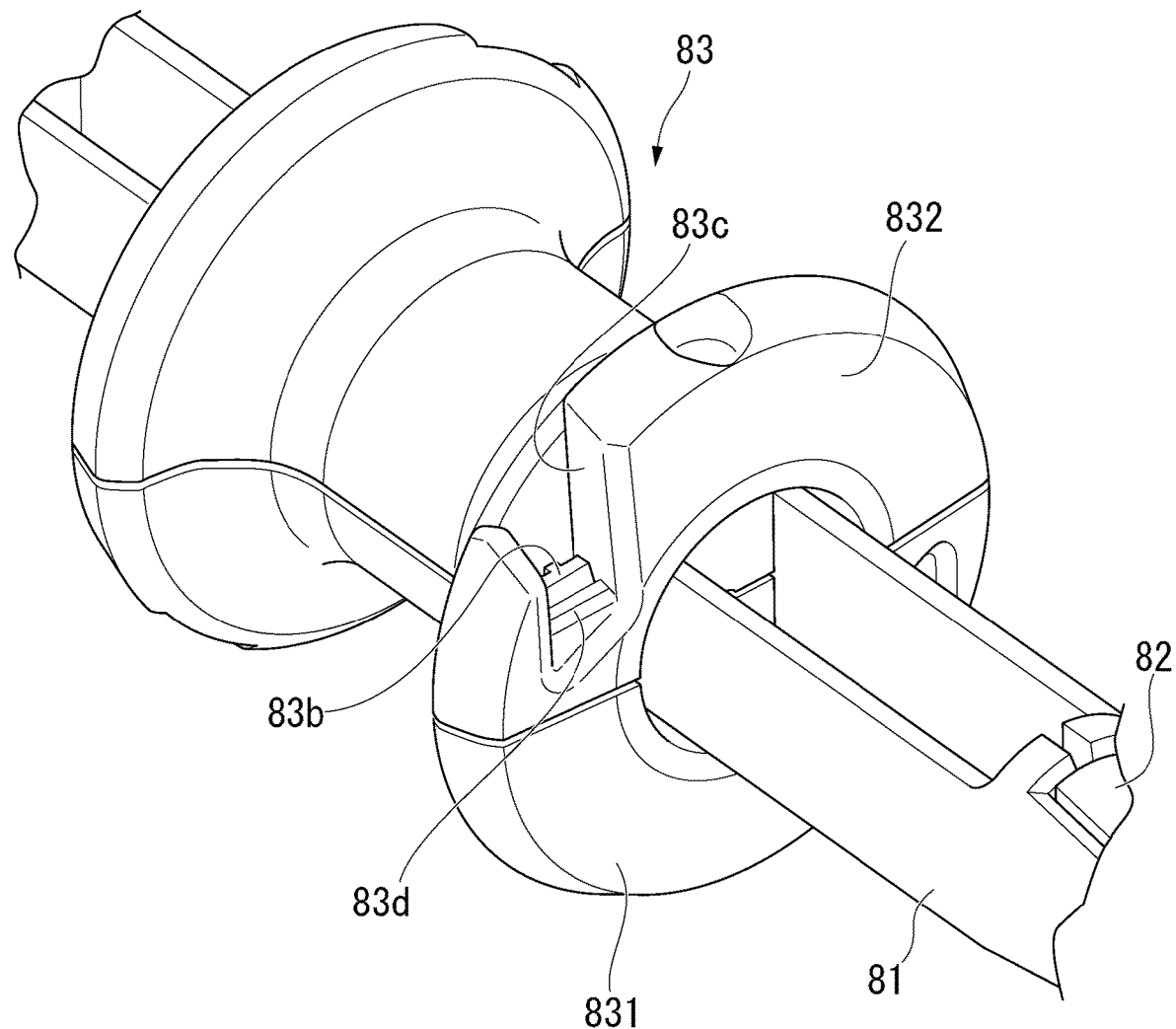
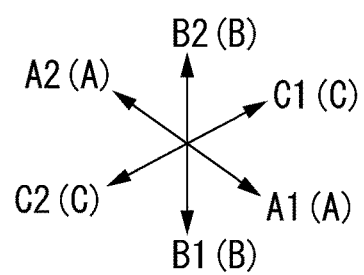

FIG. 28
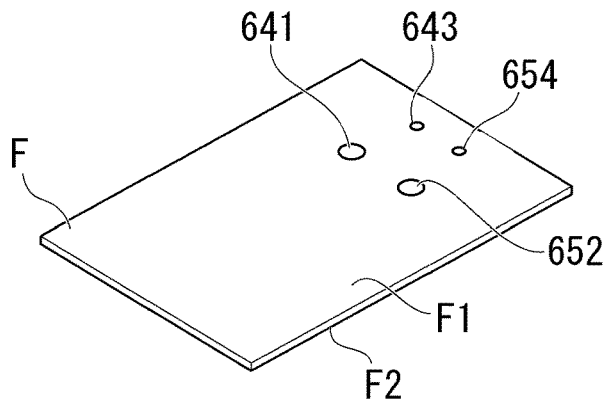
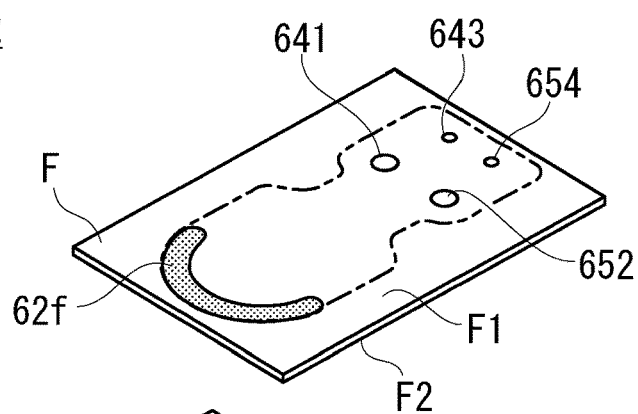
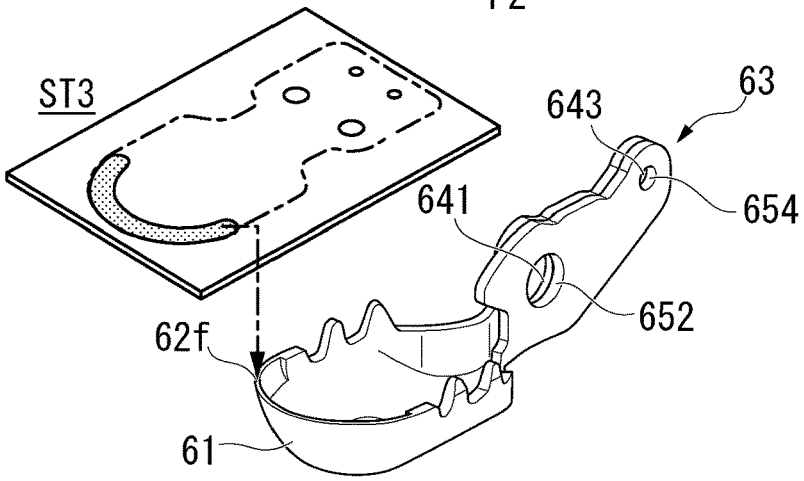
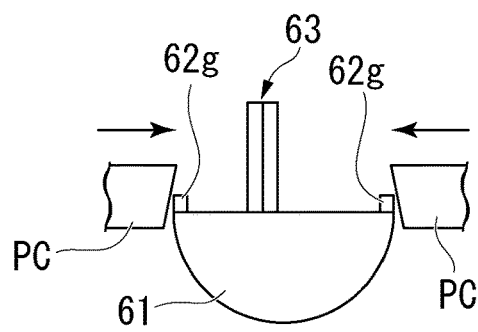
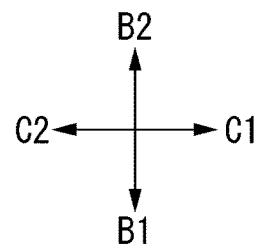

FIG. 30
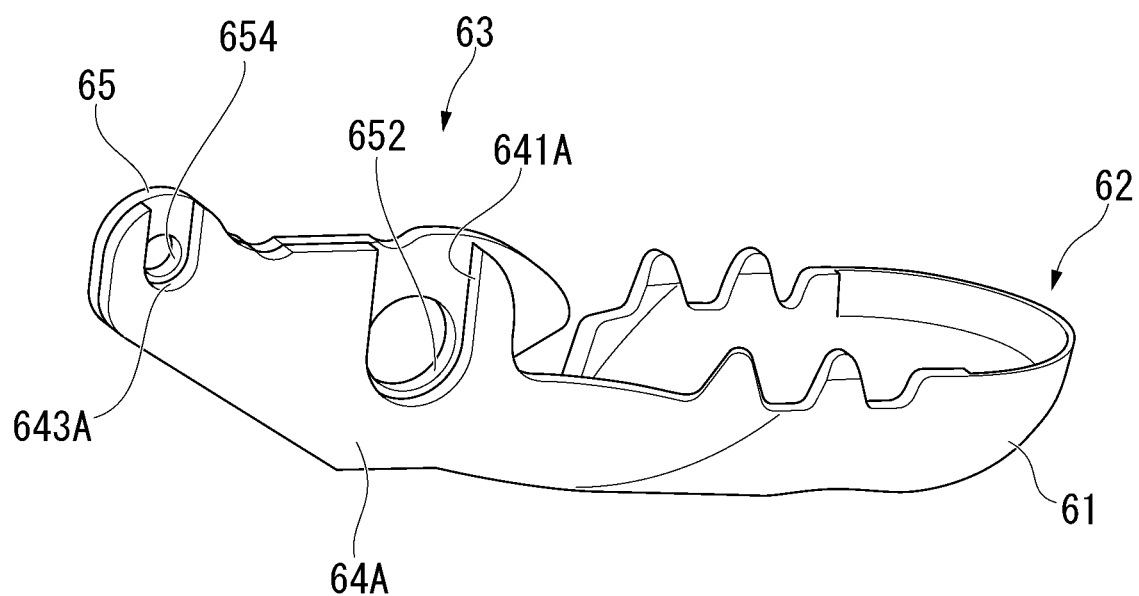
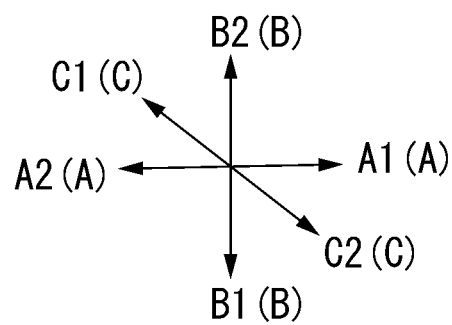

ENDOSCOPIC TREATMENT APPARATUS AND METHOD OF MANUFACTURING ENDOSCOPIC TREATMENT TOOL

CROSS-REFERENCE TO RELATED APPLICATIONS

This application claims the benefit of U.S. Provisional Patent Application No. 63/210,727 filed Jun. 15, 2021 entitled "Endoscopic Treatment Apparatus and Method of Manufacturing Endoscopic Treatment Tool", which is incorporated by reference herein in its entirety.

TECHNICAL FIELD

The present invention relates to a treatment instrument for an endoscope and a method of manufacturing a treatment instrument for an endoscope.

BACKGROUND OF THE INVENTION

Heretofore, endoscopic treatment tools such as biopsy forceps have been used in endoscopic treatment. Since an endoscopic treatment instrument such as a biopsy forceps is a disposal product (disposable product), it is desired to be low in cost while being high in performance.

BRIEF SUMMARY OF THE INVENTION

One embodiment of the present invention provides an endoscopic treatment device including a sheath, a rotation shaft extending in a width direction perpendicular to a longitudinal direction of the sheath, a forceps piece having a plate formed with a first opening through which the rotation shaft passes and a second opening having a width different from the width of the first opening, the forceps piece being rotatably supported about the rotation shaft through the first opening and the second opening, and a wire connected to a proximal end of the plate.

In some embodiments, the endoscopic treatment device further includes a pair of frame pieces attached to the tip of the sheath, wherein the rotation shaft engages with ends of the pair of frame pieces, and wherein the rotation shaft extends between the pair of frame pieces and the plate is disposed between the pair of frame pieces.

In some embodiments, the plate includes a first member having the first opening and a second member having the second opening and at least a portion of the first member and the second member is a bent region disposed between the first opening and the second opening such that the bent region is a boundary that overlaps when viewed from the width direction.

In some embodiments, the first opening is a first hole having a first inner diameter and the second opening is a second hole having a second inner diameter, the first inner diameter being larger than the second inner diameter. An inner peripheral surface of the second hole may be inside an inner peripheral surface of the first hole in a direction along a central axis of the first hole.

In some embodiments, a portion of the outer peripheral surface entire circumference of the second hole is outside the inner peripheral surface of the first hole in a direction along the central axis of the first hole.

In some embodiments, the second member is located closer to the central axis of the sheath than the first member.

In some embodiments, the first member includes a third hole having a third inner diameter proximal to the first hole and the second member includes a fourth hole having a fourth inner diameter proximal to the second hole, the third inner diameter being larger than the fourth inner diameter and a portion of the wire passes through the third hole and the fourth hole.

In some embodiments, the entire inner circumferential surface of the fourth hole is inside the inner circumferential surface of the third hole in a direction along a central axis of the third hole. A portion of an entire circumference of the inner circumferential surface of the fourth hole may be outside the inner circumferential surface of the third hole in a direction along the central axis of the third hole.

In some embodiments, the second inner diameter is larger than the third inner diameter and smaller than the first inner diameter.

In some embodiments, the forceps piece includes a first forceps piece and a second forceps piece, and the plates are a first plate and a second plate, the first plate including the first member and the second member and the second plate having a third member with a fifth hole through which the rotating shaft passes, and a sixth hole.

In some embodiments, the endoscopic treatment device further includes a fourth member, wherein the second plate is folded with a boundary region between the fifth hole and the sixth hole, and at least a part of the third member and the fourth member overlap each other when viewed from the width direction.

In some embodiments, the second member and the fourth member are disposed between the first member and the third member. A spacer may be disposed between the second member and the fourth member. The endoscopic treatment device may include a needle disposed at a tip of the spacer.

In some embodiments, the first member includes a third hole having a third inner diameter proximal to the first hole and the second member includes a fourth hole having a fourth inner diameter proximal to the second hole, the third inner diameter being smaller than the fourth inner diameter and wherein a portion of the wire passes through the third hole and the fourth hole.

In some embodiments, the first member has a third hole on the proximal side of the first hole and a portion of the wire passes through the third hole.

In some embodiments, at least one distal end of the pair of frame pieces includes an opening from an axis of rotation towards the tip of the forceps piece.

In some embodiments, the second member is located on the central axis side of the sheath from the first member and the first opening is a first hole having a first inner diameter, the second opening is a second hole having a second inner diameter, and the second inner diameter is larger than the first inner diameter.

In some embodiments, an inner peripheral surface entire circumference of the first hole is inside the inner peripheral surface of the second hole in a direction along the central axis of the second hole.

In some embodiments, a portion of the outer peripheral surface entire circumference of the first hole is outside the inner peripheral surface of the second hole in a direction along the central axis of the second hole.

In some embodiments, the first member includes a third hole having a third inner diameter proximal to the first hole, the second member includes a fourth hole having a fourth inner diameter proximal to the second hole, the fourth inner diameter is larger than the third inner diameter, and a portion of the wire passes through the third hole and the fourth hole.

In some embodiments, the entire circumference of the inner circumferential surface of the third hole is inside the inner circumferential surface of the fourth hole in the direction along the central axis of the third hole.

In some embodiments, a part of the entire circumference of the inner circumferential surface of the third hole is outside the inner circumferential surface of the fourth hole in the direction along the central axis of the third hole.

Another embodiment of the present invention provides a method of manufacturing an endoscopic treatment device. The method includes drilling a first hole and a second hole in a second surface of a plate material, the second surface of the plate material being opposite a first surface of the plate material, performing surface compressing on the first surface of the plate material, folding the first surface of the plate member internally such that the first hole and the second hole are folded to face each other, and performing surface pushing on the second surface of the plate member.

In some embodiments, the drilling includes drilling the first hole and the second hole from the first surface toward the second surface.

In some embodiments, the pressing includes forming a cup shape from the plate material and the surface pressing process is performed on the second surface after the cup shape is formed by the pressing process.

In some embodiments, the drilling further includes forming a third hole and a fourth hole between the first surface and the second surface and the pressing step further includes bending the plate member such that the third hole and the fourth hole face each other.

In some embodiments, the third hole and the fourth hole are formed via drilling from the first surface toward the second surface.

In some embodiments, subsequent to the drilling, a face casting step is performed such that the pressing is performed subsequent to the face casting process, and the surface pushing process is performed subsequent to the pressing step.

BRIEF DESCRIPTION OF THE DRAWINGS

FIG. 27 is a perspective view of the slider first part member of FIG. 22 and a slider second part member.

FIG. 28 is an illustration showing the manufacturing process of the first forceps piece of FIG. 9.

FIG. 30 is a diagram showing a modification of the first member of the first forceps piece of FIG. 9.

DETAILED DESCRIPTION OF THE INVENTION

Figure 1:
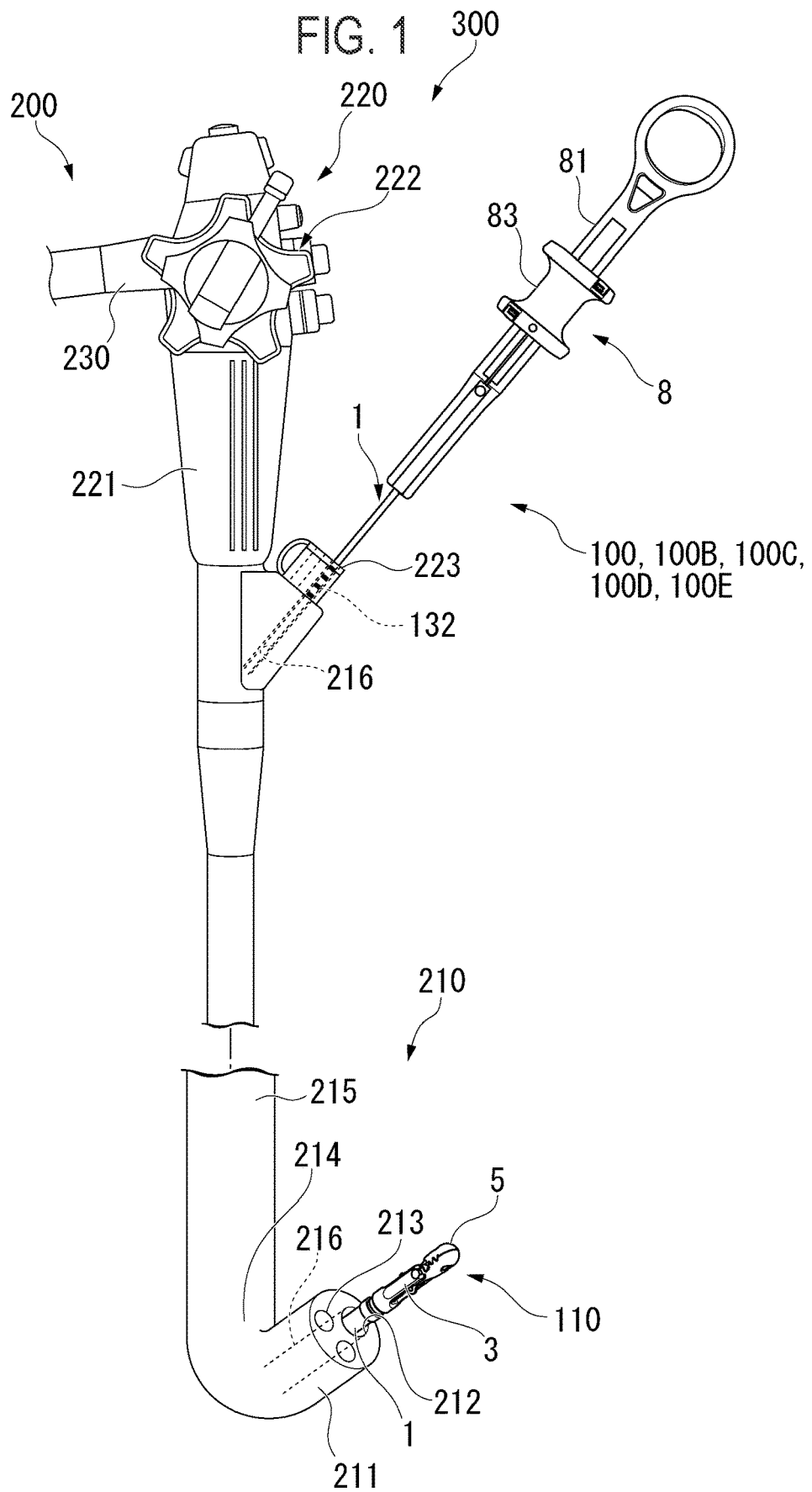
FIG. 1 a right side view of an endoscope treatment system according to a first embodiment.

An endoscope treatment system 300 comprising an endoscope treatment device 100 according to exemplary embodiments of the present invention will be described with reference to FIGS. 1 to 46. FIG. 1 is an overall view of the endoscopic treatment system 300.

Endoscopic Treatment System 300

The endoscope treatment system 300 may include an endoscope treatment device 100 and an endoscope 200 as shown in FIG. 1. The endoscope treatment device 100 is used by being inserted into the endoscope 200. The endoscope 200 may be a flexible endoscope and includes an insertion portion 210 and an operation portion 220. The operation portion 220 may be disposed at distal end of the endoscope 200 and may be configured to be inserted into a body of a patient. The operation portion 220 may be disposed at a proximal end of the endoscope 200. The endoscope 200 may include a universal cord 230 attached to the operation portion 220.

Referring to FIG. 1, the insertion portion 210 may be an elongated member insertable into a passageway of a patient. In some embodiments, insert 210 has a distal end or tip portion 211, a curved portion 214, and a flexible portion 215. A tip portion 211, a curved portion 214, a flexible portion 215, may be connected in series at the distal end of endoscope 200, with the tip portion 211 being distal to the curved portion 214 and the flexible portion 215. A channel 216 for inserting the endoscopic treatment device 100 may be provided inside the insertion portion 210. The tip portion 211 may include a distal end opening 212 and an imaging unit 213. Imaging unit 213 may be disposed or incorporated into endoscope 200. For example, imaging unit 213 may be located at or proximate tip portion 211.

The imaging unit may include an image pickup device such as a CCD or a CMOS, for example, and can pick up an image of a region or area to be treated. The curved portion 214 may be configured to bend in accordance with the operation of the operation portion 220 by the user. In some embodiments, the flexible portion 215 is a flexible tubular portion.

In some embodiments, the operation portion 220 is connected to the flexible portion 215. The operation portion 220 includes a grip 221, an input unit 222, and a forceps port 223. The grip 221 may be a member supported by a user. Input unit 222 may be configured to cause bending of curved portion 214. For example, a user may interact with input unit 222 to cause bending of the curved portion 214. In some embodiments, the forceps port 223 is a proximal opening of the channel 216.

In some embodiments, the universal cord 230 connects the endoscope treatment device 100 and an external device (e.g., a display device or camera). The universal cord 230 may be coupled to an imaging cable and/or an optical fiber cable or the like for outputting an image captured by the imaging unit 213.

Figure 2:
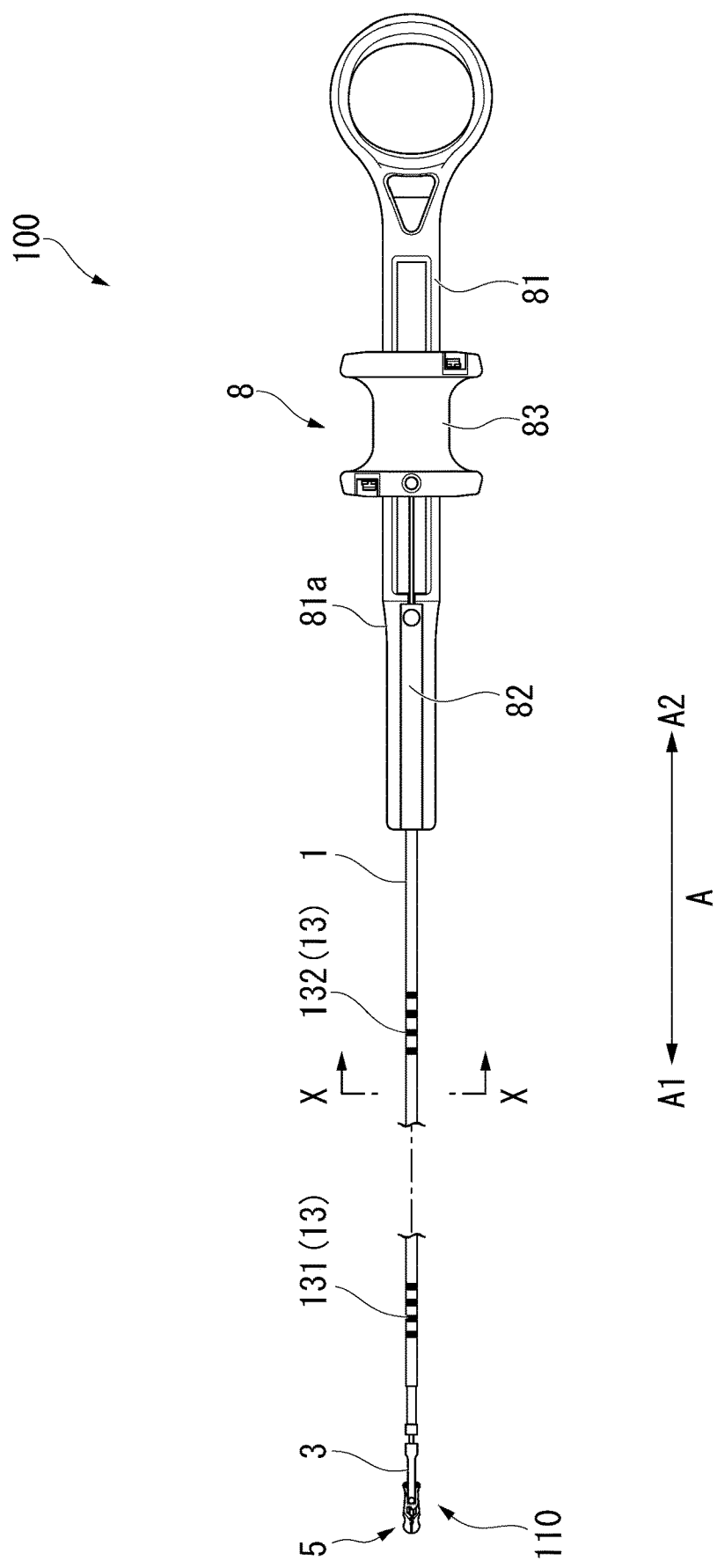
FIG. 2 is a front view showing a treatment device used with the endoscope treatment system of FIG. 1.

Referring to FIG. 2, an overall view illustrating an endoscope treatment device 100 is provided. Endoscope treatment device 100 (also referred to as a treatment instrument 100) includes a sheath 1, an operation wire 2 (see FIG. 4A), a support member 3, a needle member 4 (see FIG. 4A), a forceps (jaw) 5, and an operation unit 8. In the following description, in the longitudinal direction "A" of the endoscopic treatment device 100, the end to be inserted into the body of the patient is referred to as a "distal side A1", and the end controlled by a user is referred to as a "proximal side A2". In some embodiments, operation unit 8 is disposed at proximal side A2.

Figure 3:
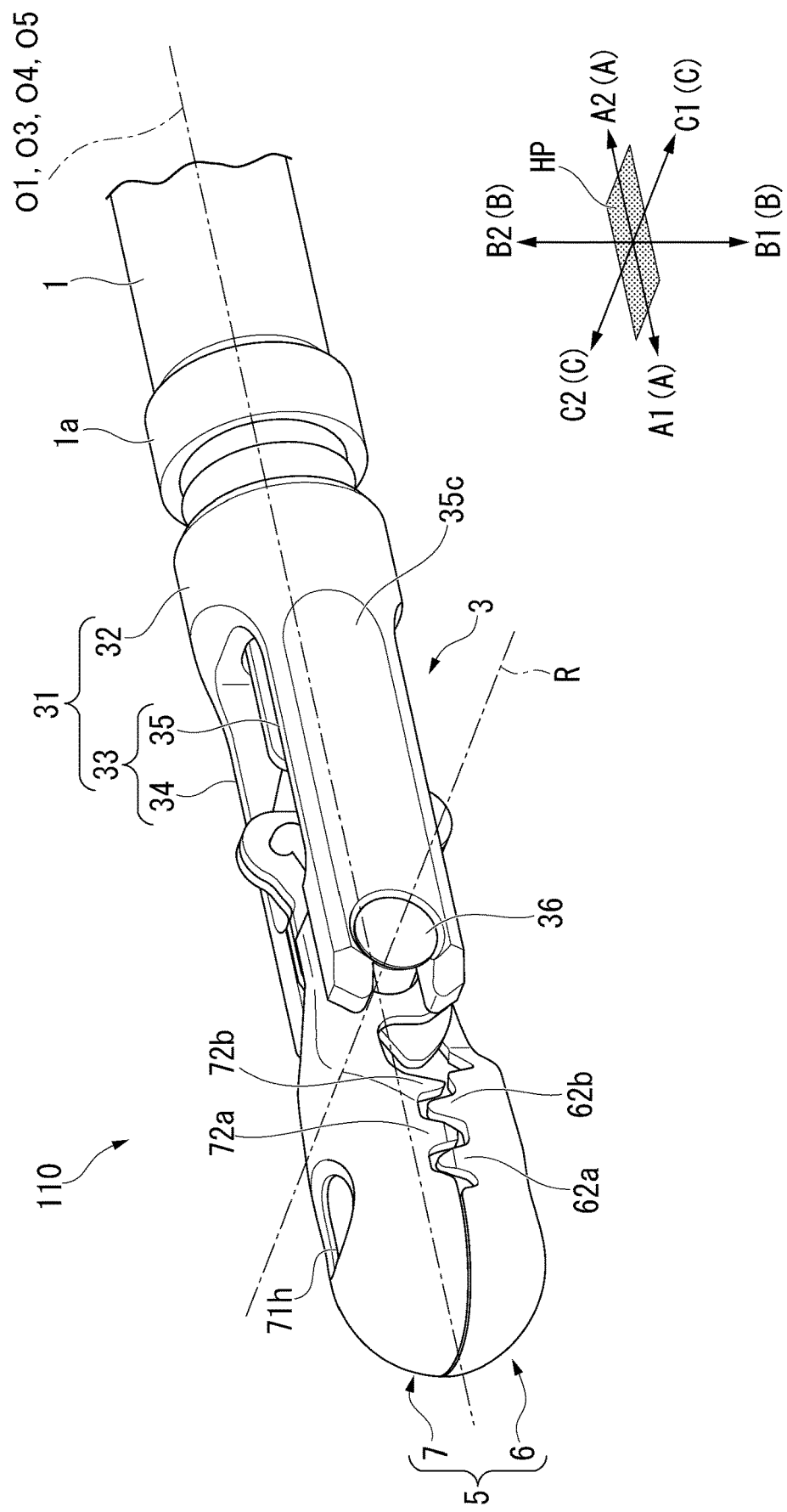
FIG. 3 a perspective view of the distal end of the treatment device of FIG. 2 in the closed position.

FIGS. 3 and 4 are perspective views of the distal end of the endoscopic treatment device 100. At the distal end of the endoscopic treatment device 100, a support member 3, a needle member 4, and forceps 5 are provided. The forceps 5 and the needle member 4 are supported by the support member 3. In some embodiments, the forceps 5 are rotatably supported by the support member 3. The support member 3, the needle member 4, and the forceps 5 may comprise a treatment portion 110 for treating an affected portion.

In the following description, the direction in which the forceps 5 is opened and closed is defined as the "opening/closing direction B" or the "vertical direction B". Further, the direction perpendicular to the longitudinal direction A and the opening and closing direction B is referred to as "width direction C" or "left-right direction C". A plane horizontal to the longitudinal direction A and the width direction C is referred to as a "horizontal plane HP". The horizontal plane in the longitudinal direction A and the opening/closing direction B is defined as the "vertical plane VP".

Sheath 1

Referring to FIGS. 1, 3-4A and 22, endoscope treatment device 100 may include sheath 1. In some embodiments, the sheath 1 is a long flexible member configured to extend from the distal end 1a to the proximal end 1b. The sheath 1 may have an outer diameter and may be configured to be inserted into the channel 216 of the endoscope 200. Sheath 1 may be configured to extend along channel 216. In some embodiments, when the sheath 1 is inserted into the channel 216, the distal end 1a of the sheath 1 can protrude and retract from the distal end opening 212 of the channel 216. The sheath 1 may have an insulating property. For example, the sheath 1 may be comprised of insulating material.

Figure 5:
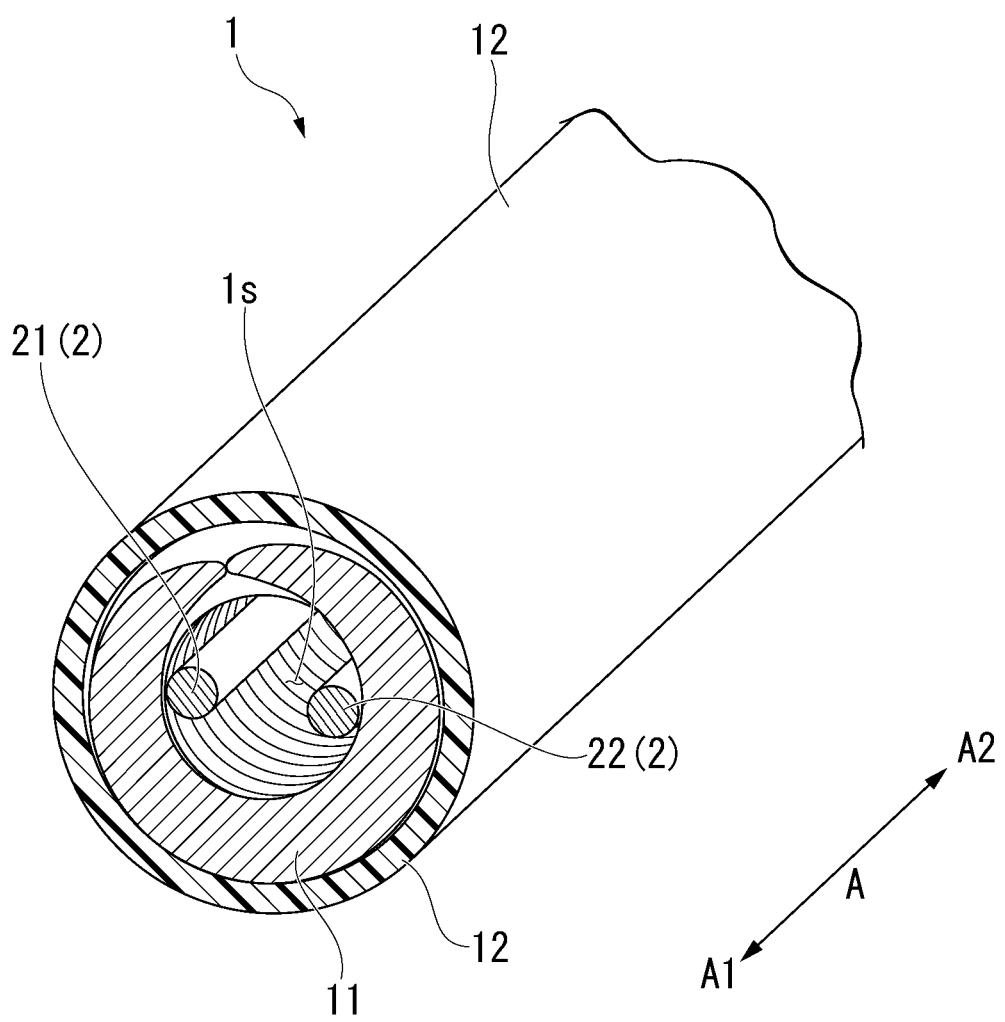
FIG. 5 is a cross-sectional view of a sheath of the treatment device along the X-X axis shown in FIG. 2.

FIG. 5 is a cross-sectional view of the sheath 1 taken along the line X-X shown in FIG. 2. The sheath 1 may include a coil sheath 11, which may be formed by spirally winding a metal wire. Sheath 1 may further include a covering tube 12 configured to extend over and cover the outer peripheral surface of the coil sheath 11. In some embodiments, the sheath 1 may house operation wire 2. The operation wire 2 may be inserted through and disposed within the inner space 1s of the sheath 1.

As shown in FIG. 2, covering tube 12 may include markings 13 provided on the outer surface of the covering tube 12. The marking 13 may include a first marking 131 provided in the vicinity of the distal end 1a of the sheath 1, and a second marking 132 provided in the vicinity of the proximal end 1b of the sheath 1. In some embodiments, the first marking 131 is provided at a position near the treatment portion 110 on the distal end side A1. When removing the endoscopic treatment device 100 from the channel 216 of the endoscope 200, the user can recognize that the treatment portion 110 is approaching the forceps port 223 by checking the first marking 131. In some embodiments, the user can slowly discharge the treatment portion 110, which is holding or securing tissue or the like. The user may slowly discharge the treatment portion 110 via, for example, the forceps port 223.

In some embodiments, the second marking 132 is provided at a position close to the operation unit 8, such as proximal end side A2 side. Specifically, as shown in FIG. 1, the second marking 132, when the treatment portion 110 protrudes from the distal end opening 212 of the endoscope 200, is provided at a position to be inserted into the channel 216 from the forceps port 223. The user can recognize the position of the treatment portion 110 with respect to the distal end opening 212 by confirming the position of the second marking 132 with respect to the forceps port 223. Therefore, the user can slowly project or extend the treatment portion 110 from the distal end opening 212 of the endoscope 200.

In some embodiments, operation wire 2 is a metal wire and is inserted through the inner space is of the sheath 1. The distal end of the operation wire 2 may be connected to the forceps 5, and the proximal end of the operation wire 2 may be connected to the operation unit 8. The operation wire 2 may include a first operation wire 21 and a second operation wire 22, as shown in FIG. 5. The first operation wire 21 and the second operation wire 22 may be inserted through the inner space ls of the sheath 1.

Support Member 3

Figure 6:
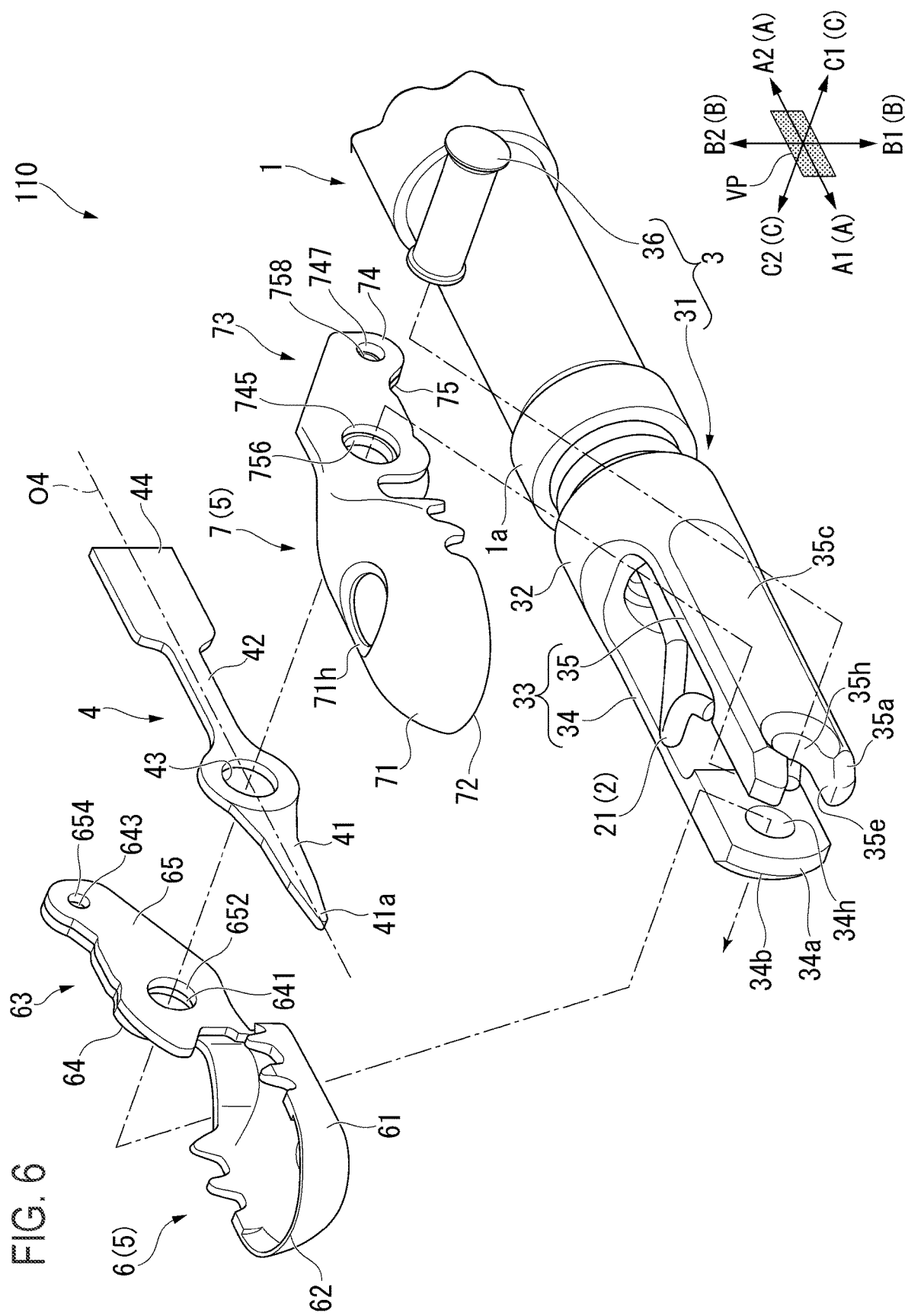
FIG. 6 an exploded view of the distal end of the treatment device of FIG. 2.

FIG. 6 is an exploded view of the treatment portion 110. In some embodiments, the support member 3 is attached to the distal end 1a of the sheath 1 and supports the needle member 4 and the forceps 5. Support member 3 may include a frame 31 and a pin (rotation shaft, rotation shaft member) 36. As shown in FIG. 6, the needle member 4 and the forceps 5 are supported by the pin 36 attached to the frame 31.

Figure 7:
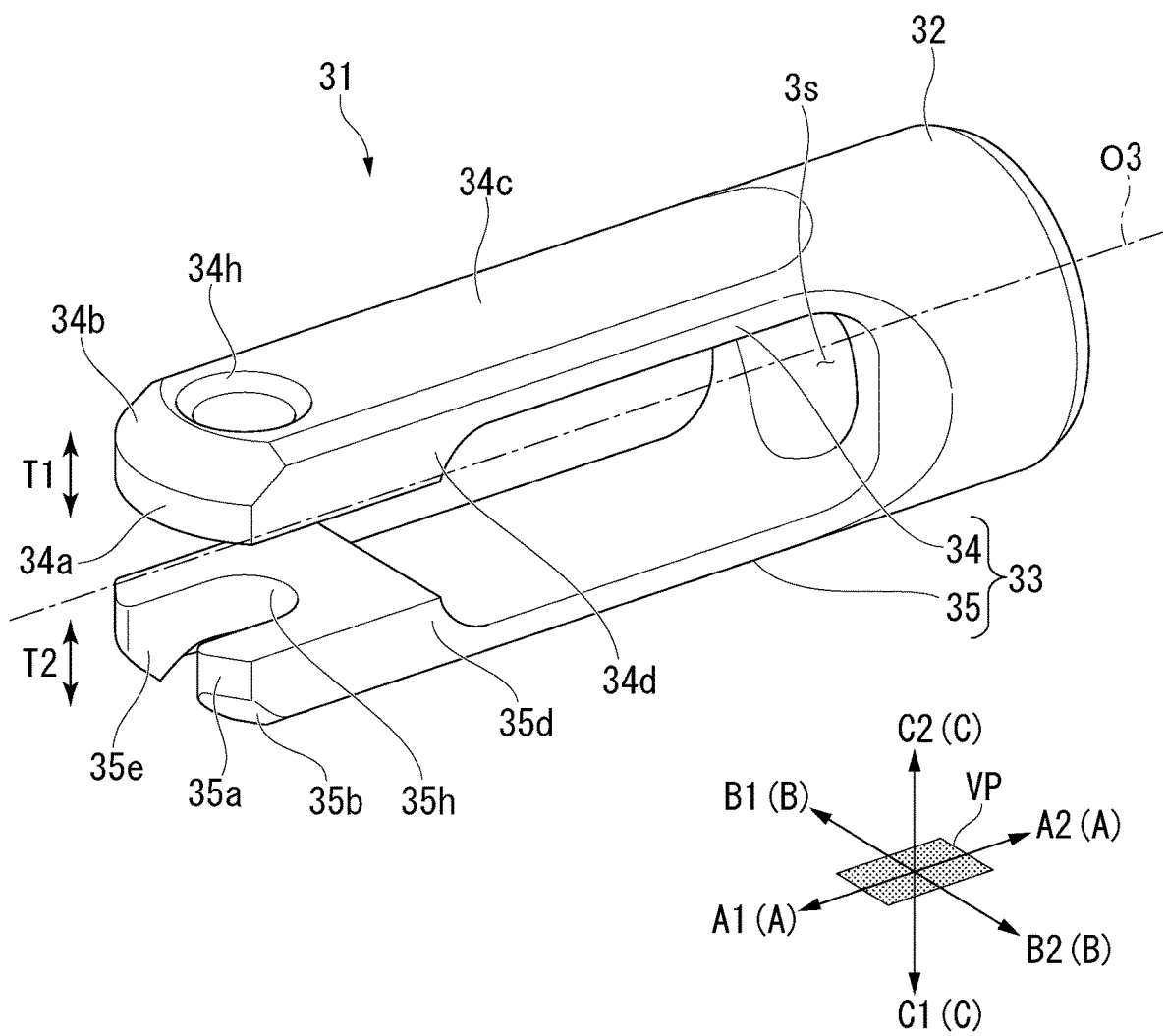
FIG. 7 is a perspective view of a frame of a support member of the treatment device of FIG. 2.

FIG. 7 is a perspective view of the frame 31. In some embodiments, frame 31 is formed in a substantially U-shaped shape by a metal such as stainless steel. Frame 31 includes a support body 32 formed in a cylindrical shape, and a pair of frame pieces 33 (first frame piece 34 and the second frame piece 35).

Figure 8:
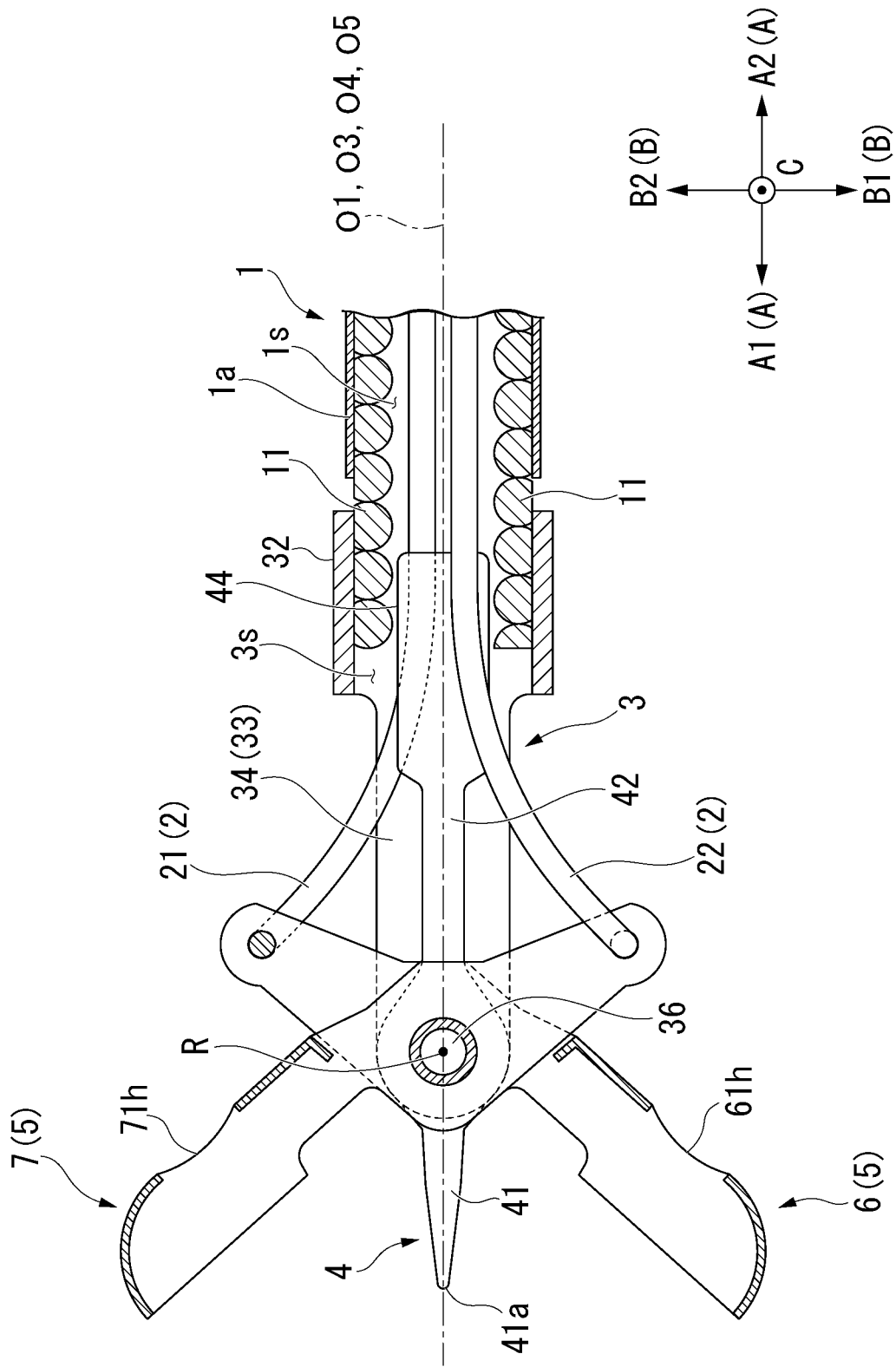
FIG. 8 is a cross-sectional view of the distal end of the treatment device of FIG. 2 with a needle member.

FIG. 8 is a cross-sectional view of the treatment portion 110 including the needle member 4. In some embodiments, the support body 32 is fixed to the distal end 1a of the sheath 1 by caulking or a substantially similar method. Center axis O3 in the longitudinal direction A of the support member 3 may substantially coincide with the center axis O1 in the longitudinal direction A of the sheath 1. In some embodiments, the inner space 3s of the support body 32 communicates with the inner space is of the sheath 1. Operation wire 2 may be inserted into the inner space 3s of the support body 32.

FIG. 7 shows a pair of frame pieces 33 (first frame piece 34 and the second frame piece 35). Frame pieces 33 may be provided to protrude from the support body 32 to the distal end side A1. The first frame piece 34 and the second frame piece 35 are provided evenly on both sides in the width direction C across the central axis O3. The first frame piece 34 and the second frame piece 35, except for the notch 35e (described later), may be symmetrical shape with respect to the vertical plane VP passing through the central axis O3.

In some embodiments, the first frame piece 34 is formed in a flat plate shape extending in the longitudinal direction A. Plate thickness direction T1 of the first frame piece 34 may be substantially coincident with the width direction C. Base end side A2 of the first frame piece 34 may be continuous with the support body 32. A semicircular first distal end portion 34a is formed on the distal end side A1 of the first frame piece. Outside the width direction C of the first distal end portion 34a, the first tapered surface 34b is formed.

In some embodiments, outside the width direction C of the first frame piece 34, the first outer surface 34c is formed substantially horizontal to the vertical plane VP. The first outer surface 34c may be formed from the distal end side A1 of the first frame piece 34 to the proximal end side A2. Inside the width direction C of the first frame piece 34, first thick portion 34d is formed in the distal end side A1 and the thickness of first thick portion 34d is long the plate thickness direction T1. The first thick portion 34d may protrude inward in the width direction C as compared with the other portions of the first frame piece 34.

In some embodiments, the first frame piece 34, except for first thick portion 34d, is substantially thin. Therefore, the first frame piece 34 is easily bent in the width direction C due to the stiffness in the width direction C being low. Even when a load in the width direction C is applied to the forceps 5, the first frame piece 34 bends in the width direction C, thereby preventing the forceps 5 from being damaged due to the concentration of stress on the forceps 5.

In some embodiments, the first through hole 34h penetrating in the thickness direction T1 is formed at the distal end side A1 of the first frame piece 34. The first through hole 34h may be open to the outside and may extend through first outer surface 34c in the width direction C. Further, the first through hole 34h may be open to the inside and may extend through first thick portion 34d in the width direction C In some embodiments, the second frame piece 35 is formed in a flat plate shape extending in the longitudinal direction A. Plate thickness direction T2 of the second frame piece 35 is substantially coincident with the width direction C. Base end side A2 of the second frame piece 35 may be continuous with the support body 32. A semicircular second distal end portion 35a is formed on the distal end side A1 of the second frame piece. Outside the width direction C of the second distal end portion 35a, the second tapered surface 35b is formed. Outside the width direction C of the second frame piece 35, a second outer surface 35c substantially horizontal to the vertical plane VP is formed. The second outer surface 35c is formed from the distal end side A1 to the proximal end side A2 of the second frame piece 35.

Inside the width direction C of the second frame piece 35, the thickness of the plate thickness direction T2 in the distal end side A1 is thick and includes the second thick portion 35d. The second thick portion 35d protrudes inward in the width direction C as compared with other portions of the second frame piece 35. In some embodiments, the thickness of the plate thickness in direction T2 of the second frame piece 35, except for the portion where the second thick portion 35d is formed, is thin. Therefore, the second frame piece 35 is easily bent in the width direction C due to the stiffness in the width direction C being low. Even when a load is applied to the forceps 5 in the width direction C, the second frame piece 35 bends in the width direction C, thereby preventing the forceps 5 from being damaged due to the concentration of stress on the forceps 5.

In some embodiments, the second through hole 35h extends in the thickness direction T2 at the distal end side A1 of the second frame piece 35. The second through hole 35h may be open to the outside and extend in the direction of the width direction C through the second outer surface 35c. The second through hole 35h may penetrate the second thick portion 35d and open inward in the width direction C. In some embodiments, a notch or notched portion 35e communicating with the second through hole 35h is formed on the distal end side A1 of the second frame piece 35. Notch 35e may penetrate the second frame piece 35 in the thickness direction T2.

Referring to FIGS. 6-8, pin 36 is formed in a substantially cylinder by a metal such as stainless steel. Pin 36 may be attached to the frame 31 and may be engaged with or extend through the first through hole 34h and the second through hole 35h. Since the notch 35e is formed in the second frame piece 35, the pin 36 is easily engaged with the first through hole 34h and the second through hole 35h at the time of assembling the treatment portion 110.

Needle Member 4

In some embodiments, needle member 4 is formed in a substantially flat plate shape extending in the longitudinal direction A by a metal such as stainless steel. The needle member 4 may be disposed so as to be sandwiched between the first forceps piece 6 and the second forceps piece 7, which will be described later. The needle member 4 may include a needle 41 and a spacer 42. The needle 41 is provided on the distal end side A1 of the needle member 4, and the distal end side A1 has a sharp portion 41a. The sharp portion 41a may be used for the treatment of biological tissues.

In some embodiments, needle 41 includes spacer 42. Spacer 42 may be provided on the proximal end side A2 of the needle 41 and may include a through hole 43 through which the pin 36 penetrates. The proximal end of the spacer 42 may include a wide engagement portion 44 in the opening and closing direction B. Needle member 4 is rotatably supported by the pin 36 about the center axis R of the pin 36. For example, pin 36 may be the rotational center of needle member 4. However, as shown in FIG. 8, the engagement portion 44 of the spacer 42 may be inserted into the inner space is of the sheath 1 and may engage the coil sheath 11 thereby resulting in the needle member 4 not rotating about the central axis R of the pin 36.

Figure 4A:
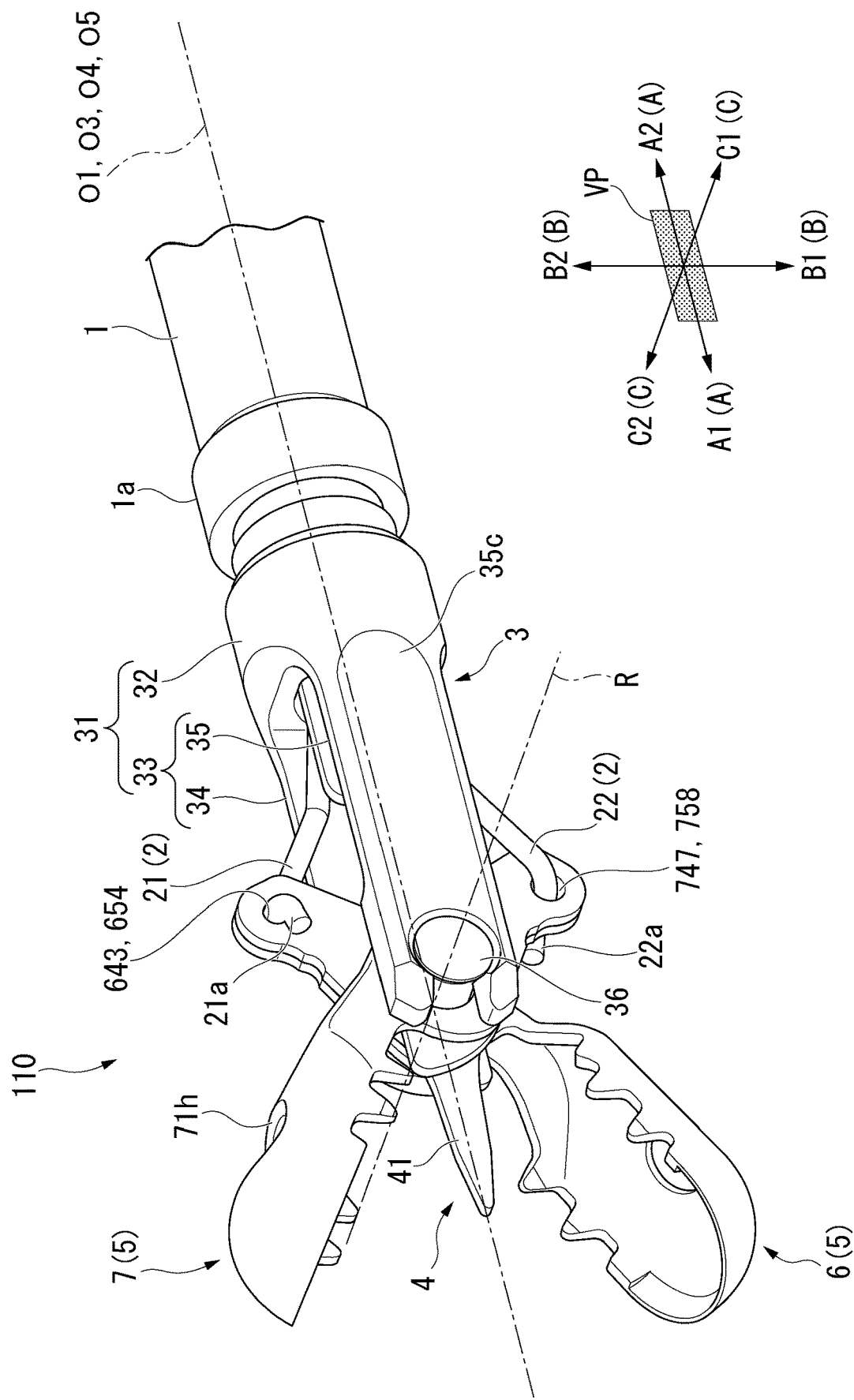
FIG. 4A is a perspective view of the distal end of the treatment device of FIG. 2 in the open position.

As shown in FIGS. 3 and 4A, when the forceps 5 is opened, the needle 41 of the needle member 4 is exposed. On the other hand, when the forceps 5 are closed, the needle 41 of the needle member 4 is disposed in an area surrounded by the forceps 5, and thus is not substantially exposed.

Forceps (Jaws) 5

The forceps (jaw) 5 may be an instrument for collecting biological tissue. The forceps 5 may be formed of a metal material such as stainless steel and may include a first forceps piece 6 and a second forceps piece 7. The first forceps piece 6 may be rotatably supported by the pin 36 about the center axis R of the pin 36. In some embodiments, the first forceps piece 6 is operated by a first operation wire 21 connected to the proximal end side A2 of the first forceps piece 6. The second forceps piece 7 may be rotatably supported by the pin 36 about the center axis R of the pin 36. The second forceps piece 7 may be operated by a second operation wire 22 coupled to the proximal side A2 of the second forceps piece 7.

In some embodiments, the first forceps piece 6 and the second forceps piece 7 are disposed so as to be symmetrical with respect to the central axis O5 in the longitudinal direction A of the forceps 5. The central axis O5 in the longitudinal direction A of the forceps 5 may substantially coincide with the central axis O1 in the longitudinal direction A of the sheath 1. In some embodiments, one of the first forceps piece 6 and the second forceps piece 7 is fixed to the support member 3, and only the other may be rotatably supported by the support member 3. The forceps 5 may further have a linkage mechanism and may be operated by a single operation wire connected to the linkage mechanism.

In the following description, the direction in which the first forceps piece 6 opens is referred to as "lower side B1" in the opening/closing direction B, and the direction in which the second forceps piece 7 opens is referred to as "upper side B2" in the opening/closing direction B. Further, "right side C1" in the width direction C in the direction facing the right looking at the proximal end side A2 from the distal end side A1, and "left side C2" in the width direction C in the direction facing the left.

First Forceps Piece 6

Figure 9:
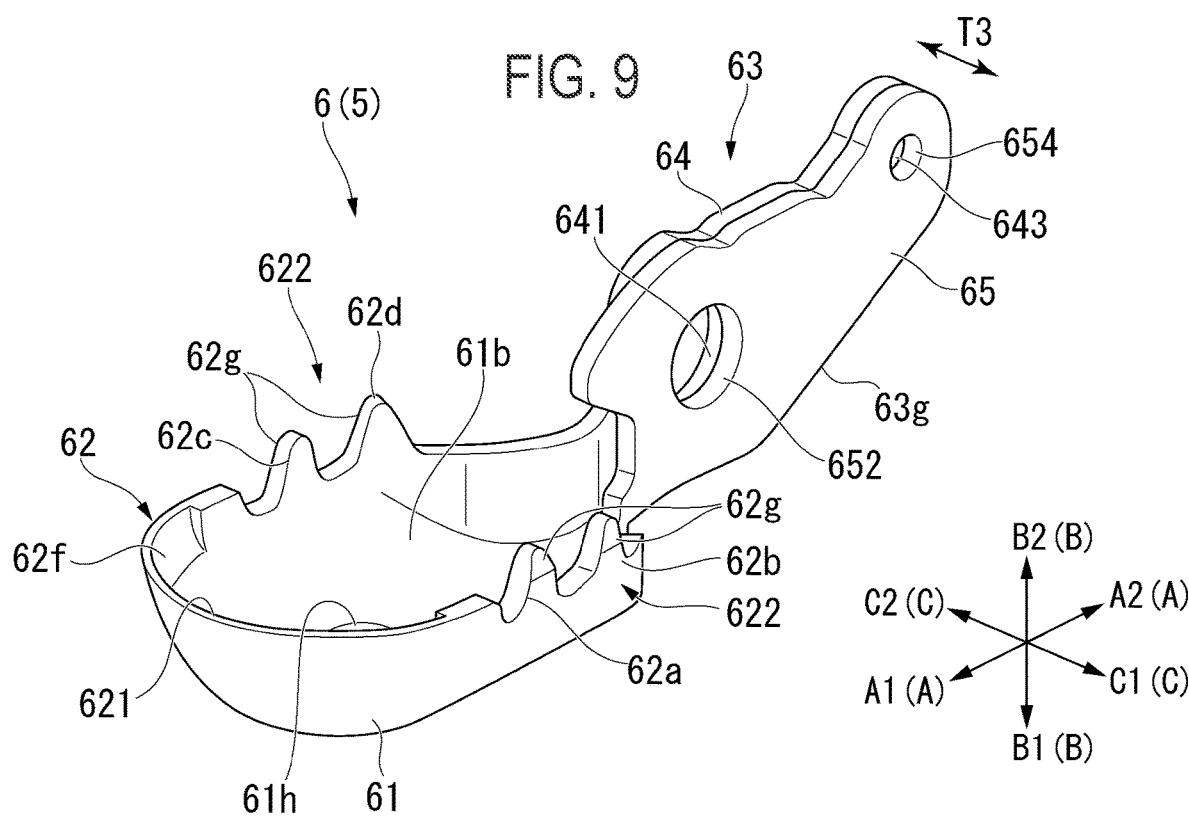
FIG. 9 is a perspective view of a first forceps piece of the forceps of the treatment device of FIG. 2.

FIG. 9 is a perspective view of the first forceps piece 6. The first forceps piece 6 may be formed mainly by press working from a single flat plate. The first forceps piece 6 has a first cup 61 provided on the distal end side A1, a first arcuate edge 62, and a first plate 63. The first cup 61 may be formed in a substantially hemispherical shape, and may open towards the second forceps piece 7 side (upper side B2) in the opening/closing direction B. The first cup 61 may have a hole 61h penetrating in the opening and closing direction B and in the vicinity of the center of the concave bottom portion 61b.

In some embodiments, the first arcuate edge 62 is an opening edge of the first cup 61 is formed in a substantially arcuate shape. The first arcuate edge 62 has a first tip portion 621 and a first sawtooth portion 622. The first tip portion 621 is an edge portion provided on the tip side A1. A surface striking portion 62f may be provided inside the first tip portion 621 such as in the vicinity of the first tip portion 621. The first tip portion 621 may be formed in a thinner blade shape than the process portions of the first arcuate edge 62. Therefore, the first tip portion 621 may be configured for and suitable for cutting biological tissue.

In some embodiments, the first sawtooth portion 622 is a serrated concavity provided on both sides in the width direction C in the first arcuate edge 62. The first saw tooth portion 622 has a first front right sawtooth 62a, a first rear right sawtooth 62b, a first front left sawtooth 62c, and a first rear left sawtooth 62d.

The first front right serrate 62a and the first rear right sawtooth 62b are sawteeth provided on the right side C1 at the first arcuate edge 62. The first front right serrate 62a and the first rear right sawtooth 62b are sawteeth protruding to the upper side B2. The first front right sawtooth 62a and the first rear right sawtooth 62b are arranged in the longitudinal direction A, and the first front right sawtooth 62a is arranged on the distal side A1 of the first rear right sawtooth 62b. The first front right sawtooth 62a and the first rear right sawtooth 62b are provided with a surface pressing portion 62g on the right side C1 (outside) of the most protruding convex portion. Surface pressing portion 62g convex tip side is inclined inwardly. Therefore, it is possible to prevent the first front right sawtooth 62a and the first rear right sawtooth 62b from erroneously damaging living tissue or other objects.

The first front left sawtooth 62c and the first rear left sawtooth 62d are sawteeth provided on the left side C2 at the first arcuate edge 62. The first front left sawtooth 62c and the first rear left sawtooth 62d are saw teeth protruding to the upper side B2. The first front left sawtooth 62c and the first rear left sawtooth 62d are arranged in the longitudinal direction A, and the first front left sawtooth 62c is arranged on the distal side A1 of the first rear left sawtooth 62d.

The first front left sawtooth 62c and the first rear left sawtooth 62d are provided with a surface pressing portion 62g on the left side C2 (outside) of the most protruding convex portion. Surface pressing portion 62g convex tip side is inclined inwardly. Therefore, it is possible to prevent the first front left sawtooth 62*c* and the first rear left sawtooth 62*d* from erroneously damaging the living tissue or the like.

The first plate (left plate) 63 is provided on the base end side A2 of the first cup 61 and is formed in a substantially plate shape. Plate thickness direction T3 of the first plate 63 is substantially coincident with the width direction C. As shown in FIG. 6, the first plate 63 is disposed adjacent to the needle member 4 on the left side C2 of the needle member 4.

As shown in FIG. 9, the first plate 63 includes a first member 64 and a second member 65. The first member 64 and the second member 65 may be formed by folding one sheet of plate material and may be disposed adjacent to each other in the width direction C. In the following description, the processing for forming the first member 64 and the second member 65 adjacent by folding a single plate material is referred to as the folding process. A bent portion 63*g* is formed on the lower side B1 of the first plate 63, i.e., the first member 64 and the second member 65. The first plate 63 has a high rigidity as compared with the case of being formed of a single plate material.

The first member (left outer plate) 64, the left side C2 of the second member 65 (outer), is disposed adjacent to the second member 65. The first member 64 has a first hole (first opening) 641 and a third hole (third opening) 643. The first hole 641 penetrates the first member 64 in the thickness direction T3, a through hole having a first inner diameter R1 (see FIG. 19). The third hole 643 penetrates the first member 64 in the thickness direction T3, a through hole having a third inner diameter R3 (see FIG. 19).

The second member (left inner plate) 65 is disposed adjacent to the first member 64 on the right side C1 (inner side) of the first member 64. The second member 65 has a second hole (second opening) 652 and a fourth hole (fourth opening) 654. The second hole 652 penetrates the second member 65 in the thickness direction T3, a through hole having a second inner diameter R2 (see FIG. 19). The fourth hole 654 is a through hole having a fourth inner diameter R4 penetrating the second member 65 in the thickness direction T3 (see FIG. 19). , The region between the first hole (first opening) 641 and the second hole (second opening) 652 is bent as a boundary between the first member 64 and the second member 65.

As shown in FIG. 6, the pin 36 can be inserted into the first hole 641 and the second hole 652. The first plate 63 is rotatably supported by the pin 36 and the center axis R of the pin 36 for inserting the first hole 641 and the second hole 652 may serve as the rotational center of the first plate 63. The first hole 641 and the second hole 652 through which the pin 36 is inserted may be larger than the third hole 643 and the fourth hole 654.

As shown in FIG. 4A, the first operation wire 21 can be inserted into the third hole 643 and the fourth hole 654. The first plate 63 is operated by a first operation wire 21 connected to the third hole 643 and the fourth hole 654. The distal end 21*a* of the first operation wire 21 that has passed through the third hole 643 and the fourth hole 654 is bent and fixed toward the central axis O5, and therefore, biological tissue or the like is hardly damaged.

Figure 4B:
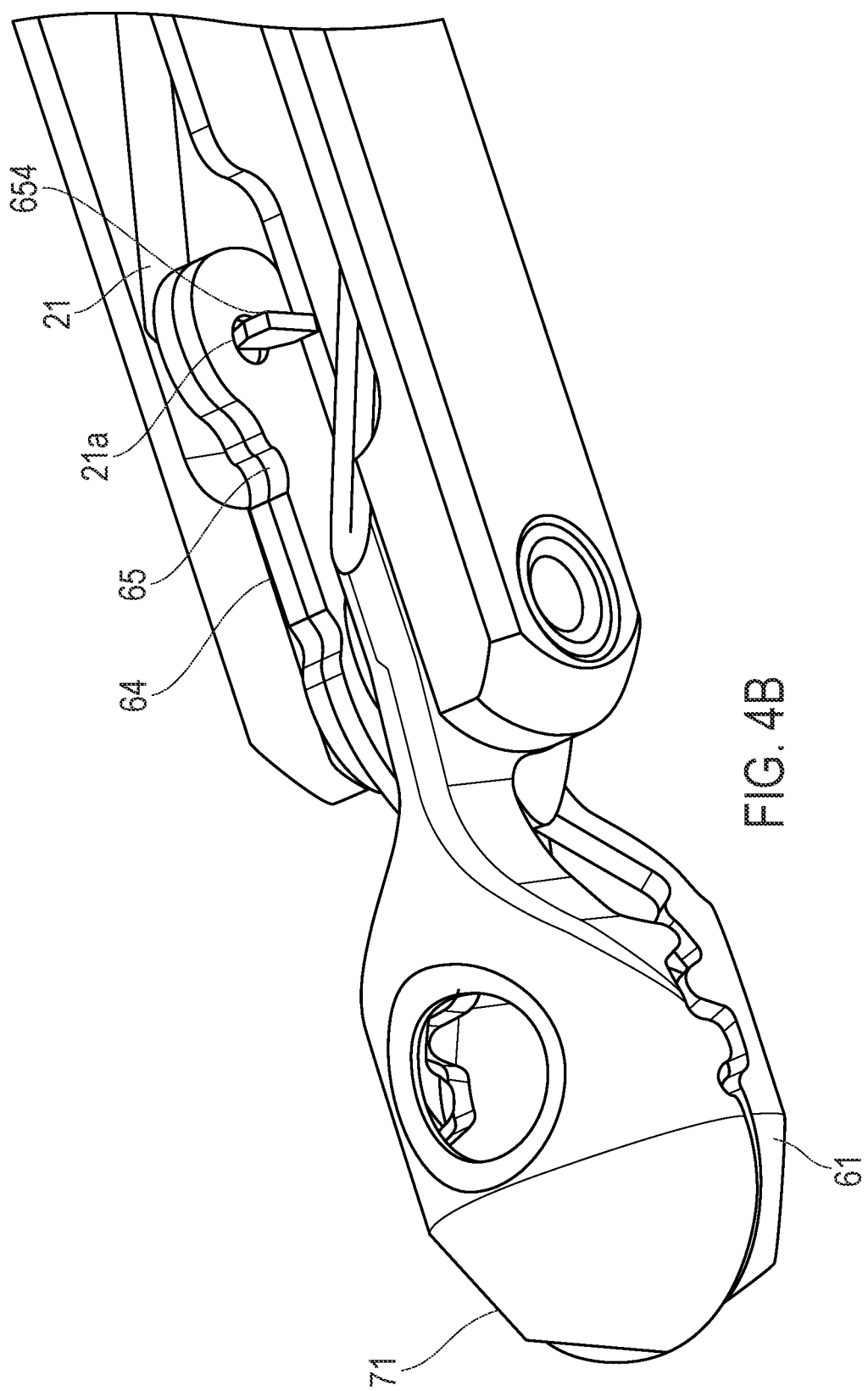
FIG. 4B is a top perspective view of the distal end of the treatment device of FIG. 2 in the closed position and having a flat distal end of an operation wire.
Figure 4C:
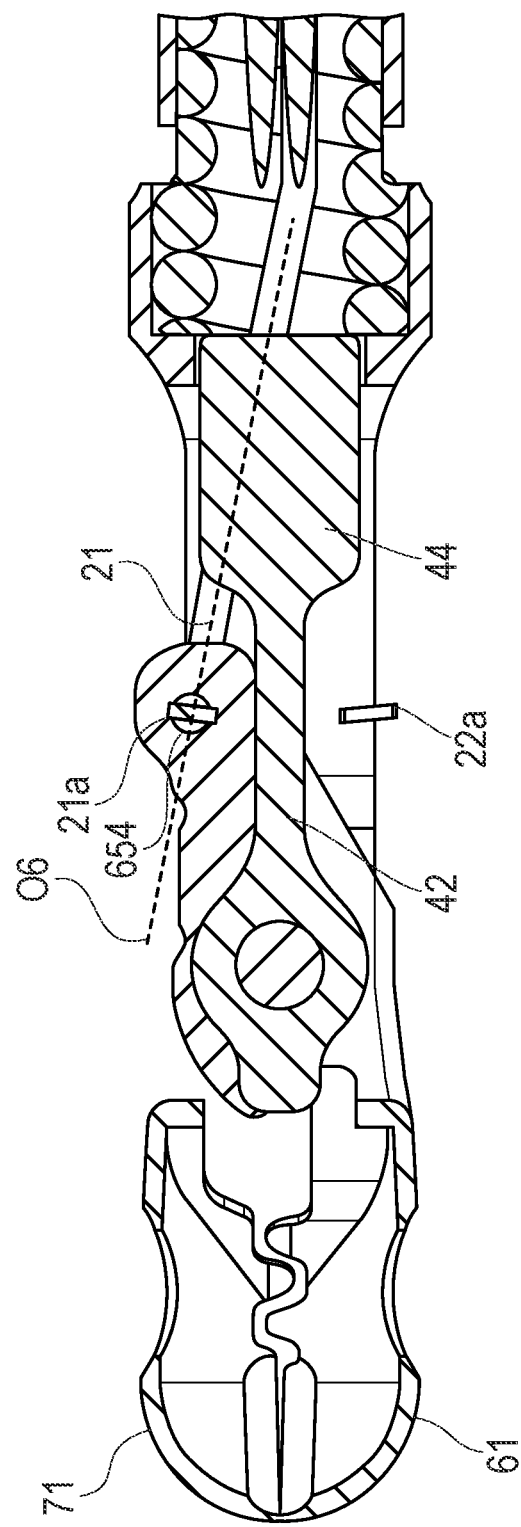
FIG. 4C is a cross-sectional view of the treatment device of FIG. 4B.

As shown in FIGS. 4A-4C, the distal end 21*a* may prevent first operation wire 21 from inadvertently detaching from forceps 5, such as by slipping out of third hole 643 and/or fourth hole 654. In some embodiments, distal end 21*a* is configured to be flat in shape. For example, the distal end 21*a* may have a flat shape formed by compressing (e.g., crushing) distal end 21*a*. In some embodiments, the distal end 21*a* is configured to be a flat shape to prevent the distal end 21*a* from inadvertently slipping through or out of the third hole 643 and/or the fourth hole 654. For example, crushing distal ends 21*a* may results in distal end 21*a* having width greater than the diameter of fourth hole 654, thereby preventing distal end 21*a* from inadvertently passing through fourth hole 654. The distal end 21*a* being crushed to form a flat shape prevents the distal end 21*a* of the first operation wire 21 from disengaging with fourth hole 654, which prevents inadvertent movement or decoupling of the first plate 63. In some embodiments, the distal end 21*a* is crushed to form a flat shape in addition to being bent, as shown in FIG. 4B. The distal end 21*a* being flat in shape and bent may further prevent inadvertent decoupling or disengaging of distal end 21*a* from third hole 643 and/or fourth hole 654.

The distal end 21*a* may be a flat portion that is crushed so that it is oriented to be substantially perpendicular to the central axis O6 of wire 21, such that distal end 21*a* is at angle from 90° to 100° to central axis O6 of wire 21. Central axis O6 may be an axis extending through the longitudinal center of wire 21. For example, a plane extending along the flat portion of the distal end 21*a* may be substantially perpendicular (e.g., from 90° to 100° to the central axis O6 of wire 21. In other words, the distal end 21*a* may be flat and may be vertically orientated. Distal end 21*a* may be flat and vertically orientated to reduce the amount of force applied at a single location to fourth hole 654. For example, when distal end 21*a* is flat and horizontally orientated, distal end 21*a* may apply a force to fourth hole 654 at a single location during use of treatment device 100 such that the applied force results in deformation of fourth hole 654. The horizontal orientation of distal end 21*a* results in a single contact location between distal end 21*a* and fourth hole 654 during opening and closing of forceps 5 since during opening and closing of forceps 5 first operation wire 21 pulls distal end 21*a* against the edge of fourth hole 654. In other words, when distal end 21*a* is horizontally orientated and pulled against the edge of fourth hole 654, a force is applied to single contact location between the flat portion of distal end 21*a* and the perimeter of fourth hole 654, which can cause deformation of the perimeter of fourth hole 654. The deformation of fourth hole 654 may increase the diameter of fourth hole 654, resulting in distal end 21*a* inadvertently passing through fourth hole 654.

In some embodiments, distal end 21*a* being vertically orientated results in two contact locations between the flat portion of distal end 21*a* and fourth hole 654 resulting in the force applied to fourth hole 654 by distal end 21*a* being spread between the two locations of contact. This reduces the amount of force applied to the perimeter of fourth hole 654 at a single location and prevents deformation of fourth hole 654. In some embodiments, distal end 21*a* being flat and vertically orientated prevents deformation of third hole 643 compared to when distal end 21*a* is flat and horizontally orientated.

In some embodiments, the distal end 21*a* of the first operation wire 21 is crushed or pressed to form the flat portion. Distal end 21*a* may be crushed during manufacturing of treatment device 100. For example, distal end 21*a* may be crushed after first operation wire 21 is inserted through third hole 643 and fourth hole 654. In some embodiments, distal end 21*a* is crushed by sandwiching distal end 21*a* within a metal block and compressing the ends of the metal block to crush distal end 21*a*. The distal end 21*a* may be crushed after assembly of forceps 5. In some embodiments, distal end 21*a* is crushed after distal end 21*a* is inserted through the third hole 643 and/or the fourth hole 654. Distal end 22a may have the same flat portion and features as distal end 21a as discussed herein.

Figure 10:
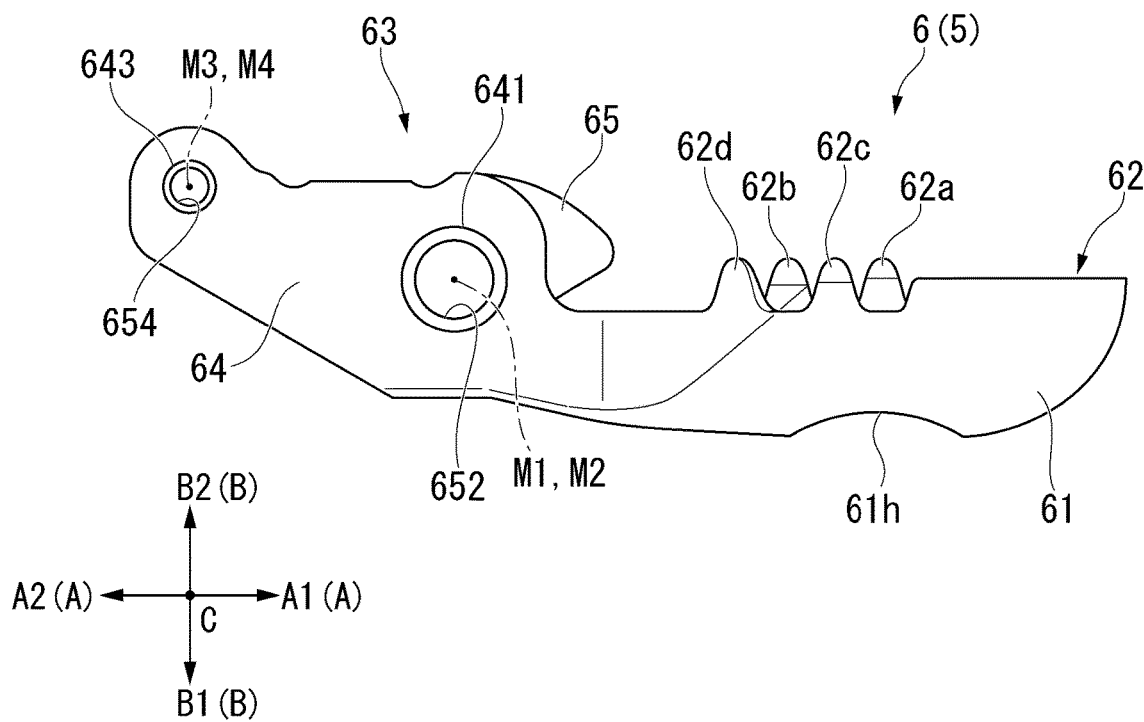
FIG. 10 is a left side view of the first forceps piece of FIG. 9.

FIG. 10 is a side view of the first forceps piece 6 viewed from the left side C2; When viewed from the direction along the central axis M1 of the first hole 641 and the central axis M2 of the second hole 652 (i.e., the rotation axis of the first forceps piece 6), the entire circumference of the inner circumferential surface of the second hole 652 is inside the inner circumferential surface of the first hole 641. The central axis M1 of the first hole 641 may substantially coincide with the central axis M2 of the second hole 652.

As viewed from the direction along the central axis M4 of the central axis M3 and the fourth hole 654 of the third hole 643, the entire inner peripheral surface of the fourth hole 654 is inside the inner peripheral surface of the third hole 643. Central axis M3 of the third hole 643 and the central axis M4 of the fourth hole 654 is substantially coincident.

Figure 11:
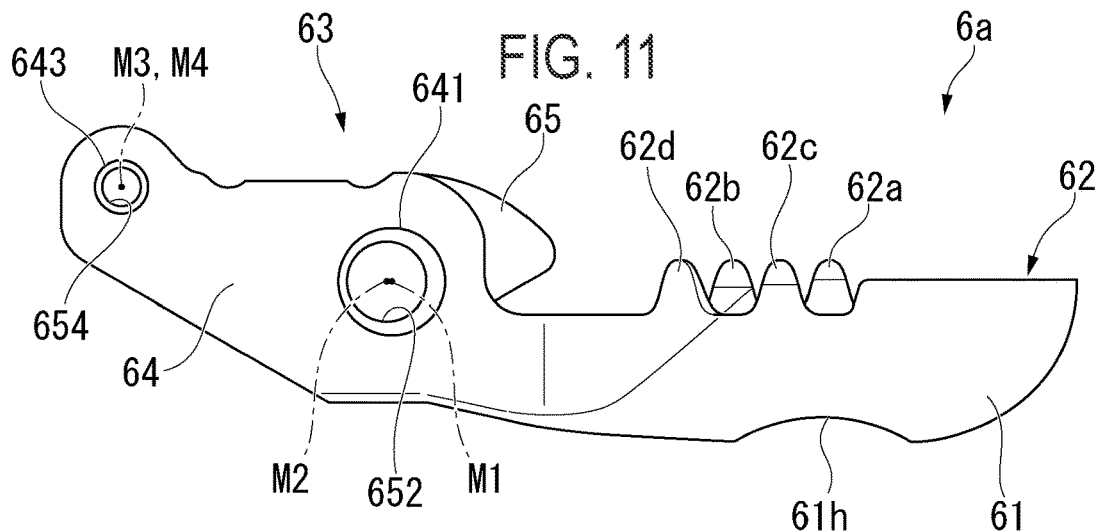
FIG. 11 is a left side view of a first modification of the first forceps piece of FIG. 9.

FIG. 11 is a side view of the first forceps piece 6a which is a modification of the first forceps piece 6. The entire circumference of the inner peripheral surface of the second hole 652 of first forceps piece 6a is inside the inner peripheral surface of the first hole 641 when viewed from the direction along the central axis M1 of the first hole 641 and the central axis M2 of the second hole 652. However, the central axis M1 of the first hole 641 of first forceps piece 6a may not coincide with the central axis M2 of the second hole 652, and the inner circumferential surface of the first hole 641 and the inner circumferential surface of the second hole 652 may not be concentric circles.

Figure 12:
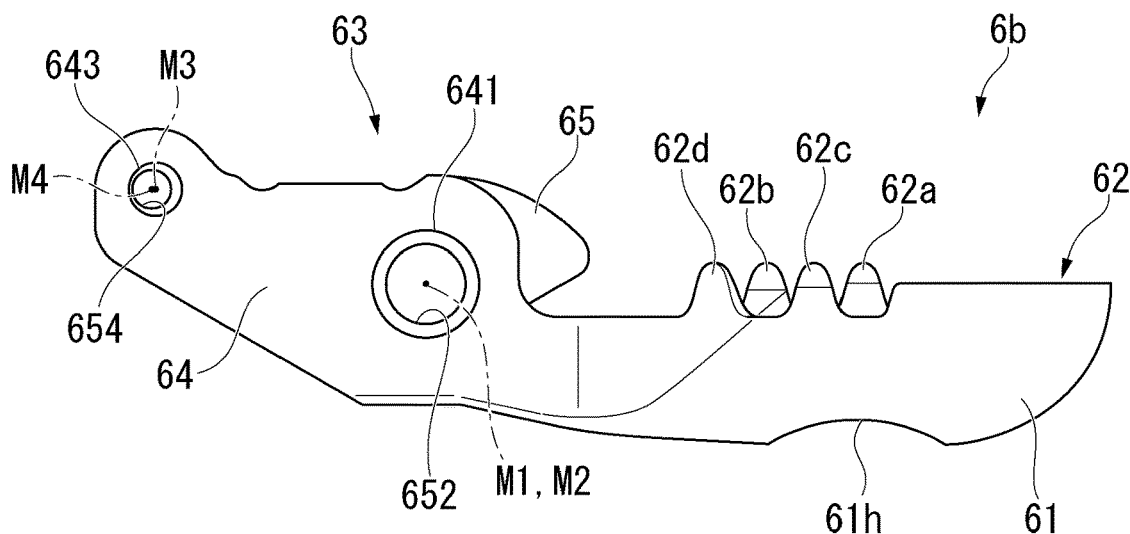
FIG. 12 is a left side view of a second modification of the first forceps piece of FIG. 9.

FIG. 12 is a side view of the first forceps piece 6b which is a modification of the first forceps piece 6. In the first forceps piece 6b, the entire circumference of the inner peripheral surface of the fourth hole 654 is inside the inner peripheral surface of the third hole 643 when viewed from the direction along the central axis M3 of the third hole 643 and the central axis M4 of the fourth hole 654. However, in the first forceps piece 6b, the center axis M3 of the third hole 643 does not coincide with the center axis M4 of the fourth hole 654, and the inner circumferential surface of the third hole 643 and the inner circumferential surface of the fourth hole 654 are not concentric circles.

Figure 13:
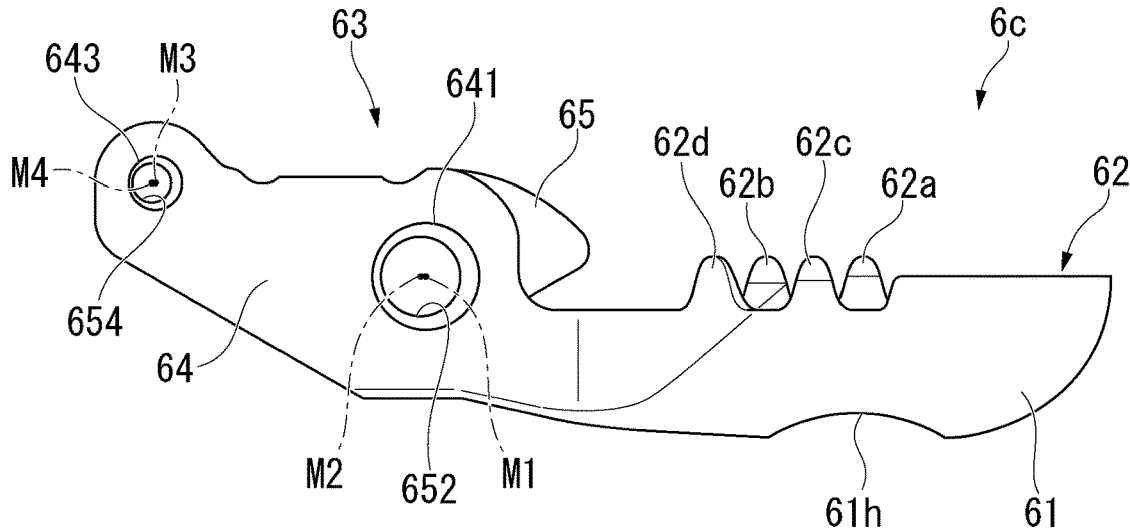
FIG. 13 is a left side view of a third modification of the first forceps piece of FIG. 9.

FIG. 13 is a side view of the first forceps piece 6c which is a modification of the first forceps piece 6. In the first forceps piece 6c, the entire circumference of the inner peripheral surface of the second hole 652 is inside the inner peripheral surface of the first hole 641 when viewed from the direction along the central axis M1 of the first hole 641 and the central axis M2 of the second hole 652. However, in the first forceps piece 6c, the central axis M1 of the first hole 641 does not coincide with the central axis M2 of the second hole 652, and the inner circumferential surface of the first hole 641 and the inner circumferential surface of the second hole 652 are not concentric circles.

In the first forceps piece 6c, the entire circumference of the inner peripheral surface of the fourth hole 654 is inside the inner peripheral surface of the third hole 643 when viewed from the direction along the central axis M3 of the third hole 643 and the central axis M4 of the fourth hole 654. However, in the first forceps piece 6c, the center axis M3 of the third hole 643 does not coincide with the center axis M4 of the fourth hole 654, and the inner circumferential surface of the third hole 643 and the inner circumferential surface of the fourth hole 654 are not concentric circles.

Figure 14:
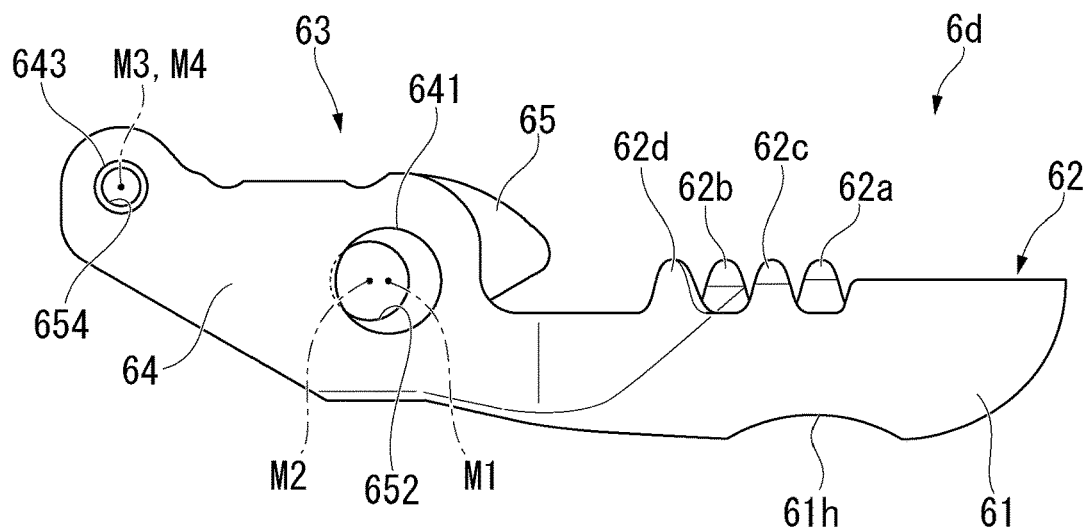
FIG. 14 is a left side view of a fourth modification of the first forceps piece of FIG. 9.

FIG. 14 is a side view of the first forceps piece 6d which is a modification of the first forceps piece 6. In the first forceps piece 6d, a part of the inner peripheral surface of the second hole 652 is outside the inner peripheral surface of the first hole 641 when viewed from the direction along the central axis M1 of the first hole 641 and the central axis M2 of the second hole 652. That is, if the pin 36 is inserted into the first hole 641 and the second hole 652, the outer peripheral surface entire circumference of the second hole 652 may not be inside the inner peripheral surface of the first hole 641. The inner peripheral surface of the second hole 652 may be located outside the inner peripheral surface of the first hole 641.

Figure 15:
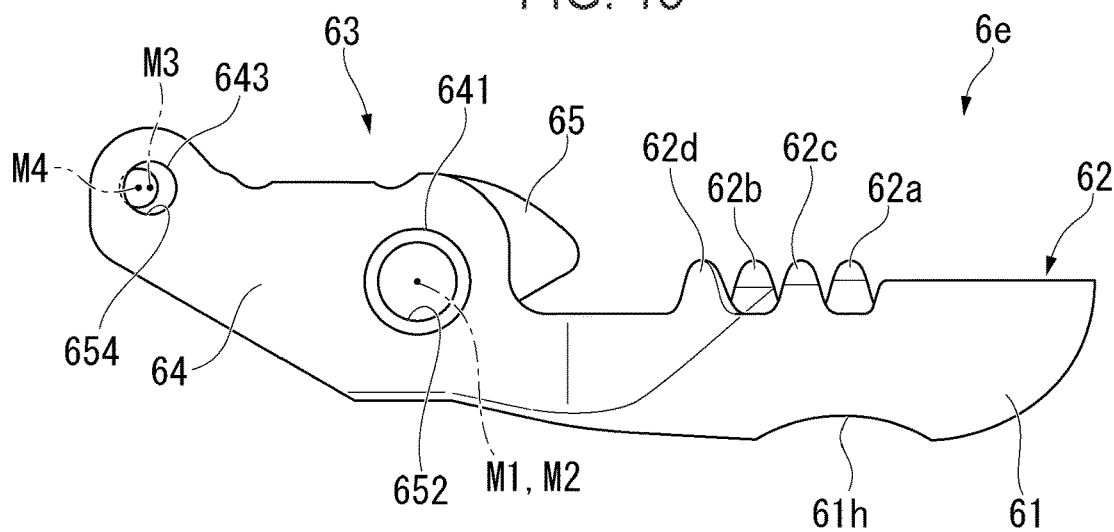
FIG. 15 is a left side view of a fifth modification of the first forceps piece of FIG. 9.

FIG. 15 is a side view of the first forceps piece 6e which is a modification of the first forceps piece 6. In the first forceps piece 6e, a part of the inner peripheral surface of the fourth hole 654 is outside the inner peripheral surface of the third hole 643 when viewed from the direction along the central axis M3 of the third hole 643 and the central axis M4 of the fourth hole 654. That is, if the first operation wire 21 is inserted into the third hole 643 and the fourth hole 654, the outer peripheral surface entire circumference of the fourth hole 654 may not be inside the inner peripheral surface of the third hole 643. The inner peripheral surface of the fourth hole 654 may be located outside the inner peripheral surface of the third hole 643.

Figure 16:
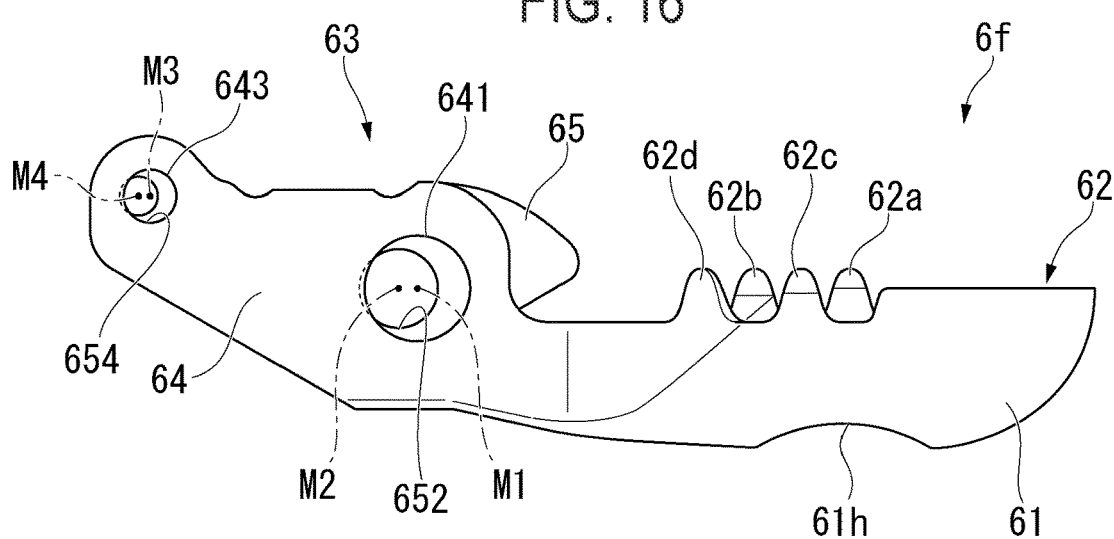
FIG. 16 is a left side view of a sixth modification of the first forceps piece of FIG. 9.

FIG. 16 is a side view of the first forceps piece 6f which is a modification of the first forceps piece 6. In the first forceps piece 6f, a part of the inner peripheral surface of the second hole 652 is outside the inner peripheral surface of the first hole 641 when viewed from the direction along the central axis M1 of the first hole 641 and the central axis M2 of the second hole 652. That is, if the pin 36 is inserted into the first hole 641 and the second hole 652, the outer peripheral surface entire circumference of the second hole 652 may not be inside the inner peripheral surface of the first hole 641. The inner peripheral surface of the second hole 652 may be located outside the inner peripheral surface of the first hole 641.

In the first forceps piece 6f, a part of the inner peripheral surface of the fourth hole 654 may be outside the inner peripheral surface of the third hole 643 when viewed from the direction along the central axis M3 of the third hole 643 and the central axis M4 of the fourth hole 654. That is, if the first operation wire 21 is inserted into the third hole 643 and the fourth hole 654, the outer peripheral surface entire circumference of the fourth hole 654 may not be inside the inner peripheral surface of the third hole 643. The inner peripheral surface of the fourth hole 654 may be located outside the inner peripheral surface of the third hole 643.

Second forceps piece 7

Figure 17:
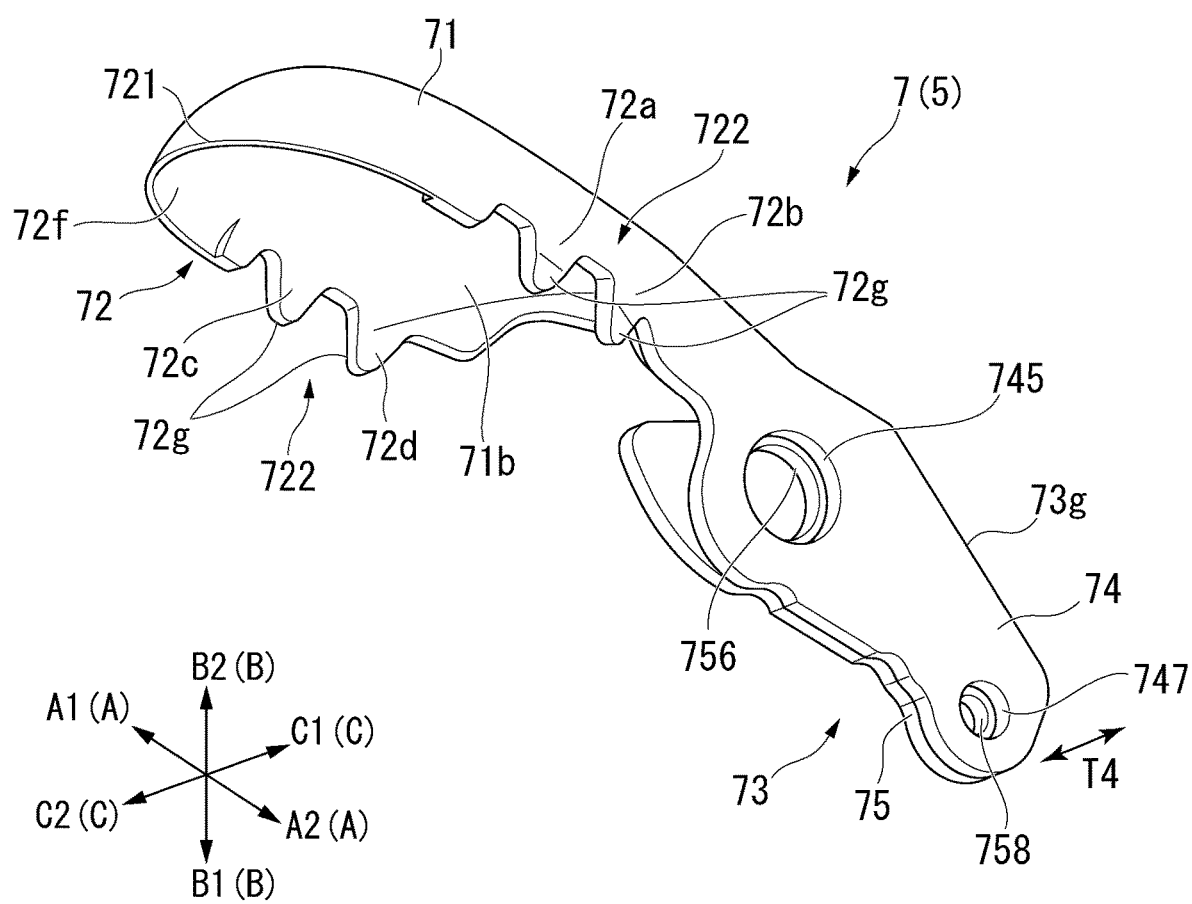
FIG. 17 is a perspective view of a second forceps piece of the forceps of the treatment device of FIG. 2.

FIG. 17 is a perspective view of a second forceps piece 7. The second forceps piece 7 is mainly formed by pressing a single flat plate into the desired shape. The second forceps piece 7 may have a second cup 71 provided on the distal end side A1, and a second arcuate edge 72 and a second plate 73. The second cup 71 may be formed in a substantially hemispherical shape, and open towards the first forceps piece 6 side (lower side B1) in the opening/closing direction B.

Figure 18:
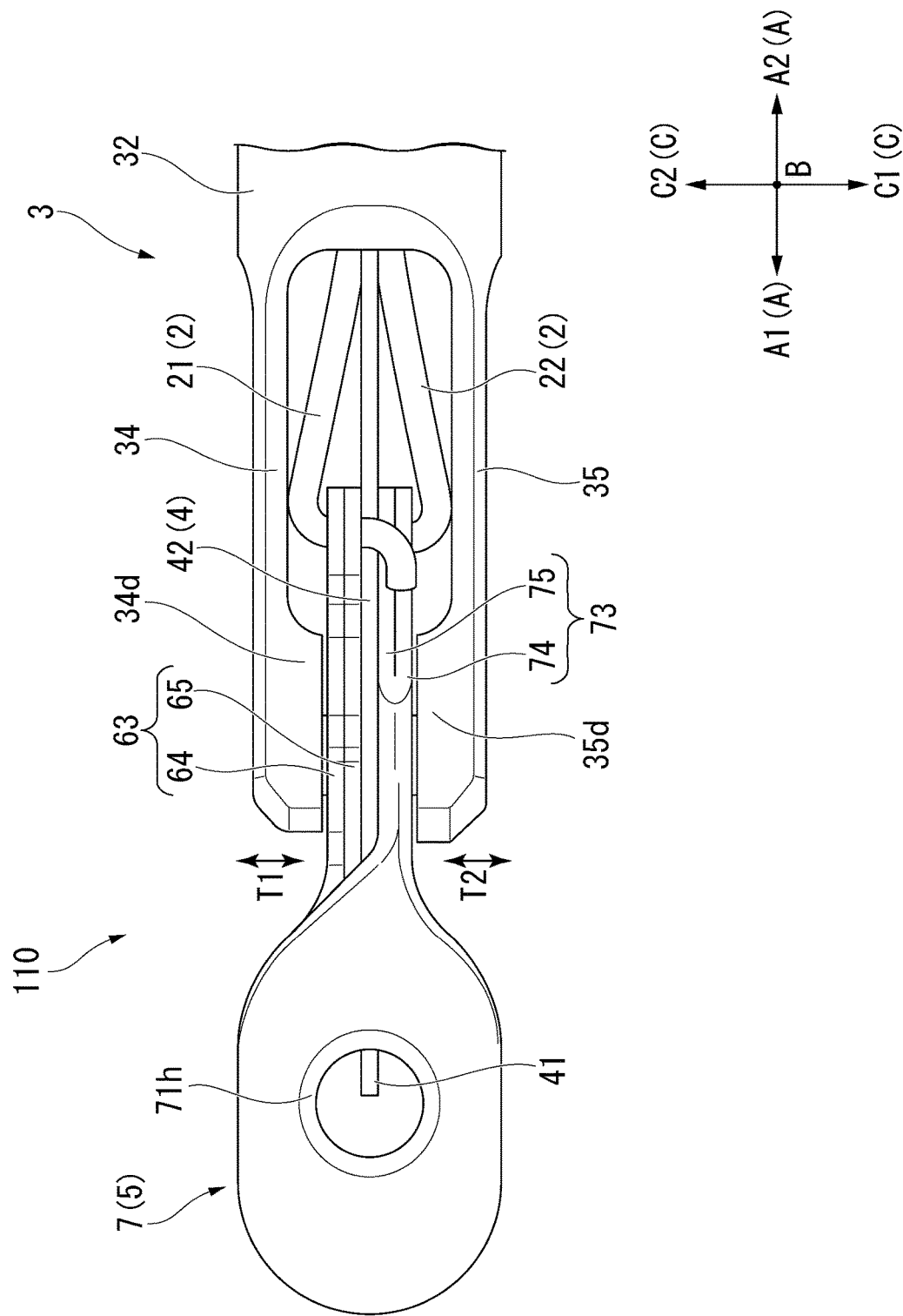
FIG. 18 is a top plan view of the treatment device of FIG. 2.

Referring to FIGS. 17-18, the second cup 71 may have a through hole 71h located in the vicinity of the center of the concave bottom portion 71b. The through hole 71h may penetrate through the second cup 71 in the opening and closing direction B (see FIG. 3). The second arcuate edge 72 may be an opening edge of the second cup 71, which may be formed in a substantially arcuate shape. The second arcuate edge 72 has a second distal end portion 721 and a second sawtooth portion 722. The second distal end portion 721 is an edge portion provided on the tip side A1. The second cup 71 may include a striking portion 72f. The striking portion 72f may be located inside the second cup 71 and proximate the second distal end portion 721. In some embodiments, the second distal end portion 721 is formed in a thinner blade shape than the process portion of the second arcuate edge 72 resulting in the second distal end portion 721 being more suitable for cutting biological tissue.

The second distal end portion 721 may be disposed at a position facing the first tip portion 621 when the forceps 5 is closed. In practice, the user can easily collect the living tissue by sandwiching the living tissue between the first tip portion 621 and the second distal end portion 721.

The second sawtooth portion 722 is a serrated concavity provided on both sides in the width direction C in the second arcuate edge 72. The second sawtooth 722 has a second front right sawtooth 72a, a second rear right sawtooth 72b, a second front left sawtooth 72c, and a second rear left sawtooth 72d. The second front right sawtooth 72a and the second rear right sawtooth 72b are sawteeth provided on the right side C1 at the second arcuate edge 72. The second front right sawtooth 72a and the second rear right sawtooth 72b are sawteeth protruding to the lower side B 1. The second front right sawtooth 72a and the second rear right sawtooth 72b are arranged in the longitudinal direction A, and the second front right sawtooth 72a is arranged on the distal side A1 of the second rear right sawtooth 72b.

The second front right sawtooth 72a and the second rear right sawtooth 72b are provided with a surface pressing portion 72g on the right side C 1 (outside) of the most protruding convex portion. In some embodiments, surface pressing portion 72g convex tip side is inclined inwardly. This configuration may prevent the second front right sawtooth 72a and the second rear right sawtooth 72b from erroneously damaging the living tissue or the like.

As shown in FIG. 3, when the forceps 5 is closed, the second front right sawtooth 72a and the second rear right sawtooth 72b are alternately arranged with the first front right sawtooth 62a and the first rear right sawtooth 62b. Specifically, the first rear right sawtooth 62b is disposed between the second front right sawtooth 72a and the second rear right sawtooth 72b. In some embodiments, the second front right sawtooth 72a is disposed between the first front right sawtooth 62a and the first rear right sawtooth 62b.

The second front left sawtooth 72c and the second rear left sawtooth 72d are sawteeth provided on the left side C2 at the second arcuate edge 72. The second front left sawtooth 72c and the second rear left sawtooth 72d are saw teeth protruding to the lower side B 1. The second front left sawtooth 72c and the second rear left sawtooth 72d are arranged in the longitudinal direction A, and the second front left sawtooth 72c is arranged on the distal side A1 of the second rear left sawtooth 72d.

The second front left sawtooth 72c and the second rear left sawtooth 72d are provided with a surface pressing portion 72g on the left side C2 (outside) of the most protruding convex portion. Surface pressing portion 72g convex tip side may be inclined inwardly. This configuration may prevent the second front left sawtooth 72c and the second rear left sawtooth 72d from erroneously damaging the living tissue or the like.

When the forceps 5 is closed, the second front left sawtooth 72c and the second rear left sawtooth 72d alternate with the first front left sawtooth 62c and the first rear left sawtooth 62d. Specifically, the first front left sawtooth 62c is disposed between the second front left sawtooth 72c and the second rear left sawtooth 72d. The second rear left sawtooth 72d is disposed between the first front left sawtooth 62c and the first rear left sawtooth 62d.

In some embodiments, the second forceps piece 7 is substantially the same shape as the first forceps piece 6. When the first forceps piece 6 and the second forceps piece 7 are same shape and are closed, the four saw teeth of the first forceps piece 6 and the second forceps piece 7 are arranged at positions which stagger among each other as described above. In some embodiments, the first forceps piece 6 and the second forceps piece 7 are not the same shape.

The second plate (right plate) 73 may be provided on the base end side A2 of the second cup 71 and is formed in a substantially plate shape. Thickness direction T4 of the second plate 73 may substantially coincide with the width direction C. As shown in FIG. 6, the second plate 73 is disposed adjacent to the needle member 4 on the right side C1 of the needle member 4.

As shown in FIG. 17, the second plate 73 includes a third member 74 and a fourth member 75. The third member 74 and the fourth member 75 may be formed by folding one sheet of plate material, and may be disposed adjacent to each other in the width direction C. In the following description, the process of forming the third member 74 and the fourth member 75 adjacent to each other by folding one sheet of plate material is referred to as the folding process. In some embodiments, a bent portion 73g is formed on the upper side B2 of the second plate 73, i.e., the third member 74 and the fourth member 75. The second plate 73 may have a higher rigidity as compared with the case of being formed of a single plate material.

In some embodiments, the third member (right outer plate) 74 is disposed adjacent to the fourth member 75 on the right side C1 (outer side) of the fourth member 75. The third member 74 has a fifth hole (fifth opening) 745 and a seventh hole (seventh opening) 747. The fifth hole 745 may be a through hole that penetrates the third member 74 in the thickness direction T4 and has a fifth inner diameter R5 (see FIG. 19). The seventh hole 747 may be a through hole that penetrates the third member 74 in the thickness direction T4 and has a seventh inner diameter R7 (see FIG. 20).

The fourth member (right inner plate) 75 may be disposed adjacent to the third member 74 on the left side C2 (inner side) of the third member 74. In some embodiments, the fourth member 75 has a sixth hole (sixth opening) 756 and an eighth hole (eighth opening) 758. The sixth hole 756 may be a through hole that penetrates the fourth member 75 in the thickness direction T4 and has a sixth inner diameter R6 (see FIG. 19). The eighth hole 758 may be a through hole having an eighth inner diameter R8 (see FIG. 20) that penetrates the fourth member 75 in the thickness direction T4.

In some embodiments, the third member 74 and the fourth member 75 are bent with a region between the fifth hole (fifth opening) 745 and the sixth hole (sixth opening) 756 serves as a boundary. As shown in FIG. 6, the pin 36 can be inserted through the fifth hole 745 and the sixth hole 756. The second plate 73 may be rotatably supported by the pin 36. The second plate 73 may have rotate about the center axis R and may rotate about pin 36, which is inserted into the fifth hole 745. The pin 36 may also be inserted into the sixth hole 756, which may also serve as a rotation center. The fifth hole 745 and the sixth hole 756 through which the pin 36 is inserted may be larger than the seventh hole 747.

As shown in FIG. 4, the first operation wire 21 can be inserted through the seventh hole 747 and the eighth hole 758. The second plate 73 is operated by the second operation wire 22 connected to the seventh hole 747 and the eighth hole 758. The distal end 22a of the second operation wire 22 that has passed through the seventh hole 747 and the eighth hole 758 is bent and fixed toward the central axis O5, and therefore, biological tissue or the like is hardly damaged.

Support Mode of the Needle Member 4 and Forceps 5

FIG. 18 is a plan view of the treatment portion 110 as viewed from the upper side B2. A first plate (left plate) 63, a second plate (right plate) 73, and a spacer 42 of the needle member 4 may each be supported by a pin 36. The pin 36 may be configured to penetrate a first thick portion 34d of the first frame piece 34 and the second thick portion 35d of the second frame piece 35. In some embodiments, the first plate 63, the second plate 73, and the spacer 42 are disposed between the first frame piece 34 and the second frame piece 35. The first plate 63, the second plate 73, and the spacer 42 may be disposed between the first thick portion 34d of the first frame piece 34 and the second thick portion 35d of the second frame piece 35.

In some embodiments, the first plate 63, the second plate 73, and the spacer 42 are sandwiched between the first thick portion 34d and the second thick portion 35d thickness in the thickness direction T1, T2. Therefore, the first plate 63, the second plate 73, and the spacer 42 are substantially secured and prevented from moving with respect to the vertical plane VP. Thus, when the forceps 5 is opened and closed, the lateral deviation of the first forceps piece 6 and the second forceps piece 7 with respect to the width direction C may be reduced.

Support Mode of the First Forceps Piece 6

Figure 19:
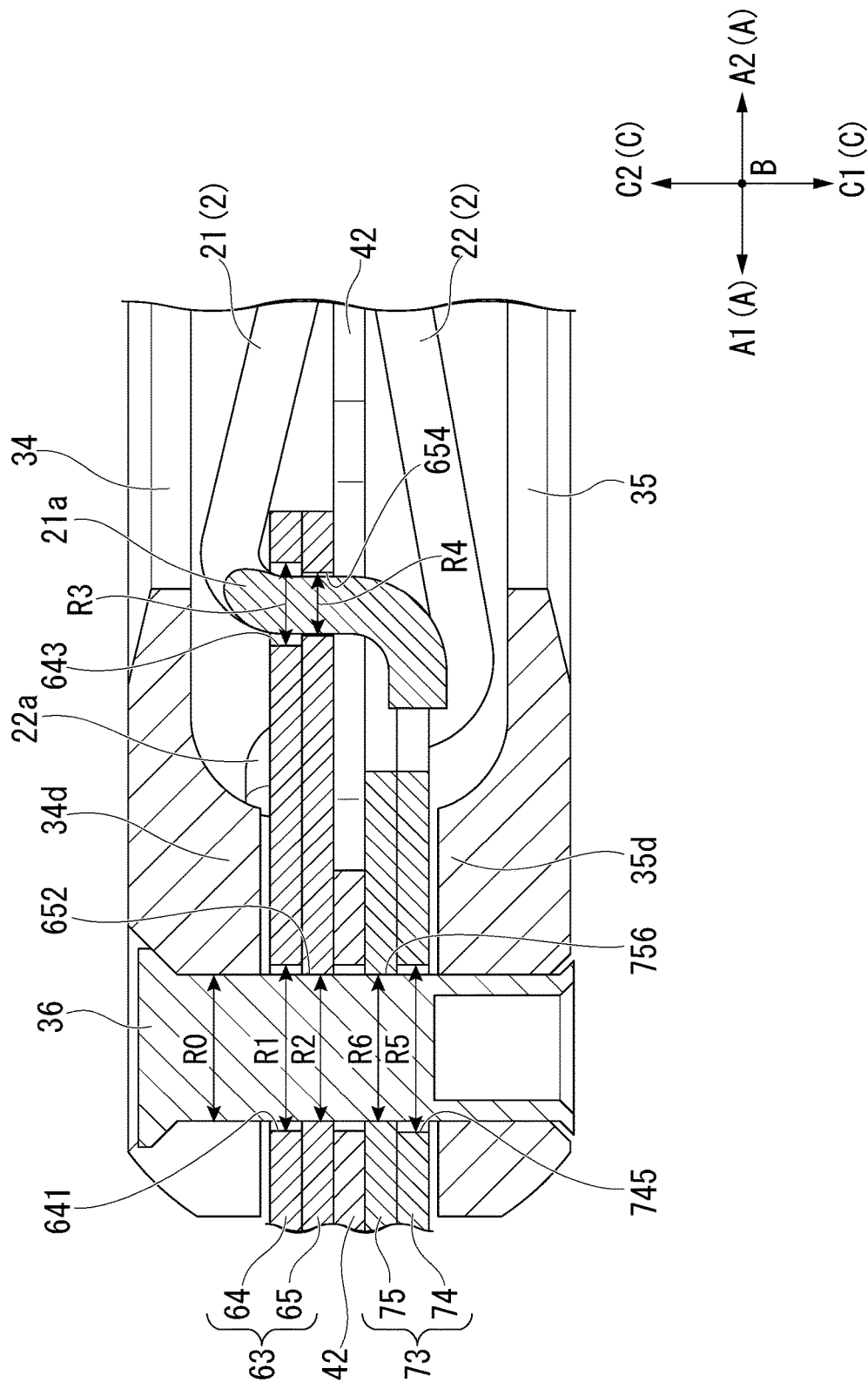
FIG. 19 is a cross-sectional top view of an engagement portion of a pin in the treatment device of FIG. 2.

FIG. 19 is a cross-sectional view of the engagement portion of the pin 36 in the treatment portion 110. The second inner diameter R2 of the second hole 652 is slightly larger with respect to the outer diameter R0 of the pin 36. Therefore, the pin 36 is rotatably fitted with respect to the second hole 652. On the other hand, the first inner diameter R1 of the first hole 641 is larger than the second inner diameter R2 of the second hole 652. Therefore, the pin 36 does not easily come into contact with the first hole 641. As a result, the first forceps piece 6 is supported mainly by fitting the second hole 652 of the second member 65 with the pin 36.

If, when the pin 36 is rotatably fitted to both the first hole 641 and the second hole 652, both the first hole 641 and the second hole 652 is formed with high accuracy, it is necessary to reduce the difference in both shapes. This is because if the difference between the shape of the first hole 641 and the shape of the second hole 652 is even slight, movement of the components (e.g., rattling) tends to occur when the forceps 5 is opened and closed. However, before the folding it is difficult to reduce, with high accuracy, the difference in both shapes of the first hole 641 and the second hole 652. Further, it is difficult to accurately align the first hole 641 and the second hole 652 during the folding process. Incidentally, after folding, it is also possible to form both the first hole 641 and the second hole 652 at a time by hole drilling, but this may result in warpage or distortion in the first plate 63.

On the other hand, as in the present embodiments, when the pin 36 is rotatably fitted with respect to only the second hole 652, only the second hole 652 need be formed with high accuracy. Further, since the first inner diameter R1 of the first hole 641 is larger than the second inner diameter R2 of the second hole 652, the accuracy in which the first hole 641 and the second hole 652 need to be aligned at the time of folding may be reduced.

Further, as in the present embodiments, since the first inner diameter R1 of the first hole 641 is larger than the second inner diameter R2 of the second hole 652, it is easier to insert the pin 36 into the first hole 641 and the second hole 652 from the outside.

In some embodiments, the sixth inner diameter R6 of the sixth hole 756 is slightly larger than the outer diameter R0 of the pin 36. Therefore, the pin 36 is rotatably fitted with respect to the sixth hole 756. On the other hand, the fifth inner diameter R5 of the fifth hole 745 may be larger than the sixth inner diameter R6 of the sixth hole 756. Therefore, the pin 36 does not easily come into contact with the fifth hole 745. As a result, the second forceps piece 7 is supported mainly by fitting the sixth hole 756 of the fourth member 75 with the pin 36.

If the pin 36 is rotatably fitted to both of the fifth hole 745 and the sixth hole 756, it is necessary to form both of the fifth hole 745 and the sixth hole 756 with high accuracy to reduce the difference between the respective shapes of the fifth hole 745 and the sixth hole 756. This is because if the difference between the shape of the fifth hole 745 and the shape of the sixth hole 756 is even slight, movement of components (e.g., rattling) tends to occur when the forceps 5 is opened and closed. However, before the folding process, it is difficult to reduce the difference in the shapes of both the fifth hole 745 and the sixth hole 756 with high accuracy. Further, it is difficult to accurately align the fifth hole 745 and the sixth hole 756 during the bending process. Although both the fifth hole 745 and the sixth hole 756 can be formed by drilling after the bending process, warping and distortion are likely to occur in the second plate 73 if the drilling occurs after the bending process.

On the other hand, when the pin 36 is rotatably fitted to only the sixth hole 756 as in the present embodiment, only the sixth hole 756 may be formed with high accuracy. Further, since the fifth inner diameter R5 of the fifth hole 745 is larger than the sixth inner diameter R6 of the sixth hole 756, the accuracy in which the fifth hole 745 and the sixth hole 756 need to be aligned at the time of the bending process may be reduced.

Further, as in the present embodiment, since the fifth inner diameter R of the outer fifth hole 745 is larger than the sixth inner diameter R6 of the sixth hole 756, it is easier to insert the pin 36 into the fifth hole 745 and the sixth hole 756 from the outside.

In some embodiments, the third inner diameter R3 of the third hole 643 is larger than the fourth inner diameter R4 of the fourth hole 654. Therefore, the first operation wire 21 is more likely to contact the fourth hole 654 than the third hole 643. As a result, the first forceps piece 6 is operated mainly by the contact of the fourth hole 654 of the second member 65 with the first operation wire 21.

The second hole 652 in which the first forceps piece 6 is supported by the pin 36 and the fourth hole 654, which the first operation wire 21 contacts, are both holes formed in the second member 65, and are arranged on the axis of the first operation wire 21 through which the sheath 1 is inserted. Therefore, when the first operation wire 21 moves forward and backward to drive the first forceps piece 6, it is possible to efficiently transmit a force in the longitudinal direction A to the first forceps piece 6.

Connection of the Second Forceps Piece 7 and the Second Operation Wire 22

Figure 20:
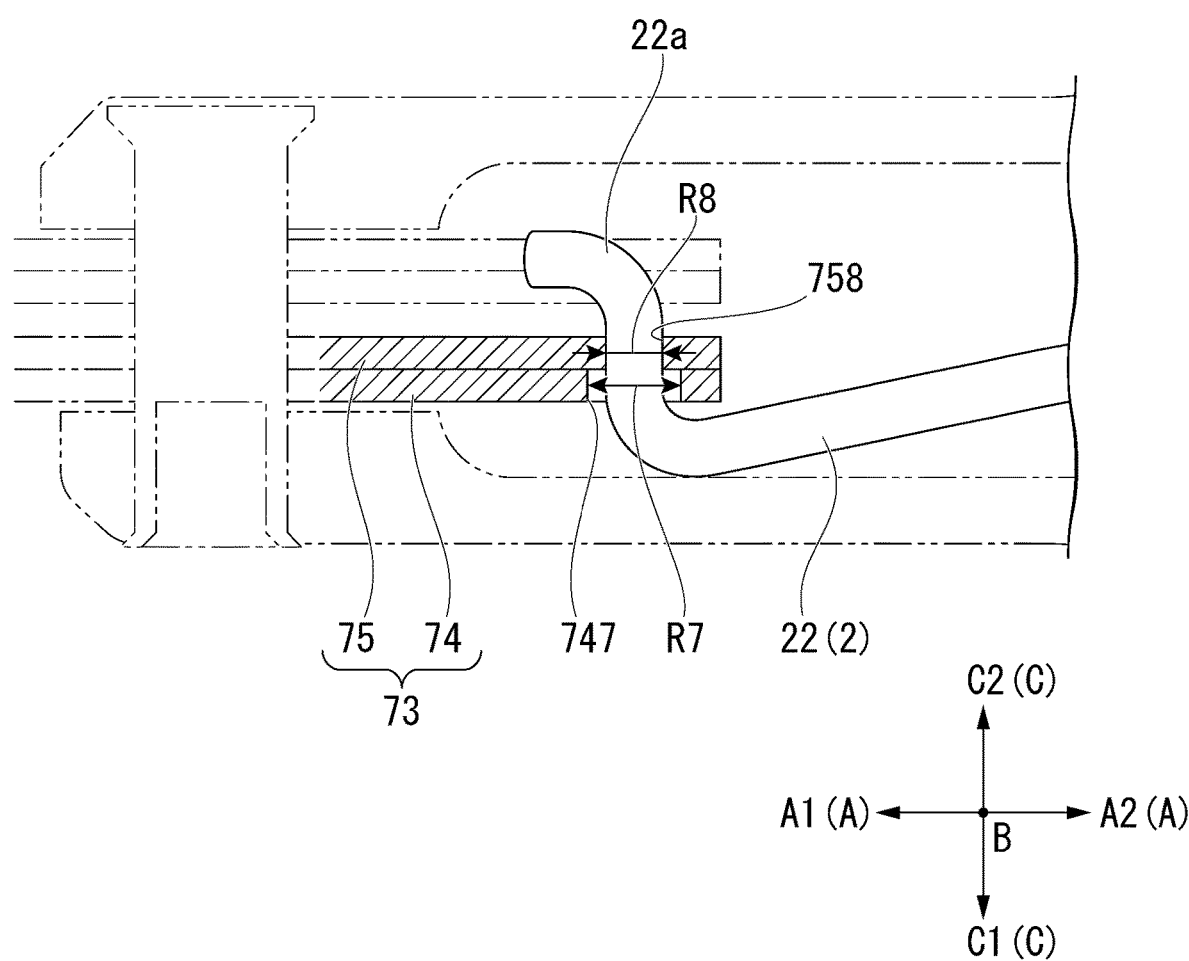
FIG. 20 is a cross-sectional top view of the engagement portion of FIG. 19 showing a second wire.

FIG. 20 is a cross-sectional view of the second plate 73 to which the second operation wire 22 is connected. The seventh inner diameter R7 of the seventh hole 747 is larger than the eighth inner diameter R8 of the eighth hole 758. Therefore, the second operation wire 22 is more likely to contact the eighth hole 758 than the seventh hole 747. As a result, the second forceps piece 7 is operated and controlled mainly via the eighth hole 758 of the fourth member 75 coming into contact with the second operation wire 22.

The sixth hole 756, which the second forceps piece 7 is supported by the pin 36, and the eighth hole 758, which the second operation wire 22 contacts, are both holes formed in the fourth member 75, and are arranged on the axis of the second operation wire 22 through which the sheath 1 is inserted. Therefore, when the second operation wire 22 moves forward and backward to drive the second forceps piece 7, it is possible to efficiently transmit a force in the longitudinal direction A to the second forceps piece 7.

Operation Unit 8

Figure 21:
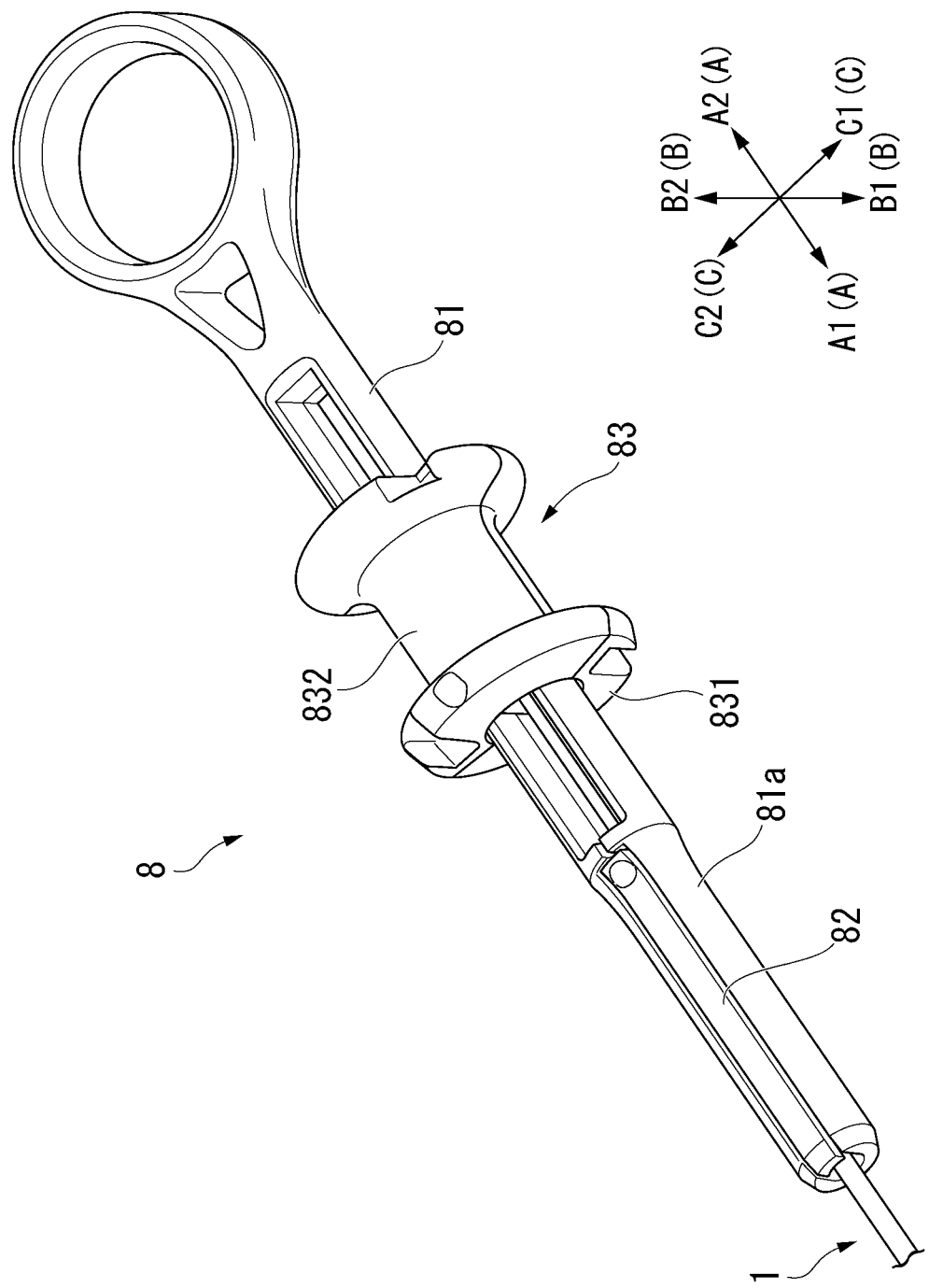
FIG. 21 is a perspective view of the operation unit of the treatment device of FIG. 2.

FIG. 21 is a perspective view of the operation unit 8. The operation unit 8 is provided on the proximal end side A2 of the sheath 1. The operation unit 8 includes an operation unit main body 81, a main body lid 82, a slider 83, and a pipe 84. The slider 83 has a slider first member 831 and a slider second member 832.

Figure 22:
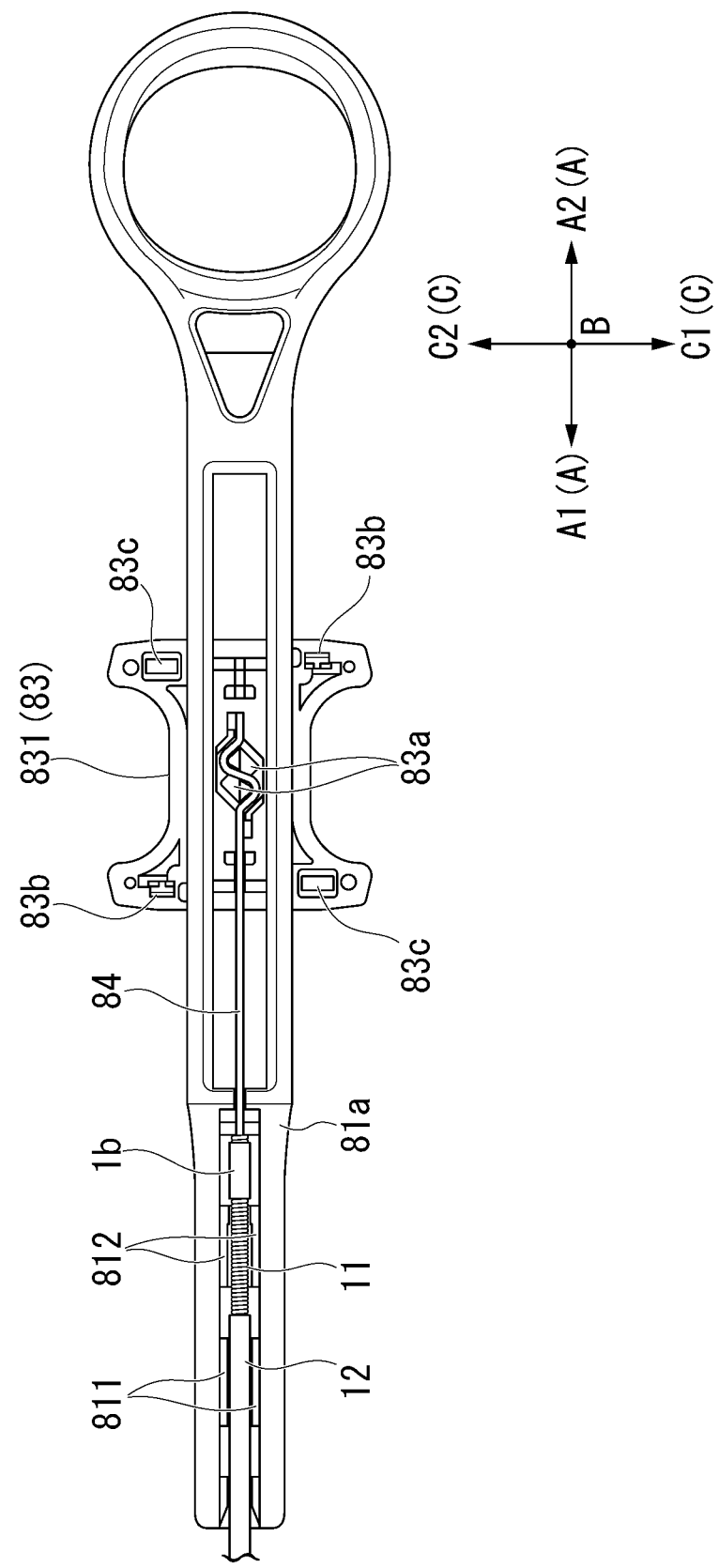
FIG. 22 is cross-sectional view of the operation unit of FIG. 21 showing an operation unit body and a slider first part member.

FIG. 22 is a cross-sectional view showing the operation unit main body 81 and the slider first member 831. The distal end portion 81a of the operation unit main body 81 is connected to the proximal end 1b of the sheath 1. The pipe 84 of the operation wire 2, which includes first operation wire 21 and the second operation wire 22, extends from the proximal end 1b of the sheath 1. Operation wire 2 and the pipe 84 may be fixed to the fastening portion 83a of the slider first member 831.

Figure 23:
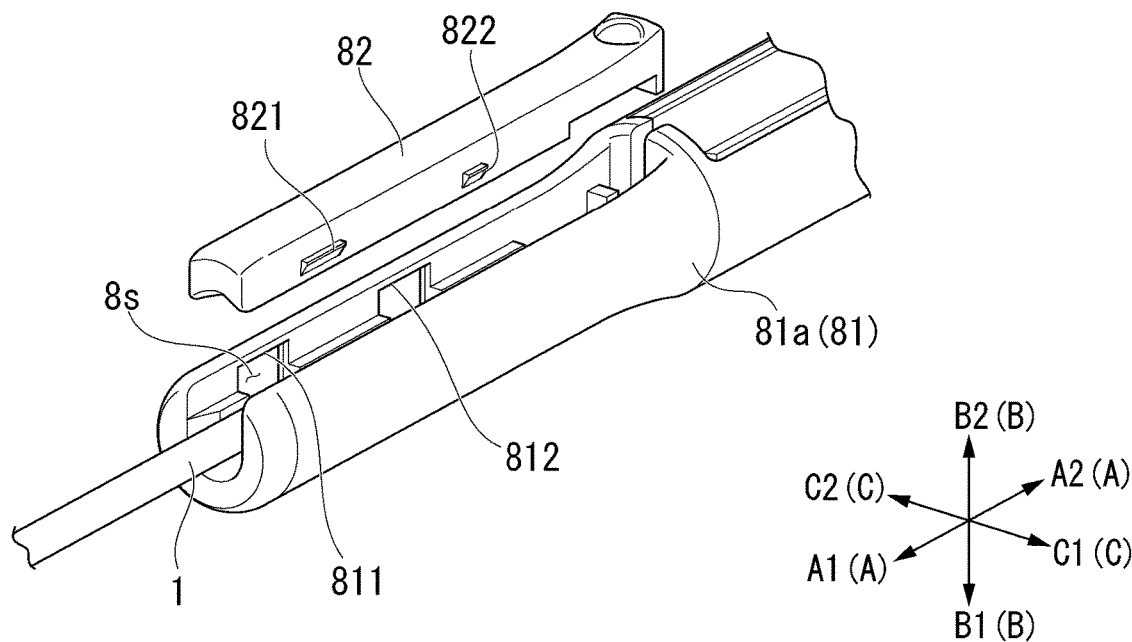
FIG. 23 is a diagram showing a main body lid of the operation unit separated from the operation unit body of FIG. 22.

FIG. 23 is a view showing the main body lid 82 separated from the operation unit main body 81. The main body lid 82 is detachably coupled to the operation unit main body 81. The proximal end 1b of the sheath 1 is fixed to the distal end portion of the operation unit main body 81 by mounting the main body lid 82 to the operation unit main body 81. Specifically, the main body lid 82 is mounted in the groove 8s formed along the longitudinal direction A in the operation unit body 81. In the description of the subsequent operation unit 8, the direction in which the main body lid 82 is mounted with respect to the operation unit body 81 and the upper B2.

The body lid 82 has a first protrusion 821 and a second protrusion 822. The first protrusion 821 is provided on both sides of the width direction C of the main body lid 82, and protrudes outward in the width direction C. The second protrusion 822 is provided on both sides of the width direction C of the main body lid 82, and protrudes outward in the width direction C. The first protrusion 821 and the second protrusion 822 are arranged in the longitudinal direction A, and the first protrusion 821 is positioned proximate to the distal side A1 compared to second protrusion 822.

The operation portion main body 81 has a first protrusion engaging portion 811 and a second protrusion engaging portion 812. The first protrusion engaging portion 811 protrudes inward in the width direction C from both side surfaces of the groove 8s. The second protrusion engaging portion 812 protrudes inward in the width direction C from both side surfaces of the groove 8s. The first protrusion engaging portion 811 and the second protrusion engaging portion 812 are arranged in the longitudinal direction A and the first protrusion engaging portion 811 is positioned proximate to the distal end side A1 compared to the second protrusion engaging portion 812.

Figure 24:
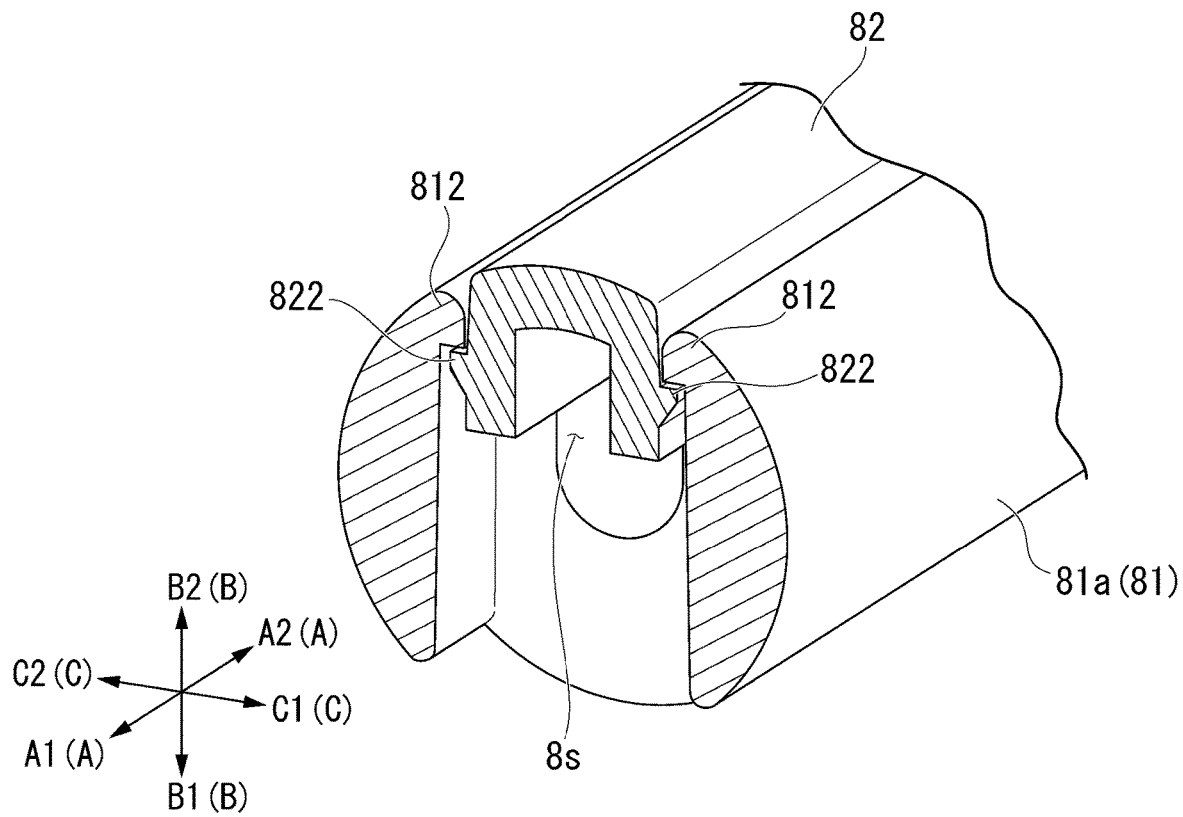
FIG. 24 is a cross-sectional view of the main body lid and the operation unit body of FIG. 22 having a second protrusion.

FIG. 24 is a cross-sectional view of the main body lid 82 including the second protrusion 822 and the operation unit main body 81. The main body lid 82 may be mounted to the operation unit body 81 when the first protrusion 821 and the first protrusion engaging portion 811 are engaged and when the second protrusion 822 and the second protrusion engaging portion 812 are engaged.

Figure 25:
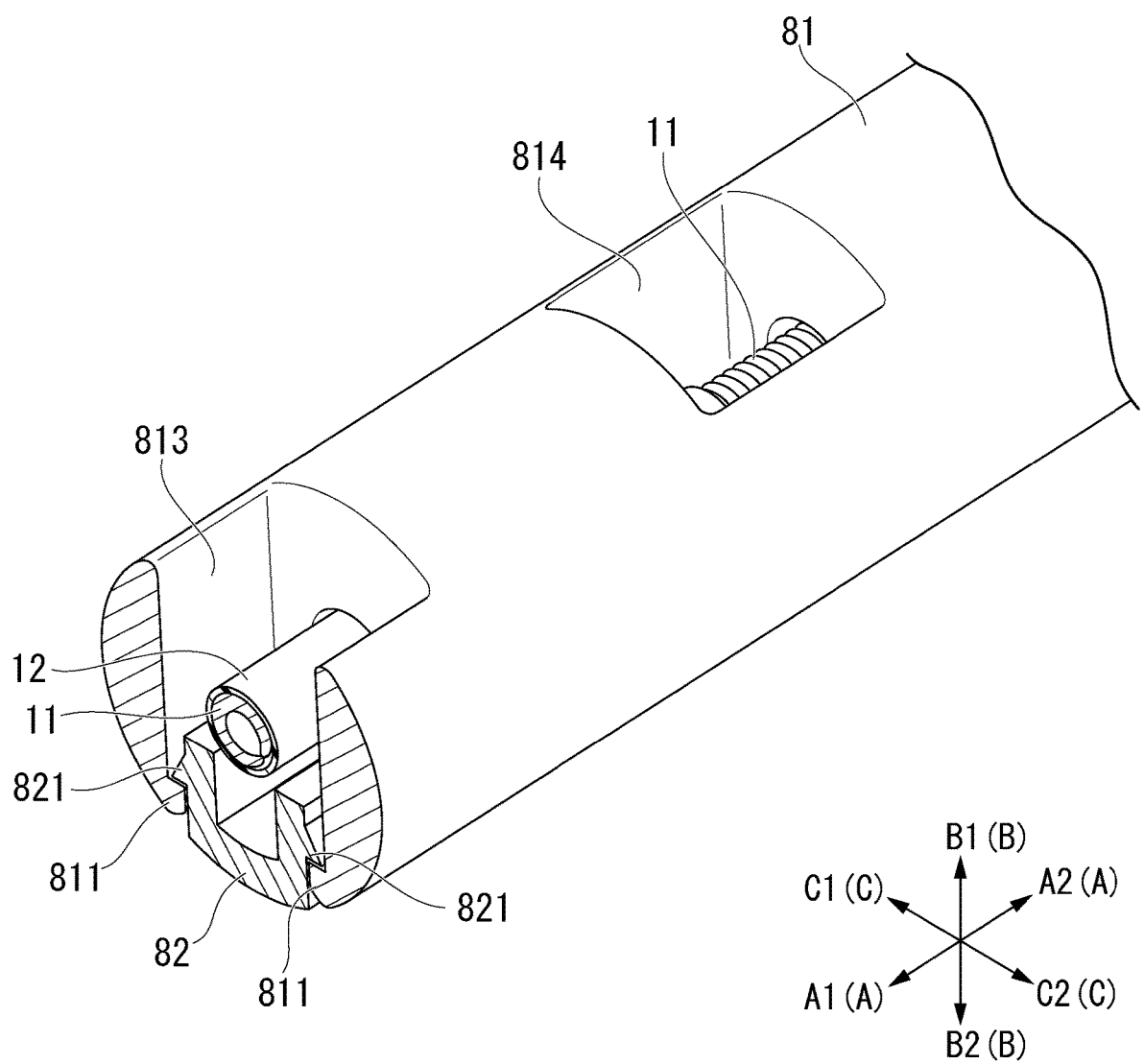
FIG. 25 is a bottom view of the operation unit body of FIG. 22.

FIG. 25 is a view of the operation unit main body 81 as viewed from the lower side B1. On the lower side of the operation unit body 81, a first opening 813 and a second opening 814, which opens to the lower B1, are formed. The first opening 813 and the second opening 814 are arranged in the longitudinal direction A, the first opening 813 is located proximate the distal end side A1 compared to the second opening 814. The first opening 813 is provided at the same position as the first protrusion engaging portion 811 in the longitudinal direction A. Therefore, it is easy to mold the first protrusion engaging portion 811 protruding inward in the width direction C. The second opening 814, in the longitudinal direction A, is provided at the same position as the second protrusion engaging portion 812. Therefore, it is easy to mold the second protrusion engaging portion 812 protruding inward in the width direction C.

In some embodiments, the slider 83 is mounted so as to be movable along the longitudinal direction A with respect to the operation unit main body 81. The proximal end of the operation wire 2 is fixed to the slider 83 together with the pipe 84. When the user moves the slider 83 forward and backward relative to the operation unit main body 81, the operation wire 2 moves forward and backward.

Figure 26:
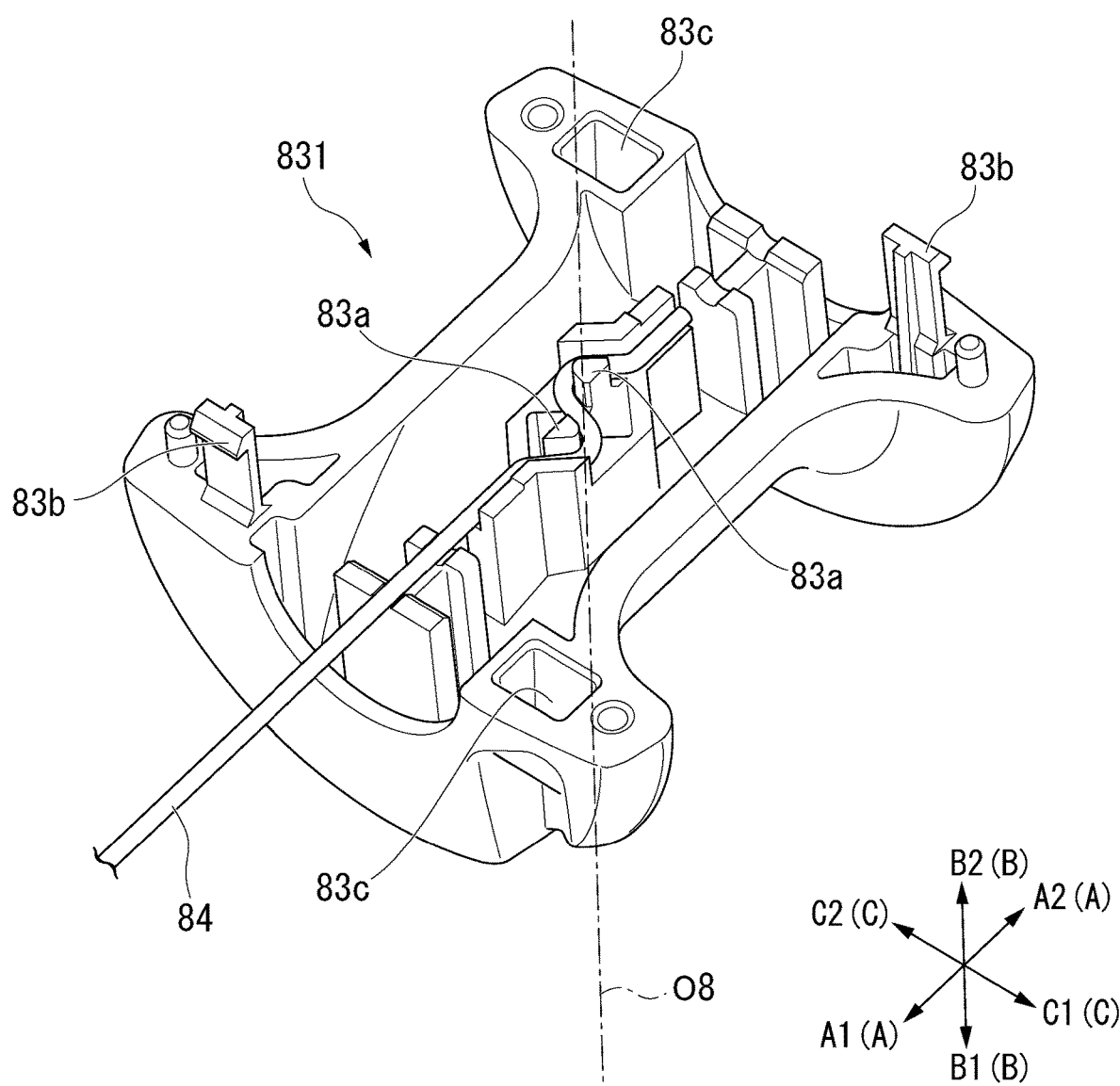
FIG. 26 is a cross-sectional view of the slider first part member of FIG. 22.

FIG. 26 is a perspective view of the slider first member 831. Slider first member 831 has two fastening portions 83a, two engagement protrusions 83b, and two engagement grooves 83c. The two fastening portions 83a, two engagement protrusions 83b, and two engagement grooves 83c, respectively, of slider first member 831 are disposed in line symmetry with respect to the center axis O8 of the vertical direction B.

FIG. 27 is a perspective view of the slider first member 831 and the slider second member 832. The slider second member 832 is a member having the same shape as the slider first member 831. Engaging protrusion 83b of the slider first member 831, as shown in FIG. 27, engages with the engaging projection 84d of the engaging groove 83c of the slider second member 832. Engaging protrusion 83b of the slider second member 832 is engaged with the engaging projection 84d of the engaging groove 83c of the slider first member 831. Engaging groove 83c may be configured to extend internally in the vertical direction B. Therefore, it is easy to mold the engaging projection 84d which engages with the engaging protrusion 83b.

Since the slider first member 831 and the slider second member 832 have the same shape, for example, the fastening portion 83a of the slider second member 832 and the like are not used. However, since it is not necessary to separately prepare the slider first member 831 and the slider second member 832, the number of component types can be reduced.

Method of Manufacturing First Forceps Piece 6

FIG. 28 is a view showing a method of manufacturing or a processing procedure of the first forceps piece 6. The first forceps piece 6 is mainly formed by pressing a single plate material F into the desired shape. The manufacturing process of the first forceps piece 6 includes a drilling process ST1, a surface hitting process ST2, a pressing process ST3, and a surface pushing process ST4.

ST1 of Drilling Process

In the drilling process ST1, drilling is performed to form the first hole 641, the second hole 652, the third hole 643, and the fourth hole 654 in the plate material F. The surface of the plate material F on which the inside of the first forceps piece 6 (the surface having the bottom portion 61b) is formed is referred to as a "first surface F1", and the surface opposite to the first surface F1 is referred to as a "second surface F2". The drilling is performed from the first surface F1 toward the second surface F2.

ST2 of Surface Compressing Process

Next, in the surface compressing process ST2, the surface striking portion 62f is formed on the inner side of the first cups 61 by compressing a portion of the first surface F1. In some embodiments, the portion of first surface F1 forming surface striking portion 62f is repeatedly hit and/or impacted to compress the portion to form the surface striking portion 62f. However, a mold be used to compress the portion of the first surface F1 to form the surface striking portion 62f. In some embodiments, surface striking portion 62f is a dent made by pressing a metal plate with a mold against first surface F1.

ST3 of Pressing Process

Next, in the pressing process ST3, press working is performed on the plate member F to form a first cup 61 having a substantially hemispherical shape and a first plate 63 formed by folding. For example, plate member F may be pressed against a mold such that plate member F forms a cup shape (e.g., first cup 61). The plate member F is pressed and folded such that the first surface F1 is located inside and the first hole 641 and the second hole 652 face each other. The plate member F is also pressed and folded such that the third hole 643 and the fourth hole 654 face each other. In some embodiments, the plate member F is folded so that at least a part of the first surface F1 overlaps. As indicated by ST3, the plate material F is bent so that the surface striking portion 62f is placed inside the first tip part 621 of cup 61

ST4 of Surface Pushing Process

Next, in the surface pushing process ST4, pushing components (PC) are used on the outer side of the widthwise direction C of the first forceps piece 6 on the second surface F2 of the plate member F where the surface pressing portion 62g of the first sawtooth section 622 is provided. PC may be a block of metal configured to apply pressure to surface pressing portion 62g to cause surface pressing portion 62g to bend inwards. In some embodiments, first cup 61, having been formed from pressing process ST3, is inserted between two PCs, which are configured to compress at least a portion of first cup 61 (e.g., surface pressing portion 62g). For example, the PCs may push surface pressing portion 62g inward such that surface pressing portion 62g is bent slightly inward. Since the surface striking portion 62f and the surface pressing portion 62g are formed on the opposite surfaces of one sheet of the plate material F, both cannot be formed by the surface hitting process alone. Therefore, surface striking portion 62f is formed in surface compressing process ST2 and surface pressing portion 62g is formed in the surface pushing process ST4.

Figure 29:
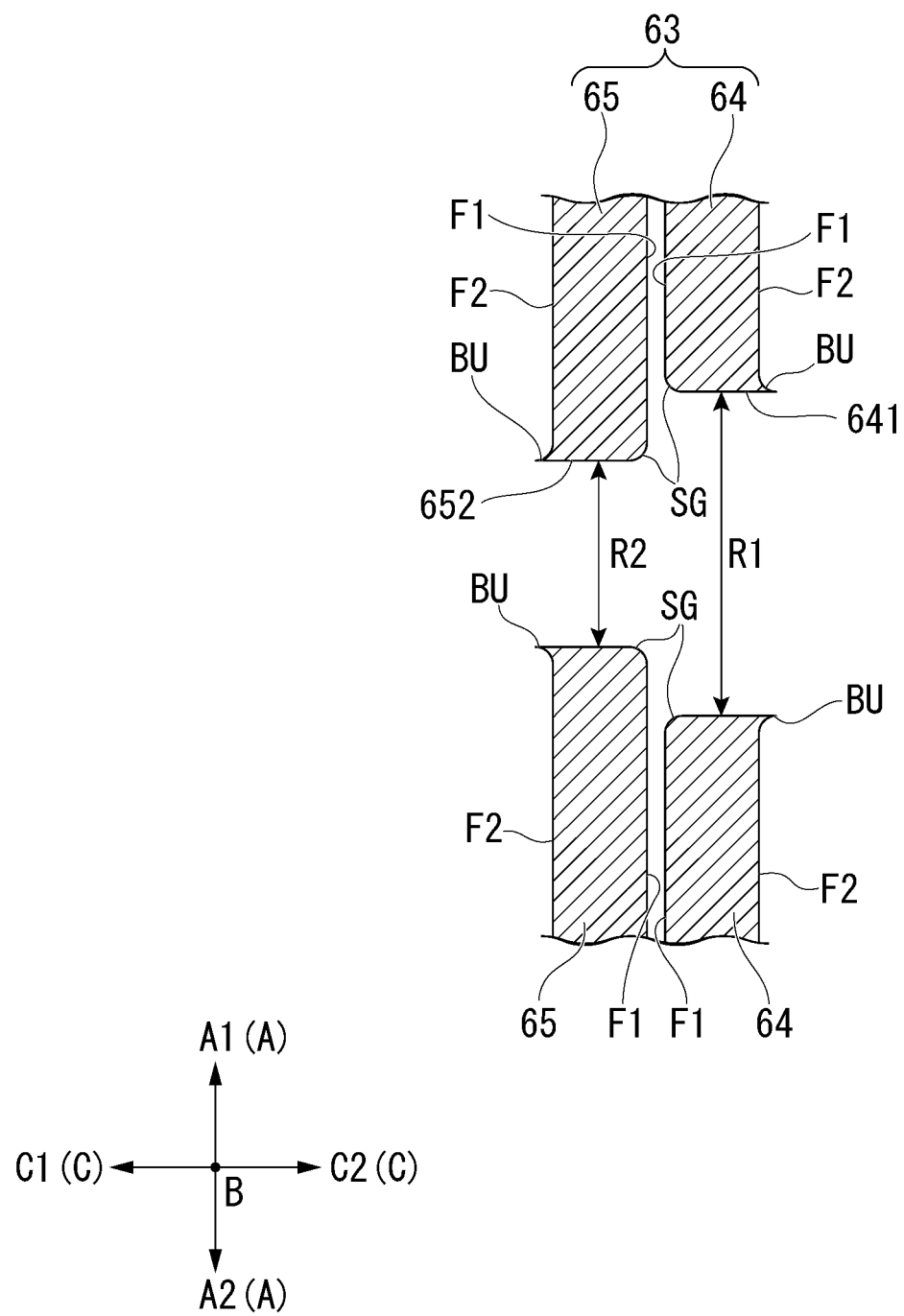
FIG. 29 is a cross-sectional view of a first hole and a second hole after processing of the first forceps piece of FIG. 9.

FIG. 29 is a cross-sectional view of the first hole 641 and the second hole 652 after processing. The first hole 641 and the second hole 652 are drilled from the first surface F1 toward the second surface F2 ST1 the drilling process. Therefore, the burr BU generated in the drilling process is formed on the outer side of the first plate 63. Therefore, it is easy to arrange the first member 64 and the second member 65 adjacent to each other such that they are parallel. The first member 64 and the second member 65 may face each other, (e.g., the first surface F1) and sag SG may be formed on each of first member 64 and second member 65.

The method of manufacturing the second forceps piece 7 is similar to the method of manufacturing the first forceps piece 6 except that the shape to be formed is different.

According to the endoscopic treatment device 100 of the present embodiment, since the forceps 5 can be formed mainly by press machining instead of cutting machining, it has high performance but low cost.

Although the first embodiment of the present invention has been described above in detail with reference to the drawings, the specific configuration is not limited to this embodiment, and design changes and the like within a range not deviating from the gist of the present invention are also included. In addition, the constituent elements shown in the above-described embodiments and modified examples can be appropriately combined and configured.

Modification 1-1

In the above embodiment, the first hole 641 and the third hole 643 in the first member 64 of the first forceps piece 6 is a hole. However, the first hole 641 and the third hole 643 aspects are not limited thereto.

FIG. 30 is a view showing a first member 64A which is a modification of the first member 64. The first member 64A has a first notch (first opening) 641A instead of the first hole 641. The first notch 641A is a notch larger than the second hole 652 when viewed in the widthwise direction C. Therefore, the first forceps piece 6, even when having a first notch 641A in place of the first hole 641, is supported by fitting the pin 36 through mainly the second hole 652 of the second member 65.

The first member 64A has a third notch (third opening) 643A instead of the third hole 643. The third notch 643A is a notch larger than the fourth hole 654 when viewed in the widthwise direction C. Therefore, the first forceps piece 6, even when having a third notch 643A instead of the third hole 643, mainly the fourth hole 654 of the second member 65 is operated by contacting the first operation wire 21.

The fifth hole 745 and the seventh hole 747 of the third member 74 of the second forceps piece 7 may also have an opening shape such as a notched shape, similarly to the first hole 641 and the third hole 643 described above.

Modification 1-2

In the above embodiment, the first forceps piece 6 has a first sawtooth portion 622 and the second forceps piece 7 has a second sawtooth portion 722. When the forceps 5 is closed, the first sawtooth portion 622 and the second sawtooth portion 722 engage with each other. However, the shapes of the first forceps piece 6 and the second forceps piece 7 are not limited thereto.

Figure 31:
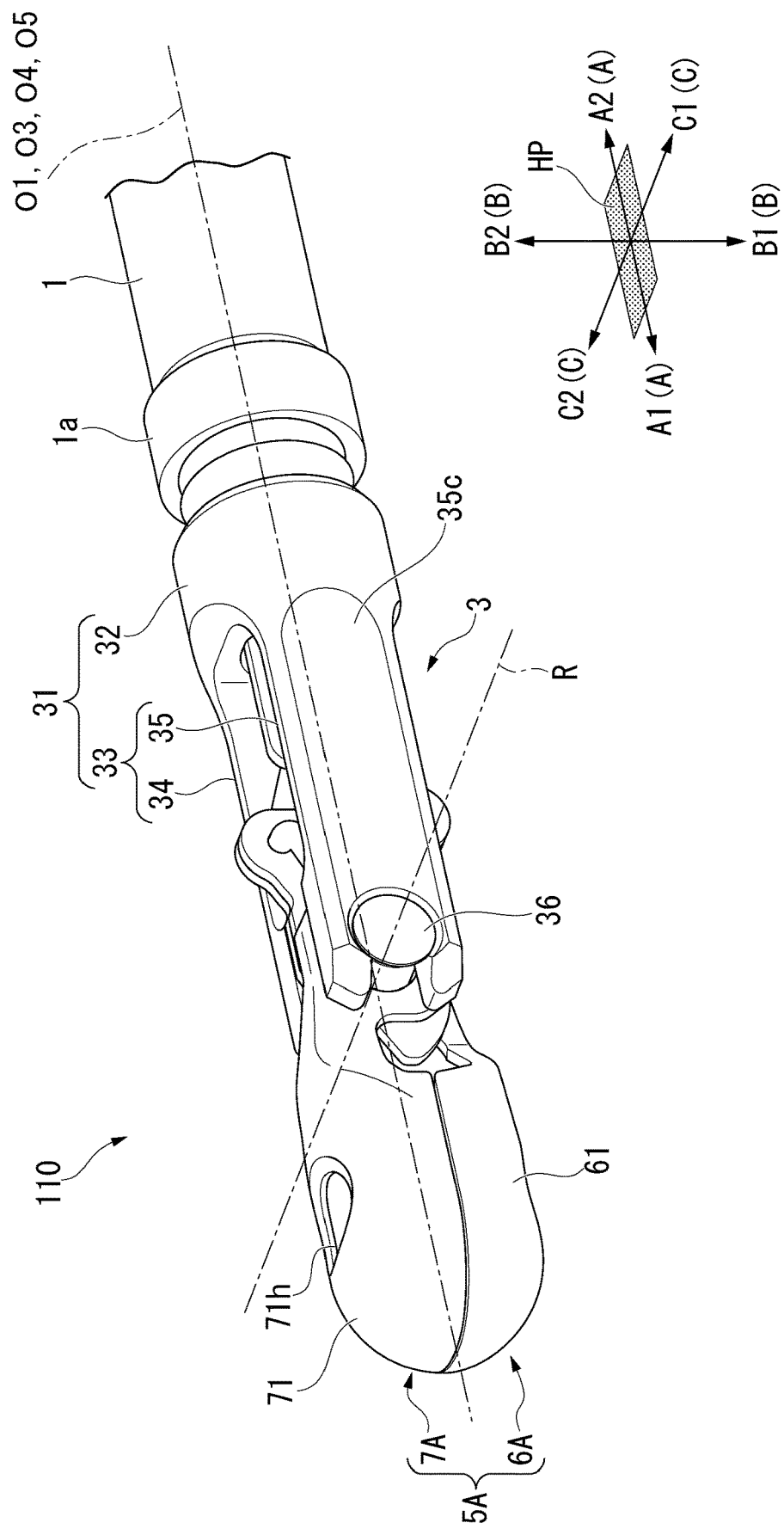
FIG. 31 is a diagram showing a first modification of the treatment device of FIG. 2.

FIG. 31 is a view showing a forceps 5A which is a modification of the forceps 5. The forceps 5A includes a first forceps piece 6A, which is a modification example of the first forceps piece 6, and a second forceps piece 7A, which is a modification example of the second forceps piece 7. The first forceps piece 6A does not have a first sawtooth portion 622. Also, the second forceps piece 7A does not have a second sawtooth portion 722.

Modification 1-3

Figure 32:
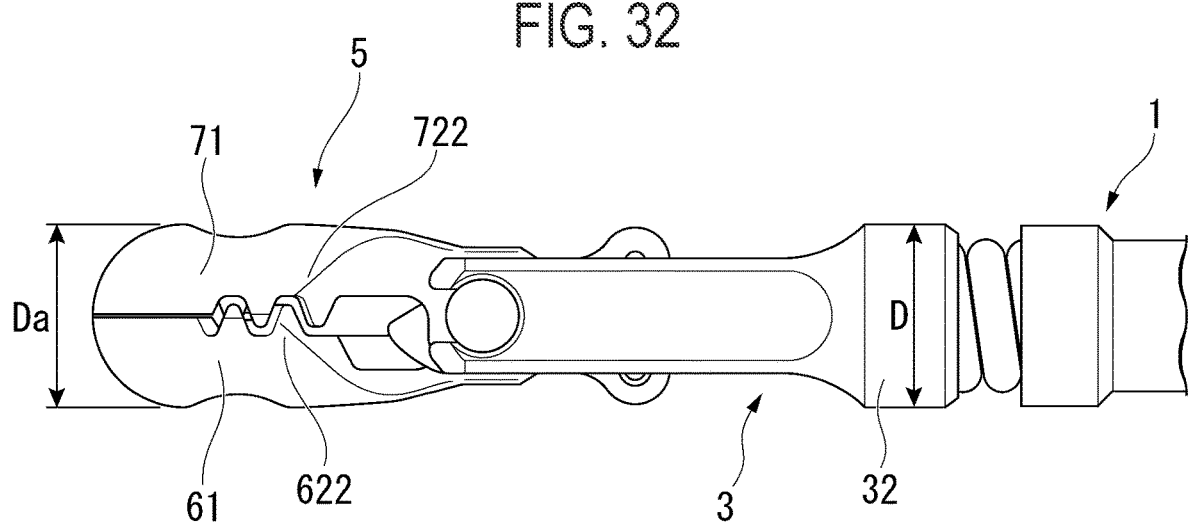
FIG. 32 is a diagram showing a second modification of the treatment device of FIG. 2.
Figure 33:
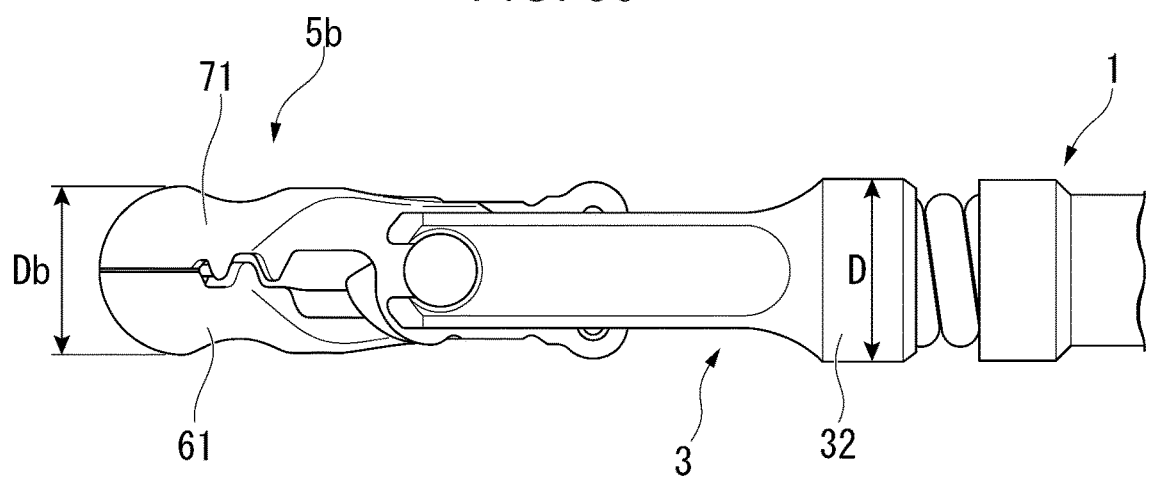
FIG. 33 is a diagram showing a third modification of the treatment device of FIG. 2.
Figure 34:
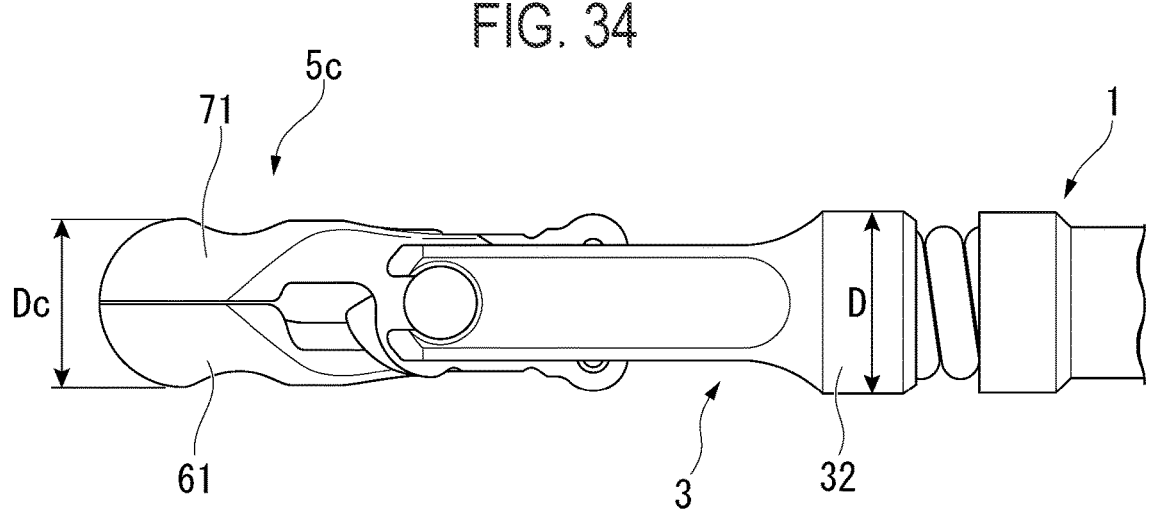
FIG. 34 is a diagram showing a fourth modification of the treatment device of FIG. 2.

FIG. 32 is a view showing the forceps 5 of the above embodiment; The maximum diameter Da of the forceps 5 is larger than the maximum diameter D of the support body 32. The shape of the forceps 5 may be changed as appropriate. In the forceps 5b which is a modification of the forceps 5, as shown in FIG. 33, the maximum diameter Db of the forceps 5b is about the same as the maximum diameter D of the support body 32. In the forceps 5c, which is a modification of the forceps 5, as shown in FIG. 34, the maximum diameter Dc of the forceps 5c is smaller than the maximum diameter D of the support body 32. The number and presence of the first sawtooth portion 622 and the second sawtooth portion 722 are appropriately changed in accordance with the shape of the forceps 5.

Second Embodiment

An endoscopic treatment device 100B for an endoscope according to a second embodiment of the present invention will be described with reference to FIGS. 1 and 35 to 39. In the following description, the same components as those already described are denoted by the same reference numerals, and a repetitive description thereof is omitted.

Endoscope Treatment Instrument 100B

The endoscopic treatment device 100B is used as an endoscopic treatment system together with the endoscope 200 in the same manner as the endoscopic treatment device 100 of the first embodiment. Similar to endoscopic treatment device 100, the endoscopic treatment device 100B includes a sheath 1, an operation wire 2, a support member 3, a needle member 4, a forceps (jaw) 5B, and an operation unit 8.

Figure 35:
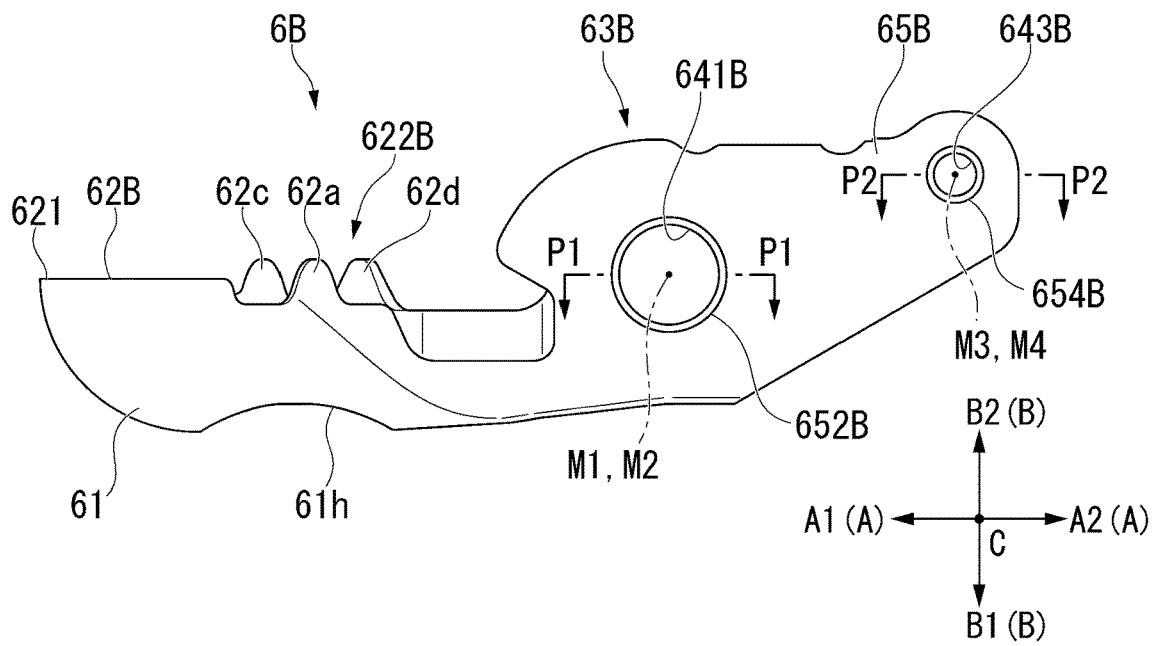
FIG. 35 is a side view of the first forceps piece of the treatment device according to a second embodiment.

A forceps (jaw) 5B is a member for collecting biological tissue. The forceps 5B is formed of a metallic material such as stainless steel, and includes a first forceps piece 6B and a second forceps piece 7B FIG. 35 is a side view of a first forceps piece 6B. The first forceps piece 6B differs from the first forceps piece 6 of the first embodiment in the aspect of the through hole. In the through hole formed in the first forceps piece 6, the inner diameter of the through hole (first hole 641, third hole 643) outside in the width direction C is larger than the inner diameter of the through hole (second hole 652, fourth hole 654) inside in the width direction C. On the other hand, in the through hole formed in the first forceps piece 6B, the inner diameter of the through hole (second hole 652B, fourth hole 654B) inside in the width direction C is larger than the inner diameter of the through hole (first hole 641B, third hole 643B) outside in the width direction C.

When viewed from the directions along the central axis M1 of the first hole 641B and the central axis M2 of the second hole 652B, that is, the rotational axis of the first forceps piece 6, the entire circumference of the inner peripheral surface of the first hole 641B is inside the inner peripheral surface of the second hole 652B. The central axis M1 of the first hole 641B substantially coincides with the central axis M2 of the second hole 652B.

Incidentally, as long as the pin 36 is inserted into the first hole 641B and the second hole 652B, the outer peripheral surface entire circumference of the first hole 641B need not necessarily be inside the inner peripheral surface of the second hole 652B, a portion of the inner peripheral surface of the first hole 641B may be located outside the inner peripheral surface of the second hole 652B.

As viewed from the direction along the central axis M4 of the central axis M3 and the fourth hole 654B of the third hole 643B, the inner peripheral surface entire circumference of the third hole 643B is inside the inner peripheral surface of the fourth hole 654B. Central axis M3 of the third hole 643B and the central axis M4 of the fourth hole 654B may substantially coincide.

Incidentally, as long as the first operation wire 21 is inserted into the third hole 643B and the fourth hole 654B, the outer peripheral surface entire circumference of the third hole 643B need not necessarily be inside the inner peripheral surface of the fourth hole 654B, a portion of the inner peripheral surface of the third hole 643B may be located outside the inner peripheral surface of the fourth hole 654B.

In some embodiments, the first forceps piece 6B is formed mainly by press working from a single flat plate. The first forceps piece 6B has a first cup 61 provided on the distal end A1, a first front right sawtooth 62B, and a first plate 63B.

The first arcuate edge 62B is an opening edge of the first cup 61 is formed in a substantially arcuate shape. The first arcuate edge 62B has a first tip portion 621 and a first sawtooth 622B. The first saw tooth portion 622B has a first front right sawtooth 62a, a first front left sawtooth 62c, and a first rear left sawtooth 62d. The first sawtooth 622B does not have the first rear right sawtooth 62b shown in the first embodiment.

Figure 36:
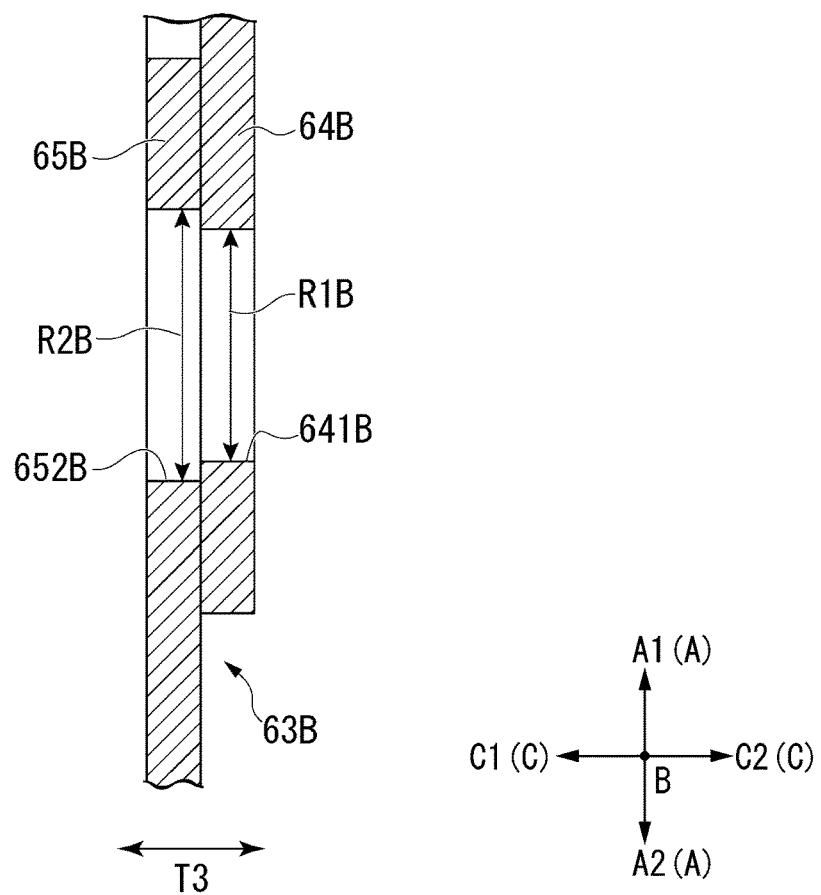
FIG. 36 is a cross-sectional view taken along P1-P1 shown in FIG. 35.

FIG. 36 is a cross-sectional view taken along P1-P1 line shown in FIG. 35. The first plate (left plate) 63B is provided on the base end A2 of the first cup 61 and is formed in a substantially plate-like shape. The first plate 63B has a first member 64B and a second member 65B.

Figure 37:
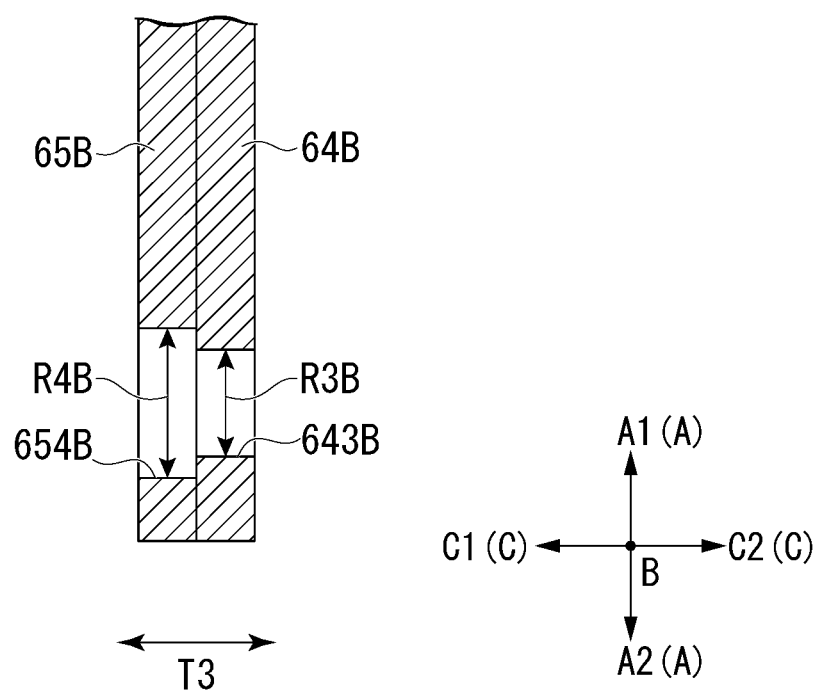
FIG. 37 is a cross-sectional view taken along P2-P2 shown in FIG. 35.

FIG. 37 is a cross-sectional view taken along P2-P2 line shown in FIG. 35. The first member (left outer plate) 64B differs from the first member 64 of the first embodiment in the manner of the through holes formed. The first member 64B has a first hole (first opening) 641B and a third hole (third opening) 643B. The first hole 641B extends through the first member 64B in the thickness direction T3 and has a first inner diameter R1B. The third hole 643B is a through hole that extends through the first member 64B in the thickness-direction T3 and has a third inner diameter R3B.

The second member 65B differs from the second member 65 of the first embodiment in the manner of how the through hole is formed. The second member 65B has a second hole (second opening) 652B and a fourth hole (fourth opening) 654B. The second hole 652B extends through the second member 65B in the thickness direction T3 and has a second inner diameter R2B. The fourth hole 654B is a through hole having a fourth inner diameter R4B and extends through the second member 65B in the thickness direction T3.

Figure 38:
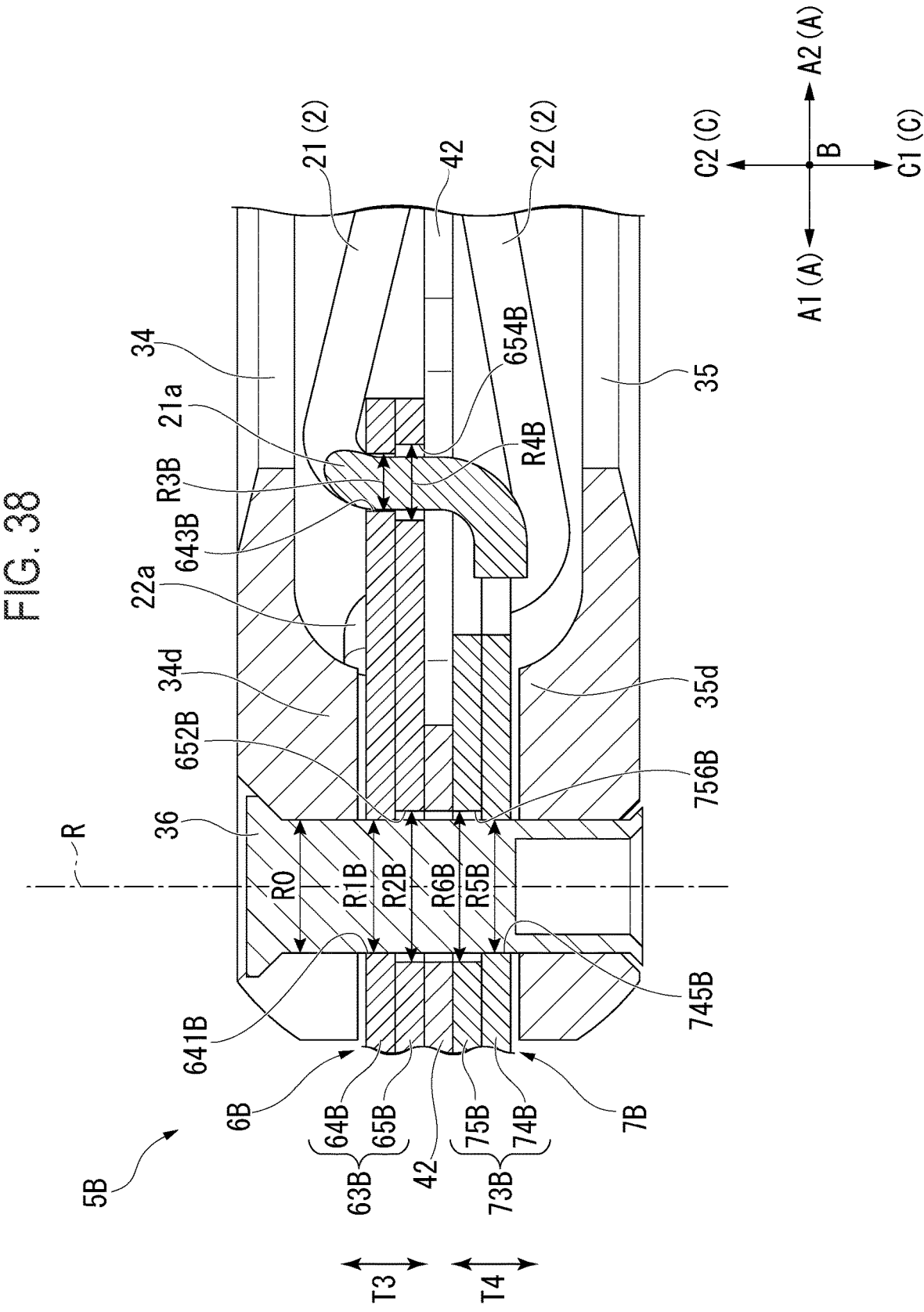
FIG. 38 is a cross-sectional top view of an engagement portion of the first forceps piece of FIG. 35 and a pin.

FIG. 38 is a cross-sectional view of the engagement point between the first forceps piece 6B and the pins 36. Pins 36 can be inserted through the first holes 641B and the second holes 652B. The first plate 63B, the center axis R of the pin 36 for inserting the first hole 641B and the second hole 652B as a rotational center, is rotatably supported by the pin 36.

Support Mode of the First Forceps Piece 6B

The first inner diameter R1B of the first hole 641B is slightly larger with respect to the outer diameter R0 of the pin 36. Therefore, the pin 36 is rotatably fitted with respect to the first hole 641B. On the other hand, the second inner diameter R2B of the second hole 652B is larger than the first inner diameter R1B of the first hole 641B. Therefore, the pin 36 may not be in contact or may minimally contact the second hole 652B. As a result, the first forceps piece 6B is supported mainly by fitting the first hole 641B of the first member 64B with the pin 36.

When the pin 36 is rotatably fitted with respect to only the first hole 641B, only the first hole 641B may be formed with high accuracy. Further, since the second inner diameter R2B of the second hole 652B is larger than the first inner diameter R1B of the first hole 641B, the accuracy in which the first hole 641B and the second hole 652B need to be aligned at the time of bending may be reduced.

Connection of the First Forceps Piece 6B and the First Operation Wire 21

The fourth inner diameter R4B of the fourth hole 654B is larger than the third inner diameter R3B of the third hole 643B. Therefore, the first operation wire 21 contacts the third hole 643B more easily than the fourth hole 654B. As a result, the first forceps piece 6B is operated mainly by the third hole 643B of the first member 64B contacting the first operation wire 21.

The first hole 641B in which the first forceps piece 6B is supported by the pin 36 and the third hole 643B in which the first operation wire 21 contacts are both holes formed in the first member 64B and are arranged on the axial line of the first operation wire 21 through which the sheath 1 is inserted. Therefore, when the first operation wire 21 moves forward and backward to drive the first forceps piece 6B, it is possible to efficiently transmit a force in the longitudinal direction A to the first forceps piece 6B.

Figure 39:
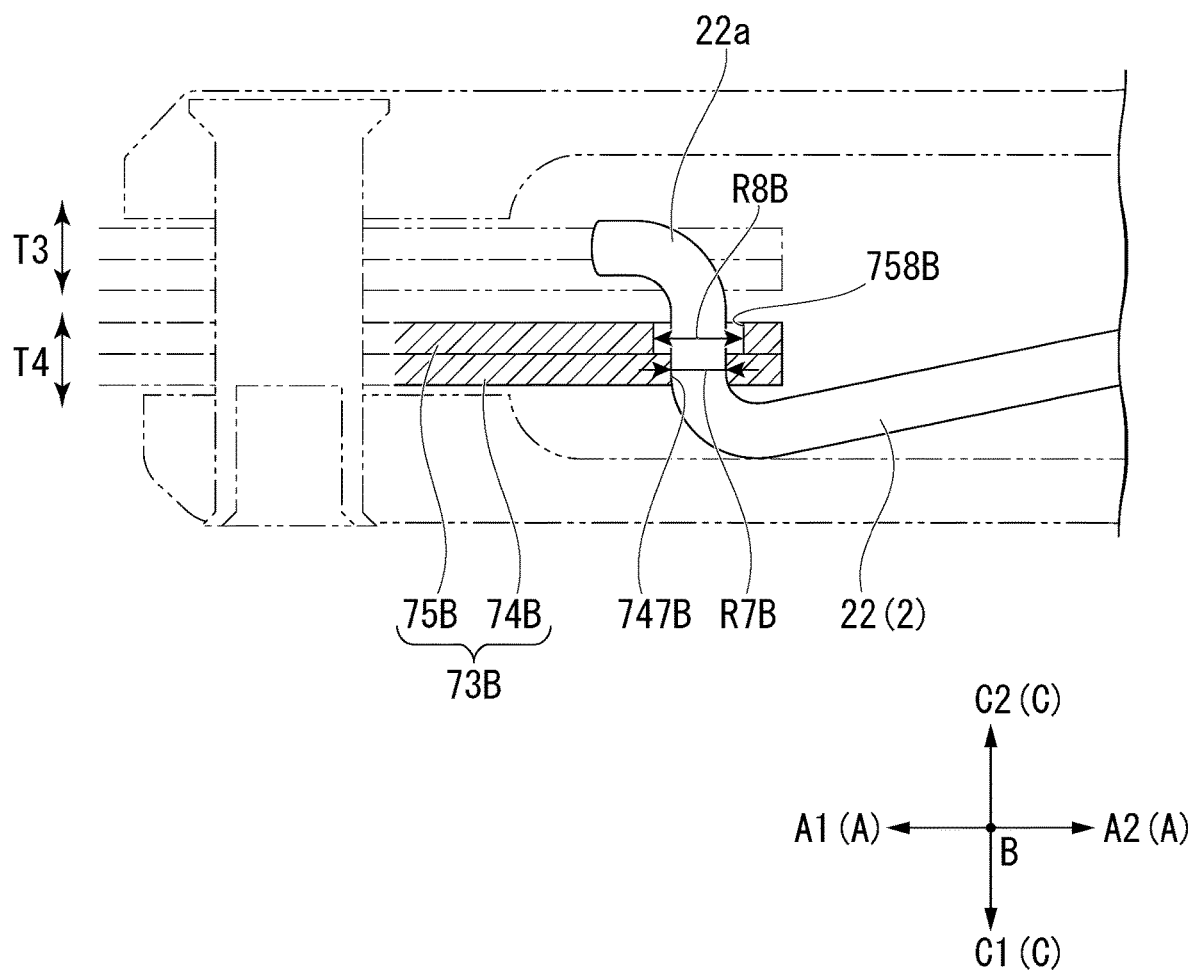
FIG. 39 is a cross-sectional view of a second plate and second operation wire of the treatment device of FIG. 2 according to a first embodiment.

FIG. 39 is a cross-sectional view of the second plate 73B to which the second operating wire 22 is connected. The second forceps piece 7B differs from the second forceps piece 7 of the first embodiment in the aspect of how the through hole is formed. In the through hole formed in the second forceps piece 7, the inner diameter of the through hole (fifth hole 745, seventh hole 747) outside in the width direction C is larger than the inner diameter of the through hole (sixth hole 756, eighth hole 758) inside in the width direction C. On the other hand, in the through hole formed in the second forceps piece 7B, the inner diameter of the through hole (the sixth hole 756B and the eighth hole 758B) inside the width direction C is larger than the inner diameter of the through hole (the fifth hole 745B and the seventh hole 747B) outside the width direction C, similarly to the first forceps piece 6B described above.

The second forceps piece 7B is mainly formed by pressing from a single flat plate. The second forceps piece 7B has a second cup 71 provided on the distal end A1, a second arcuate edge 72, and a second plate 73B.

The second plate (right plate) 73B is provided on the base end A2 of the second cup 71 and is formed in a substantially plate-like shape. The second plate 73B has a third member 74B and a fourth member 75B.

The third member 74B differs from the third member 74 the manner of the through holes formed. The third member 74B has a fifth hole (fifth opening) 745B and a seventh hole (seventh opening) 747B. The fifth hole 745B is a through hole that extends through the third member 74B in the thickness-direction T4 and has a fifth inner diameter R5B. The seventh hole 747B is a through hole that extends through the third member 74B in the thickness-direction T4 and has a seventh inner diameter R7B.

The fourth member 75B differs from the fourth member 75 in the manner of the how the through hole is formed. The fourth member 75B has a sixth hole (sixth opening) 756B and an eighth hole (eighth opening) 758B. The sixth hole 756B is a through hole that extends through the fourth member 75B in the thickness-direction T4 and has a sixth inner diameter R6B. The eighth hole 758B is a through hole having an eighth inner diameter R8B that extends through the fourth member 75B in the thickness direction T4.

Support Mode of the Second Forceps Piece 7B

The fifth inner diameter R5B of the fifth hole 745B is slightly larger than the outer diameter R0 of the pins 36. Therefore, the pin 36 is rotatably fitted with respect to the fifth hole 745B. On the other hand, the sixth inner diameter R6B of the sixth hole 756B is larger than the fifth inner diameter R5B of the fifth hole 745B. Therefore, the pin 36 may not contact or minimally contacts the sixth hole 756B. As a result, the second forceps piece 7B is supported mainly by fitting the fifth hole 745B of the third member 74B with the pin 36.

When the pin 36 is rotatably fitted with respect to only the fifth hole 745B, it is sufficient to form only the fifth hole 745B with high accuracy. In addition, since the sixth inner diameter R6B of the sixth hole 756B is larger than the fifth inner diameter R5B of the fifth hole 745B, the accuracy in which the fifth hole 745B and the sixth hole 756B need to be aligned at the time of bending may be reduced.

Connection of the Second Forceps Piece 7B and the Second Operating Wire 22

The eighth inner diameter R8B of the eighth hole 758B is larger than the seventh inner diameter R7B of the seventh hole 747B. Therefore, the second operating wire 22 contacts the seventh hole 747B more easily than the eighth hole 758B. As a result, the second forceps piece 7B is operated mainly by the seventh hole 747B of the third member 74B contacting the second operating wire 22.

The fifth hole 745B in which the second forceps piece 7B is supported by the pin 36 and the seventh hole 747B in which the second operation wire 22 contacts are both holes formed in the third member 74B and are arranged on the axial line of the second operation wire 22 through which the sheath 1 is inserted. Therefore, when the second operation wire 22 moves forward and backward to drive the second forceps piece 7B, the force in the longitudinal direction A can be efficiently transmitted to the second forceps piece 7B.

According to the endoscopic treatment device 100B for endoscopes according to the present embodiment, the forceps 5B can be formed mainly by press machining instead of cutting machining, so that high performance but low costs can be achieved.

Although the second embodiment of the present invention has been described above in detail with reference to the drawings, the specific configuration is not limited to this embodiment, and design changes and the like within a range not deviating from the gist of the present invention are also included. In addition, the constituent elements shown in the above-described embodiments and modified examples can be appropriately combined and configured.

Third Embodiment

An endoscopic treatment device 100C for an endoscope according to a third embodiment of the present invention will be described with reference to FIGS. 1 and 40 to 41. In the following description, the same components as those already described are denoted by the same reference numerals, and a repetitive description thereof is omitted.

Endoscope Treatment Instrument 100C

The endoscopic treatment device 100C is used as an endoscopic treatment system together with the endoscope 200 in the same manner as the endoscopic treatment device 100 of the first embodiment. The endoscopic treatment device 100C includes a sheath 1, an operation wire 2, a support member 3, a needle member 4, a forceps (jaw) 5C, and an operation unit 8.

In some embodiments, the forceps (jaw) 5C is a member for collecting biological tissue. The forceps 5C is formed of a metallic material such as stainless steel and includes a first forceps piece 6C and a second forceps piece 7C.

Figure 40:
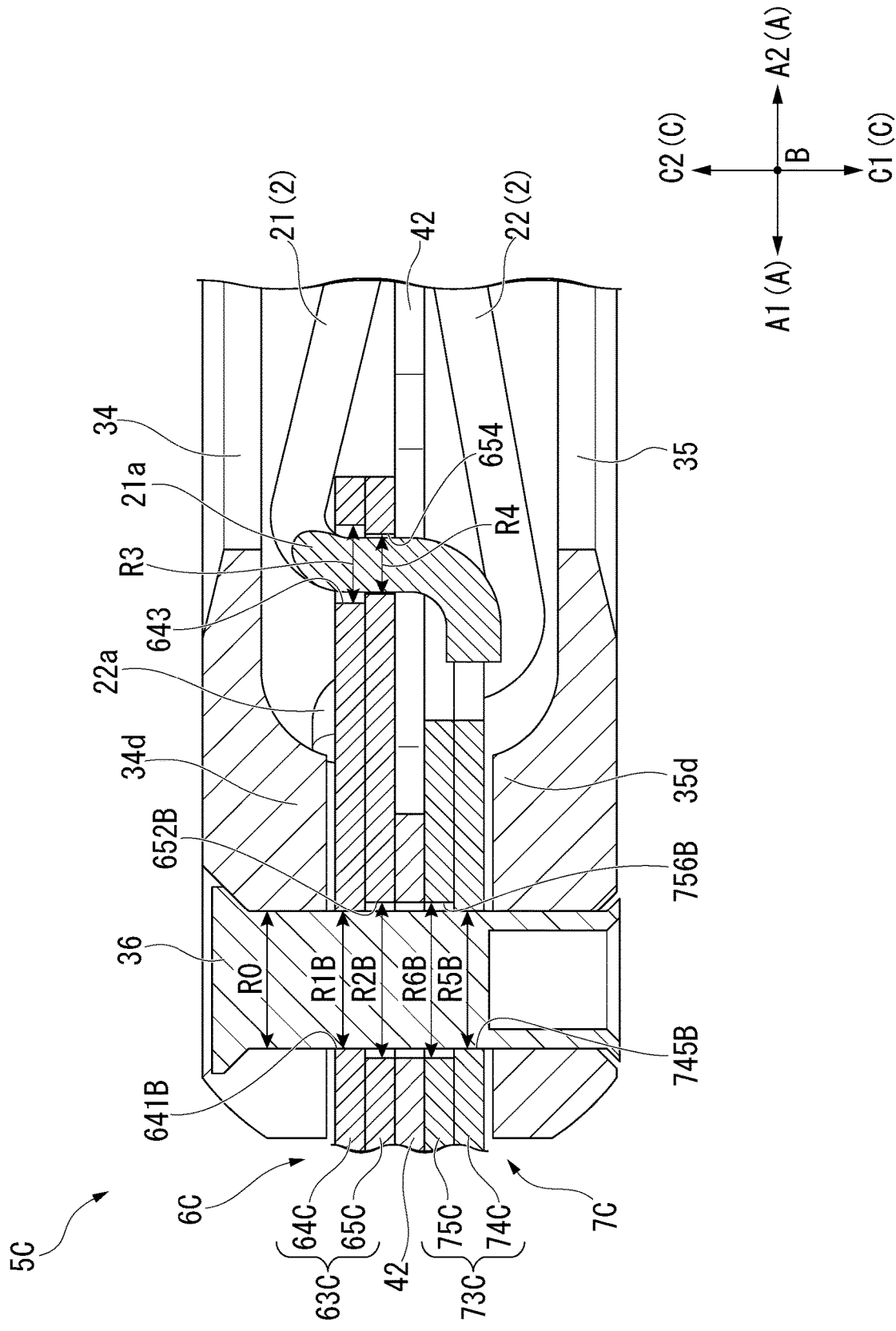
FIG. 40 is a cross-sectional view of the engagement portion of the first forceps piece and a pin in the treatment device according to a second embodiment.

FIG. 40 is a cross-sectional view of the engagement point between the first forceps piece 6C and the pins 36. The first forceps piece 6C is formed mainly by press working from a single flat plate. The first forceps piece 6C has a first cup 61 provided on the distal end A1, a first arc-shaped edge 62, and a first plate 63C.

The first plate (left plate) 63C is provided on the base end A2 of the first cup 61 and is formed in a substantially plate-like shape. The first plate 63C has a first member 64C and a second member 65C.

The first member (left outer plate) 64C has a first hole (first opening) 641B, and a third hole (third opening) 643.

The inner diameter R1B of the first hole 641B is larger than the inner diameter R3 of the third hole 643.

The second member (left inner plate) 65C has a second hole (second opening) 652B and a fourth hole (fourth opening) 654. The inner diameter R2B of the second hole 652B is larger than the inner diameter R4 of the fourth hole 654.

Figure 41:
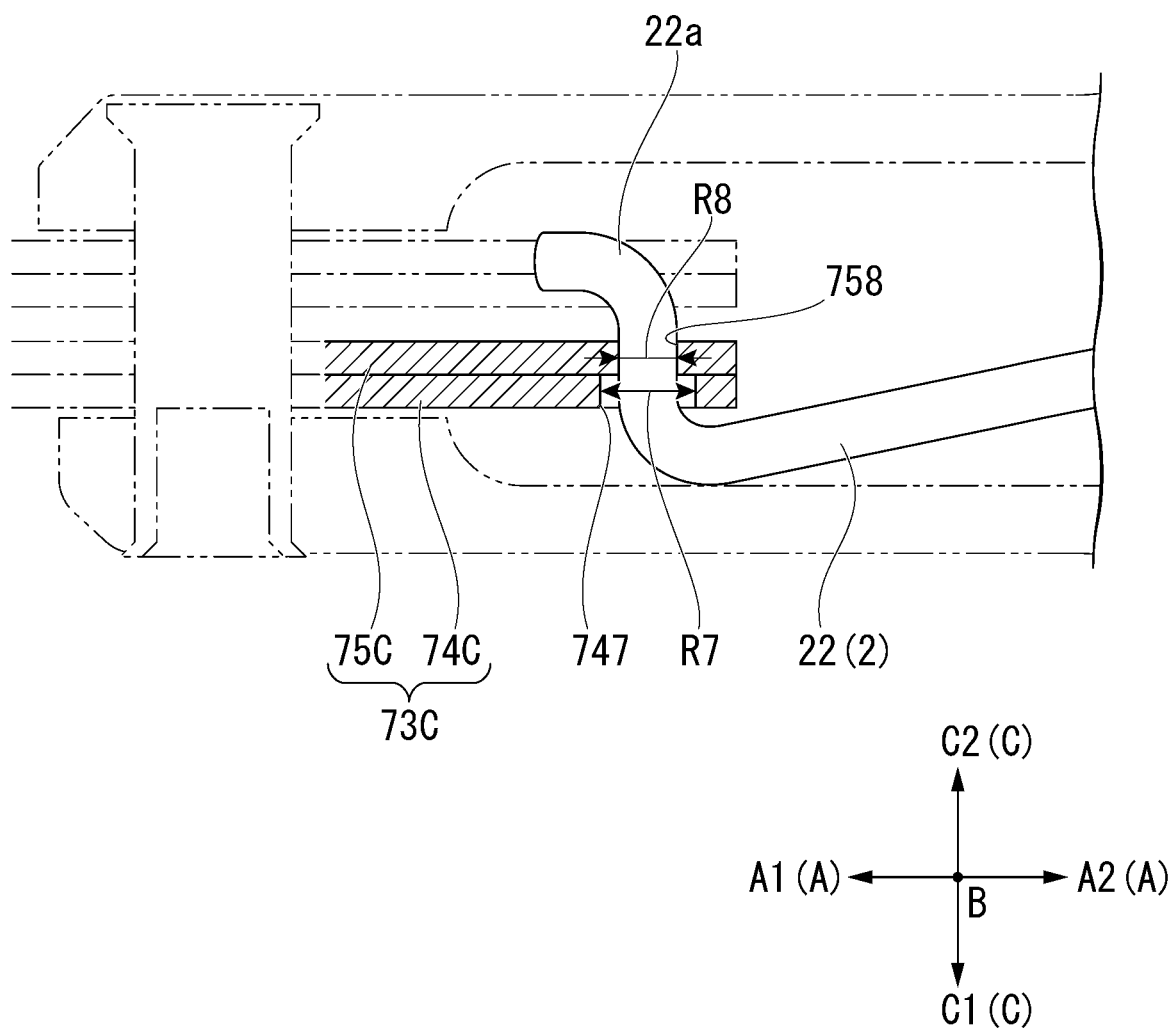
FIG. 41 is a cross-sectional view of a second plate and second operation wire of the treatment device of FIG. 2 according to a third embodiment.

FIG. 41 is a cross-sectional view of a second plate 73C with a second operating wire 22 extending therethrough. The second forceps piece 7C is formed mainly by press working from a single flat plate. The second forceps piece 7C has a second cup 71 provided on the distal end A1, a second arcuate edge 72, and a second plate 73C.

The second plate (left plate) 73C is provided on the base end A2 of the second cup 71 and is formed in a substantially plate-like shape. The second plate 73C has a third member 74C and a fourth member 75C.

The third member (right outer plate) 74C has a fifth hole (fifth opening) 745B and a seventh hole (seventh opening) 747. The inner diameter R5B of the fifth hole 745B is larger than the inner diameter R7 of the seventh hole 747.

The fourth member (right inner plate) 75C has a sixth hole (sixth opening) 756B and an eighth hole (eighth opening) 758. The inner diameter R6B of the sixth hole 756B is larger than the inner diameter R8 of the eighth hole 758.

Although the third embodiment of the present invention has been described above in detail with reference to the drawings, the specific configuration is not limited to this embodiment, and design changes and the like within a range not deviating from the gist of the present invention are also included. In addition, the constituent elements shown in the above-described embodiments and modified examples can be appropriately combined and configured.

Fourth Embodiment

An endoscopic treatment device 100D for an endoscope according to a fourth embodiment of the present invention will be described with reference to FIGS. 1 and 42 to 43. In the following description, the same components as those already described are denoted by the same reference numerals, and a repetitive description thereof is omitted.

Endoscope Treatment Instrument 100D

The endoscopic treatment device 100D is used as an endoscopic treatment system together with the endoscope 200 in the same manner as the endoscopic treatment device 100 of the first embodiment. The endoscopic treatment device 100D includes a sheath 1, an operation wire 2, a support member 3, a needle member 4, a forceps (jaw) 5D, and an operation unit 8.

The forceps (jaw) 5D is a member for collecting biological tissue. The forceps 5D is formed of a metallic material such as stainless steel and includes a first forceps piece 6D and a second forceps piece 7D.

Figure 42:
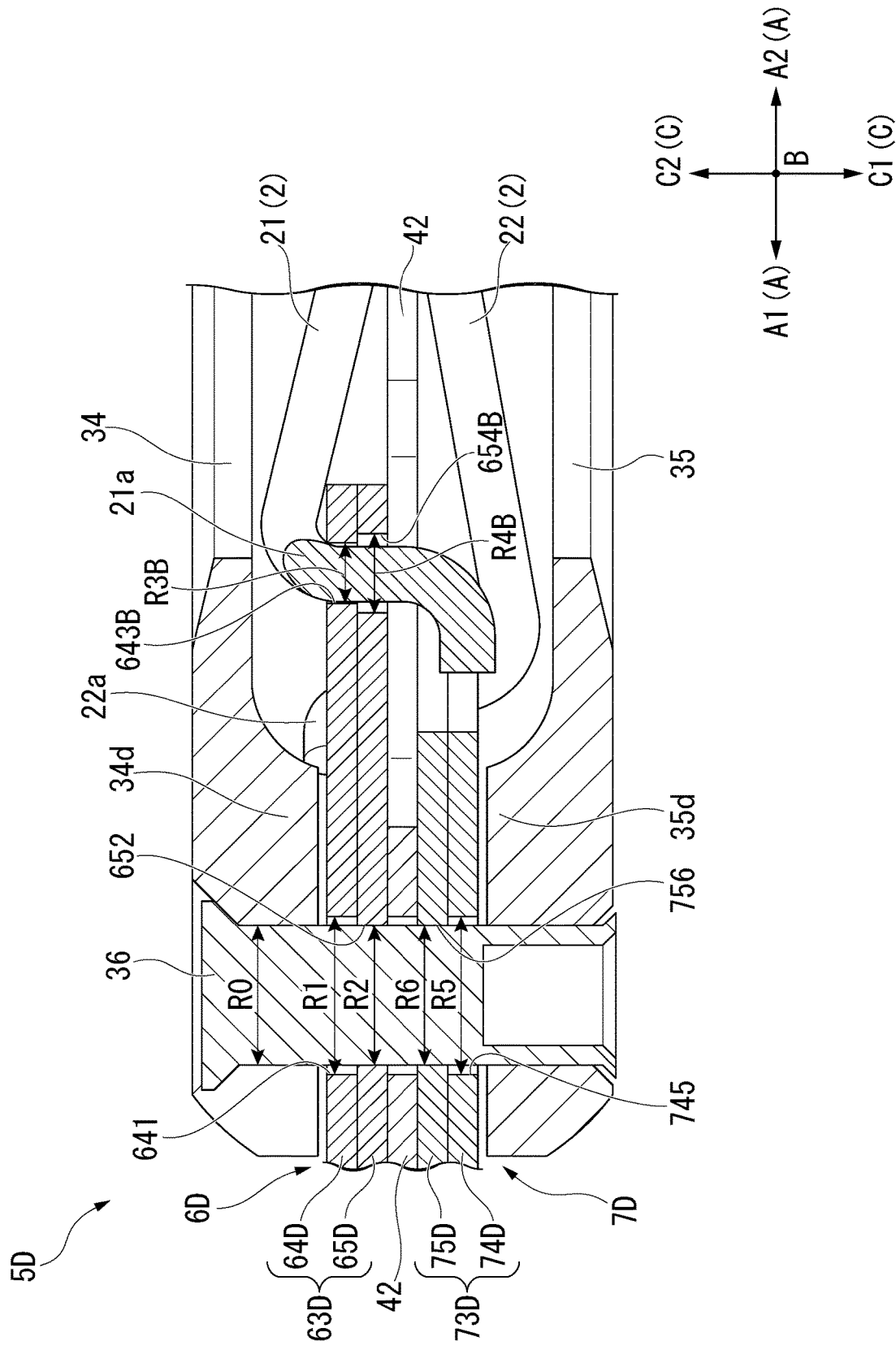
FIG. 42 is a cross-sectional view of the engagement portion of the first forceps piece and the pin in the treatment device according to a fourth embodiment.

FIG. 42 is a cross-sectional view of the engagement point between the first forceps piece 6D and the pin 36. The first forceps piece 6D is formed mainly by press working from a single flat plate. The first forceps piece 6D has a first cup 61 provided on the distal end A1, a first arc-shaped edge 62, and a first plate 63D. The first plate (left plate) 63D is provided on the proximal end side A2 of the first cup 61 and is formed in a substantially plate shape. The first plate 63D has a first member 64D and a second member 65D. The first member (left outer plate) 64D has a first hole (first opening) 641 and a third hole (third opening) 643B. The inner diameter R1 of the first hole 641 is larger than the inner diameter R3B of the third hole 643B. The second member (left inner plate) 65D has a second hole (second opening) 652 and a fourth hole (fourth opening) 654B. The inner diameter R2 of the second hole 652 is larger than the inner diameter R4B of the fourth hole 654B.

Figure 43:
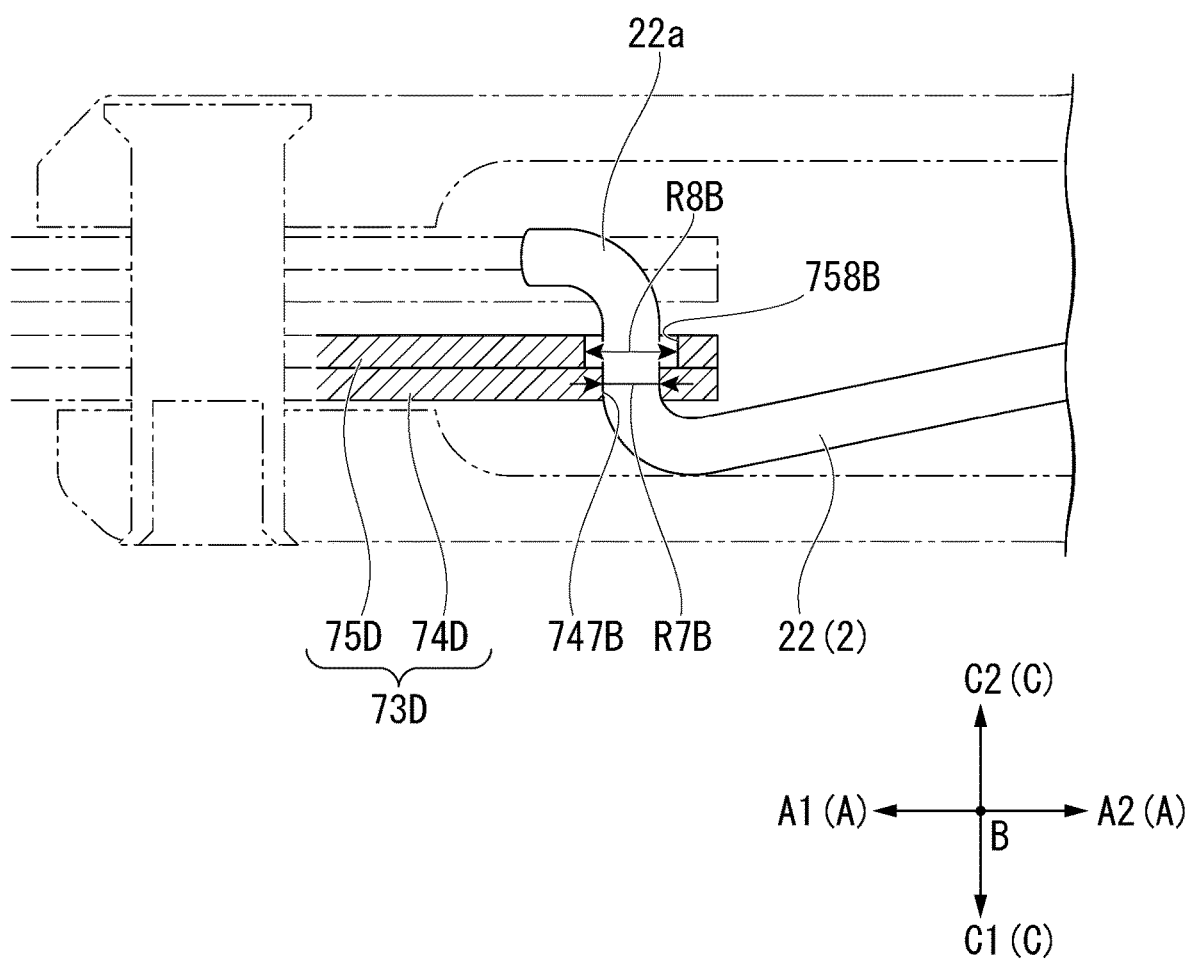
FIG. 43 is a cross-sectional view of a second plate and second operation wire of the treatment device of FIG. 2 according to a fifth embodiment.

FIG. 43 is a cross-sectional view of the second plate 73D to which the second operating wire 22 is connected.

The second forceps piece 7D is formed mainly by press working from a single flat plate. The second forceps piece 7D has a second cup 71 provided on the distal end A1, a second arcuate edge 72, and a second plate 73D.

The second plate (left plate) 73D is provided on the base end A2 of the second cup 71 and is formed in a substantially plate-like shape. The second plate 73D has a third member 74D and a fourth member 75D.

The third member (right outer plate) 74D has a fifth hole (fifth opening) 745 and a seventh hole (seventh opening) 747B. The inner diameter R5 of the fifth hole 745 is larger than the inner diameter R7B of the seventh hole 747B.

The fourth member (right inner plate) 75D has a sixth hole (sixth opening) 756 and an eighth hole (eighth opening) 758B. The inner diameter R6 of the sixth hole 756 is larger than the inner diameter R8B of the eighth hole 758B.

Although the fourth embodiment of the present invention has been described above in detail with reference to the drawings, the specific configuration is not limited to this embodiment, and design changes and the like within a range not deviating from the gist of the present invention are also included. In addition, the constituent elements shown in the above-described embodiments and modified examples can be appropriately combined and configured.

Fifth Embodiment

An endoscopic treatment device 100E for an endoscope according to a fifth embodiment of the present invention will be described with reference to FIGS. 1 and 44 to 45. In the following description, the same components as those already described are denoted by the same reference numerals, and a repetitive description thereof is omitted.

Endoscope Treatment Instrument 100E

Figure 44:
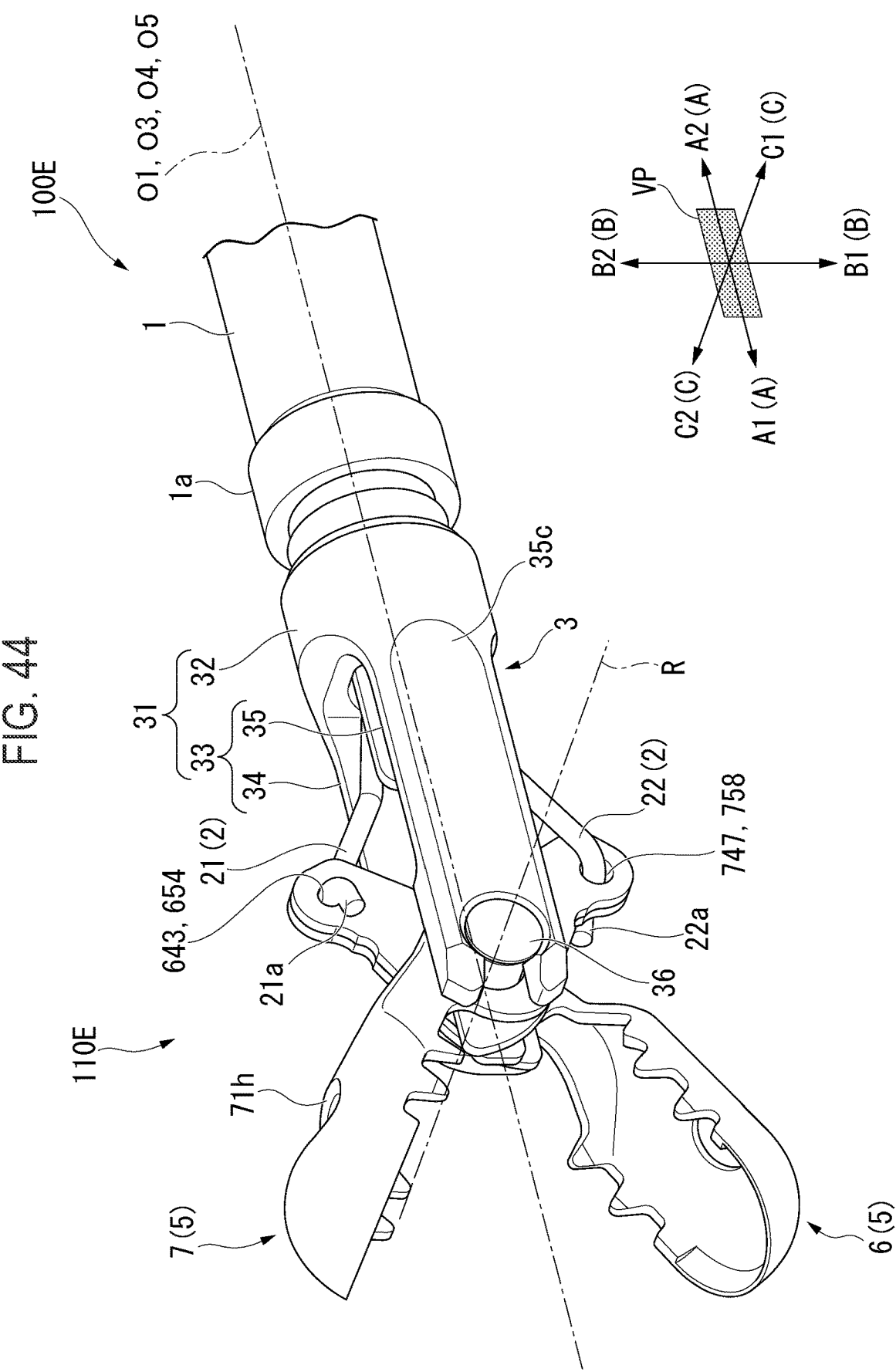
FIG. 44 is a diagram showing a distal end of the treatment device according to the sixth embodiment.

FIG. 44 is a view showing a distal end portion of the endoscopic treatment device 100E. The endoscopic treatment device 100E is used as an endoscopic treatment system together with the endoscope 200 in the same manner as the endoscopic treatment device 100 of the first embodiment. The endoscopic treatment device 100C includes a sheath 1, an operation wire 2, a support member 3, a spacer member 4E, a forceps (jaw) 5, and an operation unit 8. The support member 3, the spacer member 4E, and the forceps 5 constitute a "treatment portion 110E" for treating an affected portion.

Figure 45:
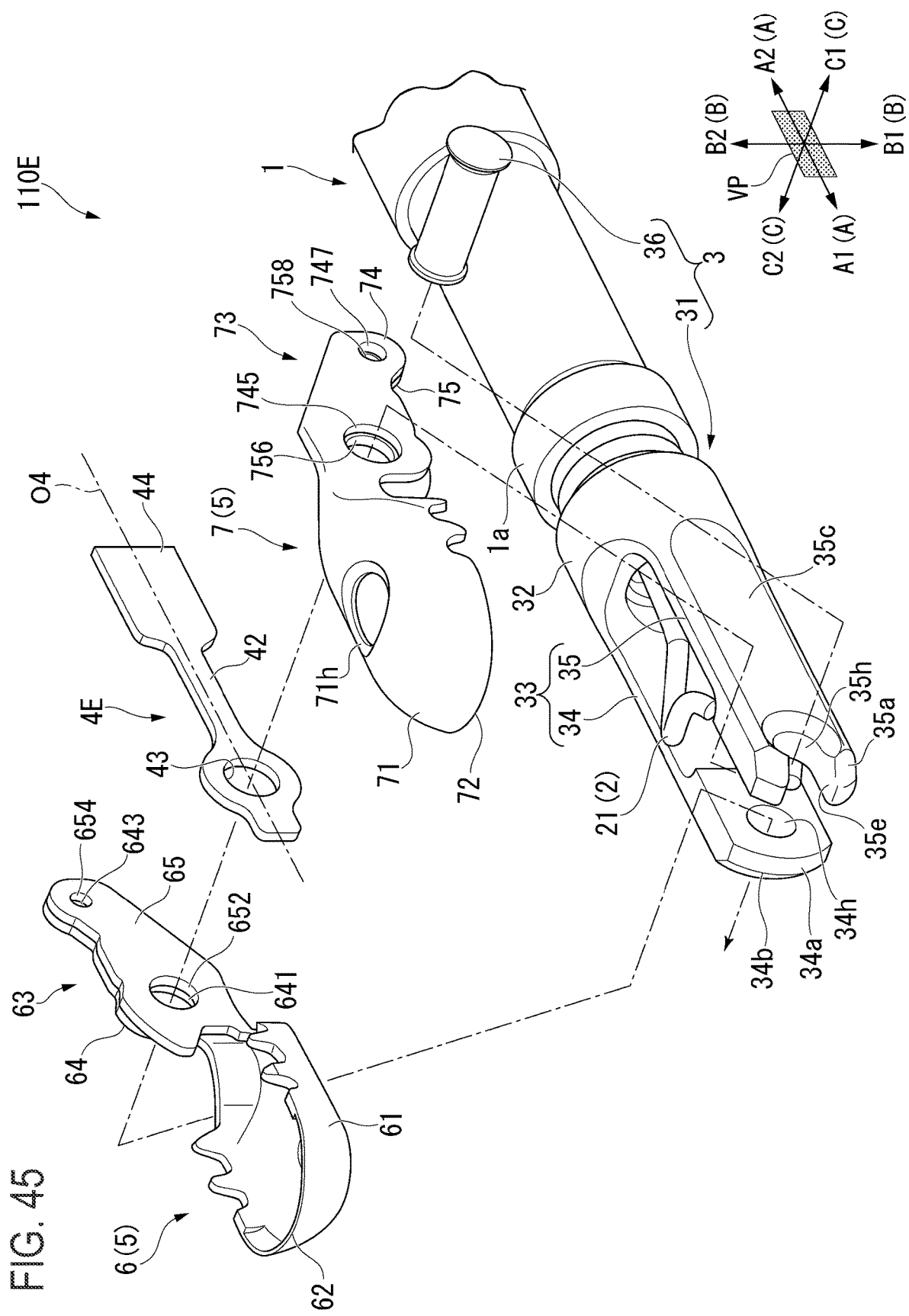
FIG. 45 is an exploded view of the treatment section of the treatment device of FIG. 44.

FIG. 45 is an exploded view of a treatment portion 110E. The spacer member 4E is the same member as the needle member 4 of the first embodiment except that it does not have the needle 41. The spacer member 4E has a spacer 42. The spacer member 4E may be disposed between the first forceps piece 6 and the second forceps piece 7 of the forceps 5. When the forceps 5 is opened and closed, the spacer member 4E reduces movement (e.g., rattling) of the forceps 5.

Although the fifth embodiment of the present invention has been described above in detail with reference to the drawings, the specific configuration is not limited to this embodiment, and design changes and the like within a range not deviating from the gist of the present invention are also included. In addition, the constituent elements shown in the above-described embodiments and modified examples can be appropriately combined and configured.

Packaging 400

Figure 46:
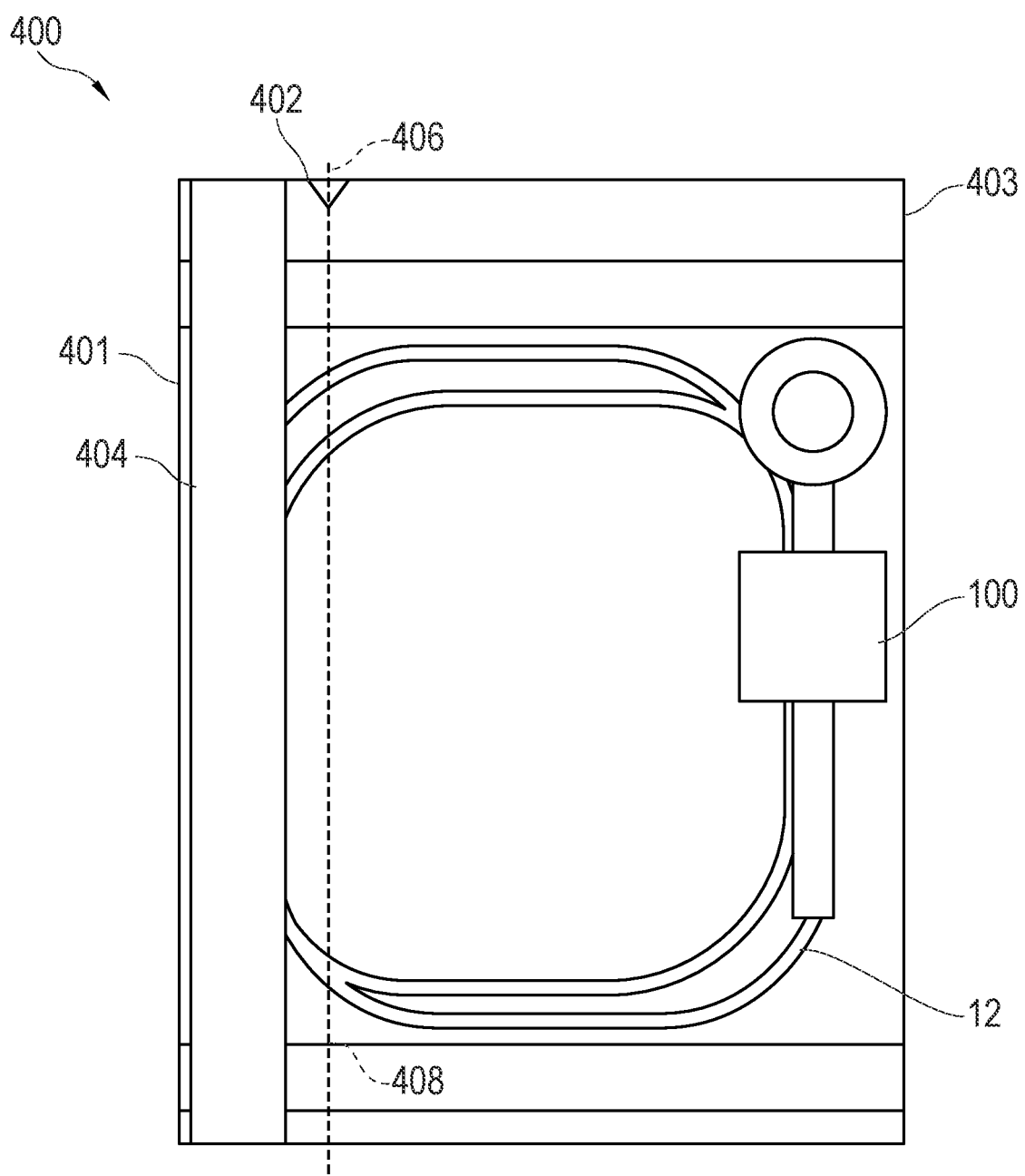
FIG. 46 is a plan view of a packaging for securing the treatment device of FIG. 2.

FIG. 46 is an illustration of a packaging 400. The packaging 400 may be configured to hold and secure the endoscopic treatment device 100. The packaging 400 may be a sterile package configured to prevent contaminants (e.g., bacteria or debris) from contacting the endoscopic treatment device 100. The packaging 400 may include a first side 401 and a second side 403. The first side 401 may be disposed opposite the second side 403.

The packaging 400 may include a notch 402 and a seal 404. The notch 402 may be disposed on a top part of the packaging 400. The notch 402 and the seal 404 may be located between the first side 401 and the second side 403. The notch 402 may be disposed proximate the first side 401. However, the notch 402 may be disposed proximate the second side 403. In some embodiments, the notch 402 is disposed proximate the first side 401 or the second side 403 compared to the center of the packaging 400. In some embodiments, the notch 402 may include a notch axis 406 bifurcating the notch 402.

In some embodiments, the seal 404 extends along the length of the packaging 400. The seal 404 may be comprised of resilient and durable material, while also being lightweight. In some embodiments, the seal 404 is a non-woven material. For example, the seal 404 may be a non-woven durable material. The seal 404 may be lightweight, flexible, water-resistant, breathable, durable, and/or tear resistant. The seal 404 may be comprised of a different material compared to the rest of the packaging 400. For example, seal 404 may be comprised of a stiffer material compared to the rest of the packaging 400. In some embodiments, the seal 404 extends along the longitudinal length of the packaging 400 such that the seal 404 is parallel to the notch axis 406. Seal 404 may extend along notch axis 406. The seal 404 may be disposed on the packaging 400 proximate the first side 401. In some embodiments, the seal 404 is disposed between the first side 401 and the notch 402.

In some embodiments, the packaging 400 includes a score line 408. The score line 408 may extend from the notch 402. For example, the score line 408 may coincide with the notch axis 406. The seal 404 may be disposed between the notch axis 406/score line 408 and the first side 401. The score line 408 may be an imaginary line coinciding with the notch axis 406. The score line 408 may assist a user in cutting the packaging 400 to access the contents within.

The seal 404 may be include a stiffer material relative the rest of the packaging 400. The seal 404 including a stiffer material allows a user to easily grab and cut the packaging 400 along the score line 408. In some embodiments, the seal 404 serves a guide for cutting open packaging 400, such as along the score line 408. Since seal 404 is comprised of stiffer material, an edge of the seal 404 may coincide with the score line 408 and user may cut along the edge of the seal 404 (e.g., the score line 408) to access the contents within packaging 400. The score line 408 provides a pathway for a user to cut along the entire length of the packaging 400 thereby allowing them to make a complete cut along the length of the packaging 400 to easily access the contents stored within.

In the above embodiment, the endoscopic treatment instrument is a biopsy forceps, but the endoscopic treatment instrument is not limited thereto. The endoscope treatment instrument may be, for example, a grasping forceps having a pair of forceps pieces similarly.

DESCRIPTION OF SYMBOLS

300 Endoscopic treatment system
200 Endoscope
100, 100B, 100C, 100D, 100E endoscopic treatment device, endoscopic treatment tool, or endoscopic treatment instrument
1 Sheath
2 Operation wire
21 First operation wire
22 Second operation wire
3 Support member
31 Frame
32 Support body
33 Pair of frame pieces
34 First frame piece
35 Second frame piece
36 Pin (rotation shaft, rotation shaft member)
4 Needle member
4E spacer member
41 Needle
42 Spacer
5, 5A, 5B, 5C, 5D Forceps (jaws)
6, 6A, 6B, 6C, 6D First forceps piece (first jaw)
63, 63B, 63C, 63D First plate (left plate)
64, 64A, 64B, 64C, 64D First member (left outer plate)
641, 641A, 641B First hole (first opening)
643, 643A, 643B Third hole (third opening)
65, 65B, 65C, 65D Second member (left inner plate)
652, 652B Second hole (second opening)
654, 654B Fourth hole (fourth opening)
7. 7A, 7B, 7C, 7D Second forceps piece (second jaw)
73, 73B, 73C, 73D Second plate (right plate)
74, 74B, 74C, 74D Third member (right outer plate)
745, 745B Fifth hole (fifth opening)
747, 747B Seventh hole (seventh opening)
75, 75B, 75C, 75D Fourth member (right inner plate)
756, 756B Sixth hole
758, 758B Eighth Hole
81 Operation unit body
82 Body lid
83 Slider
84 Pipe
F Sheet material
F1 First side
F2 Second side
400 Packaging
401 First side
402 Notch
403 Second side
404 Seal
406 Notch axis
408 Score line

The invention claimed is:

1. An endoscopic treatment device, comprising:
a forceps including a first forceps piece and a second forceps piece joined by a rotation shaft for rotation about a rotation axis,
wherein the first forceps piece is formed from a first plate and includes a first member disposed adjacent a second member, wherein the first member has a first opening through which the rotation shaft passes and the second member has a second opening through which the rotation shaft passes, wherein the first opening has a first inner diameter and the second opening has a second inner diameter, where a size of the first inner diameter is different from a size of the second inner diameter, wherein the second forceps piece is formed from a second plate and includes a third member disposed adjacent a fourth member, wherein the third member has a third opening through which the rotation shaft passes and the fourth member has a fourth opening through which the rotation shaft passes, and wherein the third opening has a third inner diameter and the fourth opening has a fourth inner diameter, where a size of the third inner diameter is different from a size of the fourth inner diameter.

2. The endoscopic treatment device of claim 1, wherein the first opening is coaxial with the second opening.

3. The endoscopic treatment device of claim 1, wherein the third opening is coaxial with the fourth opening.

4. The endoscopic treatment device of claim 1, wherein the size of the second inner diameter is larger than the size of the third inner diameter and smaller than the size of the first inner diameter.

5. The endoscopic treatment device of claim 1, further comprising a spacer, wherein the second member and the fourth member are located between the first member and the third member, and the spacer is located between the second member and the fourth member.

6. The endoscopic treatment device of claim 1, further comprising a wire connected to a proximal end of the first plate, wherein the first member includes a third hole located proximal to the first opening and the second member includes a fourth hole located proximal to the second opening, wherein the third hole has a third inner diameter and the fourth hole has a fourth inner diameter, and the third inner diameter is smaller than the fourth inner diameter, and wherein a portion of the wire passes through the third hole and the fourth hole.

7. The endoscopic treatment device of claim 1, further comprising a wire connected to a proximal end of the first plate, wherein the first member has a third hole located proximal to the first opening and the second member does not overlap with the third hole such that a portion of the wire passes through the third hole and the portion of the wire does not extend through the second member.

8. The endoscopic treatment device of claim 1, wherein the rotation shaft has a terminal end, wherein a size of an outer diameter of the terminal end is less than the size of the first inner diameter, and wherein the size of the first inner diameter is less than the size of the second inner diameter.

9. The endoscopic treatment device of claim 1, wherein a size of a smaller of the third inner diameter and the fourth inner diameter is smaller than a size of a larger of the first inner diameter and the second inner diameter.

10. The endoscopic treatment device of claim 1, wherein the first forceps piece is supported mainly by fitting the second opening of the second member with the rotation shaft.

11. The endoscopic treatment device of claim 1, wherein the second forceps piece is supported mainly by fitting the fourth opening of the fourth member with the rotation shaft.

12. The endoscopic treatment device of claim 1, further comprising a wire connected to a proximal end of the first plate, wherein the first member includes a third hole located proximal to the first opening and the second member includes a fourth hole located proximal to the second opening, wherein the third hole has a third inner diameter and the fourth hole has a fourth inner diameter, and the third inner diameter is larger than the fourth inner diameter, and wherein a portion of the wire passes through the third hole and the fourth hole.

13. The endoscopic treatment device of claim 12, wherein a central axis of the third hole is coaxial with a central axis of the fourth hole, and wherein, in a direction along the central axis of the third hole, an entire inner diameter surface of the fourth hole is inside an inner diameter surface of the third hole.

14. The endoscopic treatment device of claim 12, wherein a central axis of the third hole is coaxial with a central axis of the fourth hole, and wherein, in a direction along the central axis of the third hole, a portion of an inner diameter surface of the fourth hole is outside the inner diameter surface of the third hole.

15. The endoscopic treatment device of claim 1, further comprising:

a sheath; and a pair of frame pieces attached to a tip of the sheath, wherein the rotation shaft engages with ends of the pair of frame pieces, and wherein the rotation shaft extends between the pair of frame pieces and the first plate and the second plate are disposed between the pair of frame pieces.

16. The endoscopic treatment device of claim 15, wherein the second member is located closer to a central axis of the sheath than the first member.

17. The endoscopic treatment device of claim 15, wherein at least one distal end of the pair of frame pieces includes an opening from an axis of rotation towards a tip of the first forceps piece.

18. The endoscopic treatment device of claim 15, wherein the second member is located on a central axis side of the sheath from the first member, and the size of the second inner diameter is larger than the size of the first inner diameter.

19. The endoscopic treatment device of claim 18, further comprising a wire connected to a proximal end of the first plate, wherein the first member includes a third hole located proximal to the first opening and the second member includes a fourth hole located proximal to the second opening, wherein the third hole has a third inner diameter and the fourth hole has a fourth inner diameter, and the fourth inner diameter is larger than the third inner diameter, and wherein a portion of the wire passes through the third hole and the fourth hole.

\* \* \* \* \*